(12) United States Patent
Yin et al.

(10) Patent No.: US 12,519,744 B2
(45) Date of Patent: Jan. 6, 2026

(54) MESSAGE PROCESSING METHOD AND RELATED APPARATUS

(71) Applicant: HUAWEI TECHNOLOGIES CO., LTD., Guangdong (CN)

(72) Inventors: Keyang Yin, Nanjing (CN); Yi Zhu, Nanjing (CN); Xiaohua Lan, Shenzhen (CN); Yingqian Zhao, Nanjing (CN); Yiran Jin, Shenzhen (CN); Jinghan Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 18/575,321

(22) PCT Filed: Jun. 23, 2022

(86) PCT No.: PCT/CN2022/100778
§ 371 (c)(1),
(2) Date: Dec. 29, 2023

(87) PCT Pub. No.: WO2023/274025
PCT Pub. Date: Jan. 5, 2023

(65) Prior Publication Data
US 2025/0007871 A1 Jan. 2, 2025

(30) Foreign Application Priority Data
Jun. 30, 2021 (CN) .......................... 202110745458.X

(51) Int. Cl.
*G06F 15/16* (2006.01)
*G06F 9/451* (2018.01)
(Continued)

(52) U.S. Cl.
CPC ............ *H04L 51/224* (2022.05); *G06F 9/451* (2018.02); *H04L 67/55* (2022.05)

(58) Field of Classification Search
CPC ... H04L 51/224; H04L 67/55; H04L 12/1859; G06F 9/451; G06F 16/958
See application file for complete search history.

(56) References Cited

U.S. PATENT DOCUMENTS

| | | | |
|---|---|---|---|
| 2020/0012423 A1* | 1/2020 | Cinek | H04W 68/005 |
| 2023/0088677 A1* | 3/2023 | Dai | G06F 3/04847 |
| | | | 709/206 |
| 2023/0152950 A1* | 5/2023 | Xue | G06Q 50/01 |
| | | | 715/808 |

FOREIGN PATENT DOCUMENTS

| | | |
|---|---|---|
| CN | 105554271 A | 5/2016 |
| CN | 106302816 A | 1/2017 |

(Continued)

*Primary Examiner* — John B Walsh

(57) ABSTRACT

In the message processing method, a terminal device receives a first push message of a first application from a push server; the terminal device receives a second push message of a second application from the push server; the terminal device displays a first message indicated by the first push message and a second message indicated by the second push message on a first user interface; the terminal device receives a first input operation performed by a user on the second message; and the terminal device displays a second user interface in response to the first input operation, where a display form and/or a display sequence of the second message on the second user interface are/is different from a display form and/or a display sequence of the second message on the first user interface.

18 Claims, 68 Drawing Sheets

(51) Int. Cl.
*H04L 51/224* (2022.01)
*H04L 67/55* (2022.01)

(56) References Cited

FOREIGN PATENT DOCUMENTS

| | | |
|---|---|---|
| CN | 106569668 A | 4/2017 |
| CN | 107943376 A | 4/2018 |
| CN | 111274054 A | 6/2020 |
| CN | 111414105 A | 7/2020 |
| CN | 112000404 A | 11/2020 |
| CN | 114554005 A | 5/2022 |

* cited by examiner

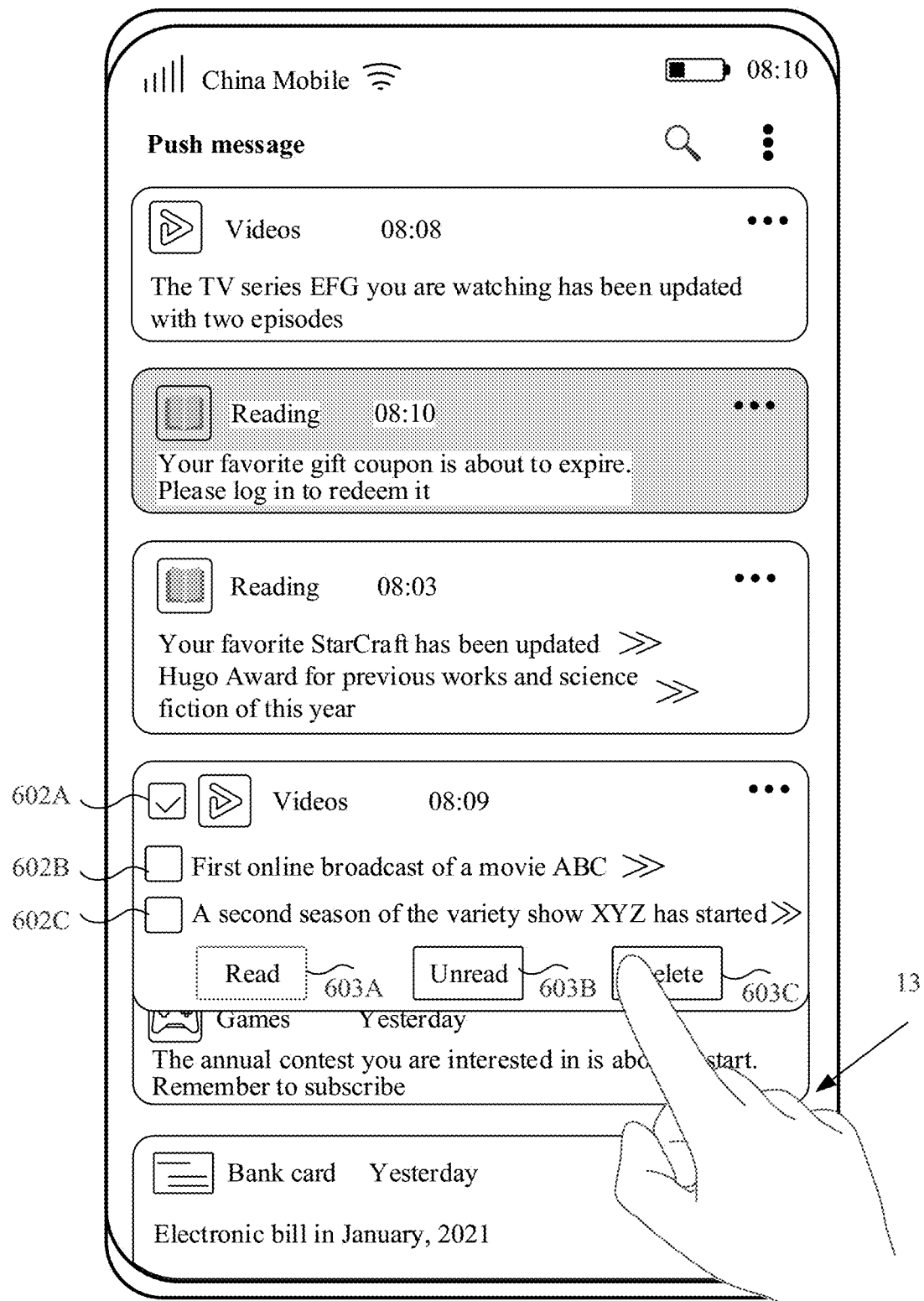

MESSAGE PROCESSING METHOD AND RELATED APPARATUS

This application claims priority to Chinese Patent Application No. 202110745458.X, filed with the China National Intellectual Property Administration on Jun. 30, 2021 and entitled "MESSAGE PROCESSING METHOD AND RELATED APPARATUS", which is incorporated herein by reference in its entirety.

TECHNICAL FIELD

This application relates to the field of electronic technologies, and in particular, to a message processing method and a related apparatus.

BACKGROUND

In a mobile Internet era with rapid development of information technologies, various applications (Application, App) emerge continuously. Most apps usually push some important messages of the apps to a user by using push (Push) messages.

Currently, an increasing quantity of apps are installed on an intelligent terminal, and the intelligent terminal receives an increasing quantity of push messages pushed by the apps. Because there is a large quantity of push messages, and the push messages are sorted in a reverse sequence of time in a system notification bar of the intelligent terminal, the user needs to manually search the push messages in the notification bar. As a result, it is difficult for the user to quickly obtain an important message from the push messages.

In conclusion, in a current push message pushing manner, an operation of searching a push message is cumbersome, an actual user requirement cannot be met, and user experience is poor.

SUMMARY

This application provides a message processing method and a related apparatus, so that an operation of querying a push message can be simplified, and user experience can be effectively improved.

According to a first aspect, this application provides a message processing method. The method includes: a terminal device receives a first push message of a first application that is sent by a push server; the terminal device receives a second push message of a second application that is sent by the push server; and the terminal device displays the first push message and the second push message on a first user interface. The terminal device receives a first input operation performed by a user on the second push message, and displays a second user interface in response to the first input operation. A display form and/or a display sequence of the second push message on the second user interface are/is different from a display form and/or a display sequence of the second push message on the first user interface.

During implementation of this embodiment of this application, in response to an input operation of the user, the terminal device may change a display form and/or a display sequence of a push message. In this way, the user may set a push message that interests the user to a push message of a specific display form and/or a specific display sequence, so that the user can quickly locate the push message.

In an implementation, the second push message is a push message highlighted on the second user interface.

During implementation of this embodiment of this application, the user may highlight a push message that interests the user on the first user interface, so that the user can quickly locate the push message.

In an implementation, the second push message is the $1^{st}$ push message on a top of the second user interface.

During implementation of this embodiment of this application, the user may set a push message that interests the user to the $1^{st}$ push message on a top of the first user interface, so that the user can quickly locate the push message.

In an implementation, the second push message is the $1^{st}$ push message in push messages of the first application on the second user interface.

During implementation of this embodiment of this application, the user may set a push message of the first application that interests the user to the $1^{st}$ push message on a top of push messages of the first application, so that the user can quickly locate the push message.

In an implementation, the first push message sent by the push server carries at least one display mark, and the display mark is used to indicate at least one of storage duration, a display form, and a display sequence that are of the first push message. That the terminal device displays the first push message on a first user interface includes: the terminal device displays the first push message on the first user interface based on the at least one display mark.

During implementation of this embodiment of this application, the terminal device may determine a display form and/or a display sequence of the push message on the first user interface by using a display mark carried in the push message, so that the user can quickly locate the push message.

In an implementation, the at least one display mark includes a persistence mark, and the persistence mark is used to indicate the terminal device to store the first push message within first duration. After the terminal device displays the first push message on the first user interface based on the at least one display mark, the method further includes: the terminal device deletes the first push message based on the persistence mark at a moment whose interval from a receiving moment of the first push message is the first duration.

During implementation of this embodiment of this application, the terminal device deletes the first push message only after persistence duration (that is, the first duration) of the first push message expires. In this way, an important push message can be prevented from being automatically cleared by a system in advance.

In an implementation, the at least one display mark includes a global pinning-to-top mark. That the terminal device displays the first push message on the first user interface based on the at least one display mark includes: displaying the first push message as the $1^{st}$ push message on a top of the first user interface based on the global pinning-to-top mark.

In an implementation, the displaying the first push message as the $1^{st}$ push message on a top of the first user interface based on the global pinning-to-top mark includes: displaying, based on the global pinning-to-top mark, the first push message as the $1^{st}$ push message on the top of the first user interface within second duration after the first push message is received. The method further includes: the terminal device deletes the global pinning-to-top mark of the first push message at a moment whose interval from a receiving moment of the first push message is the second duration.

During implementation of this embodiment of this application, the terminal device may set, based on the global pinning-to-top mark carried in the push message, the push message as the $1^{st}$ push message on the top of the first user interface within global pinning-to-top duration (that is, the second duration), so that the user can quickly locate the push message.

In an implementation, the at least one display mark includes an in-app pinning-to-top mark. That the terminal device displays the first push message on the first user interface based on the at least one display mark includes: displaying the first push message as the $1^{st}$ push message in the push messages of the first application on the first user interface based on the in-app pinning-to-top mark.

In an implementation, the displaying the first push message as the $1^{st}$ push message in the push messages of the first application on the first user interface based on the in-app pinning-to-top mark includes: displaying, on the first user interface based on the in-app pinning-to-top mark, the first push message as the $1^{st}$ push message in the push messages of the first application within third duration after the first push message is received. The method further includes: the terminal device deletes the in-app pinning-to-top mark of the first push message at a moment whose interval from a receiving moment of the first push message is the third duration.

During implementation of this embodiment of this application, the terminal device may set, based on the in-app pinning-to-top mark carried in the push message, the first push message of the first application to the $1^{st}$ push message on the top of push messages of the first application within in-app pinning-to-top duration (that is, the third duration), so that the user can quickly locate the push message.

In an implementation, the at least one display mark includes a highlighting mark. That the terminal device displays the first push message on the first user interface based on the at least one display mark includes: highlighting the first push message on the first user interface based on the highlighting mark.

In an implementation, the highlighting the first push message on the first user interface based on the highlighting mark includes: highlighting, based on the highlighting mark, the first push message on the first user interface within fourth duration after the first push message is received. The method further includes: the terminal device deletes the highlighting mark of the first push message at a moment whose interval from a receiving moment of the first push message is the fourth duration.

During implementation of this embodiment of this application, the terminal device may highlight, based on the highlighting mark carried in the push message, the push message on the first user interface within highlighting duration (that is, the fourth duration), so that the user can quickly locate the push message.

In an implementation, the first push message that is highlighted includes one or more of the following display features: compared with a non-highlighted push message, the first push message has a different background light color; compared with the non-highlighted push message, the first push message has a different font, a different font size, and/or a different color; and compared with the non-highlighted push message, the first push message carries a highlighted icon. A specific form of highlighting display is not specifically limited in this embodiment of this application.

According to a second aspect, this application provides a message processing method. The method includes: a push server receives a third push message of a first application that is sent by an application server, where the third push message carries at least one display mark, and the display mark is used to indicate at least one of storage duration, a display sequence, and a display form that are of the third push message on a terminal device. The push server sends a first push message to the terminal device, where the first push message is determined based on the third push message.

During implementation of this embodiment of this application, the display mark carried in the push message that is sent by the application server indicates the storage duration, the display sequence, and/or the display form of the push message on the terminal device. In this way, the storage duration of the push message is indicated, so that an important push message can be prevented from being automatically cleared by a system of the terminal device in advance. The display sequence and/or the display form of the push message are/is indicated, so that the user can quickly locate the push message.

In an implementation, before the push server sends a first push message to the terminal device, the method further includes: the push server determines validity of a first display mark carried in the third push message, where the first display mark is any one of the at least one display mark; and when the first display mark is invalid, the push server deletes the first display mark of the first push message and generates the first push message.

During implementation of this embodiment of this application, the push server preprocesses the display mark carried in the push message that is sent by the application server, so that an invalid display mark can be filtered out in advance.

In an implementation, before the push server receives the third push message that is sent by the application server, the method further includes: the application server sends a registration request to the push server, where the registration request is used to register a display service corresponding to at least one type of display mark of the first application.

In an implementation, the at least one type of display mark includes at least one type of a persistence mark, a global pinning-to-top mark, an in-app pinning-to-top mark, and a highlighting mark. A display service corresponding to the persistence mark is a persistence service, a display service corresponding to the global pinning-to-top mark is a global pinning-to-top service, a display service corresponding to the in-app pinning-to-top mark is an in-app pinning-to-top service, and a display service corresponding to the highlighting mark is a highlighting service.

In an implementation, that the push server determines validity of a first display mark carried in the third push message includes: the push server determines whether a display service corresponding to the first display mark is registered with the first application; and when the display service corresponding to the first display mark is not registered with the first application, the push server determines that the first display mark is invalid.

In an implementation, the first display mark is a global pinning-to-top mark, the registration request further includes a global pinning-to-top time period, and that the push server determines validity of a first display mark carried in the third push message includes: when the display service corresponding to the first display mark is registered with the first application, and a current moment is later than the global pinning-to-top time period, the push server determines that the first display mark is invalid.

In an implementation, the persistence mark is used to indicate the terminal device to store the first push message within first duration; the global pinning-to-top mark is used to indicate the terminal device to display the first push message as the $1^{st}$ push message on a top of a first user interface; the in-app pinning-to-top mark is used to indicate the terminal device to display, on the first user interface, the first push message as the $1^{st}$ push message in the push messages of the first application; and the highlighting mark is used to indicate the terminal device to highlight the first push message on the first user interface.

According to a third aspect, this application provides a terminal device, including one or more processors and one or more memories. The one or more memories are coupled to the one or more processors. The one or more memories are configured to store computer program code, and the computer program code includes computer instructions. When the one or more processors execute the computer instructions, the terminal device is enabled to perform the message processing method in any possible implementation of the first aspect.

According to a fourth aspect, this application provides a server, including one or more processors and one or more memories. The one or more memories are coupled to the one or more processors. The one or more memories are configured to store computer program code, and the computer program code includes computer instructions. When the one or more processors execute the computer instructions, the server is enabled to perform the message processing method in any possible implementation of the second aspect.

According to a fifth aspect, an embodiment of this application provides a computer storage medium, including computer instructions. When the computer instructions are run on a terminal device, the terminal device is enabled to perform the message processing method in any possible implementation of the first aspect.

According to a sixth aspect, an embodiment of this application provides a computer storage medium, including computer instructions. When the computer instructions are run on a server, the server is enabled to perform the message processing method in any possible implementation of the second aspect.

According to a seventh aspect, an embodiment of this application provides a computer program product. When the computer program product runs on a computer, the computer is enabled to perform the message processing method in any possible implementation of any one of the foregoing aspects.

BRIEF DESCRIPTION OF DRAWINGS

FIG. 10A to FIG. 10F are a schematic diagram of another user interface for manual deletion according to an embodiment of this application;

DESCRIPTION OF EMBODIMENTS

The following clearly describes the technical solutions in embodiments of this application in detail with reference to the accompanying drawings. In descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

A Communications System 10 Provided in Embodiments of this Application is First Described.

Figure 1:
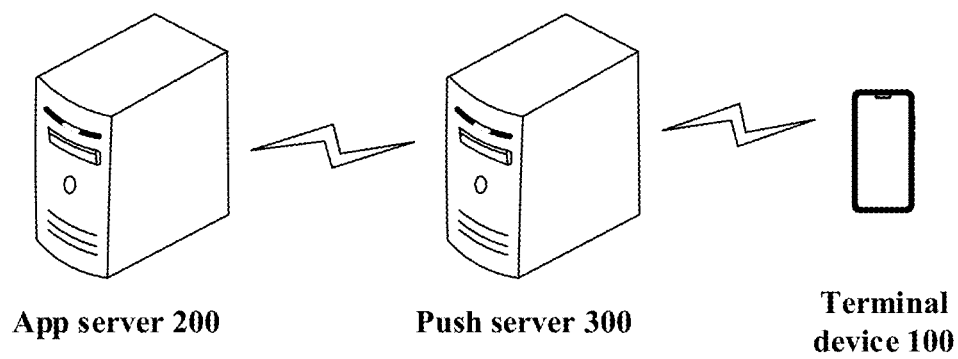
FIG. 1 is a schematic diagram of a communications system according to an embodiment of this application.

FIG. 1 shows an example of a schematic diagram of a structure of a communications system 10 according to an embodiment of this application. As shown in FIG. 1, the communications system 10 includes one or more terminal devices (for example, a terminal device 100), one or more app developer servers (for example, an app server 200), and one or more push servers (for example, a push server 300). The app server 200 and the push server 300 may communicate with each other by using a wireless communication network and/or a wired communication network. The push server 300 and the terminal device 100 may also communicate with each other by using a wireless communication network and/or a wired communication network.

The app server 200 may be a server, or a server cluster including a plurality of servers, or a cloud computing center. The app server 200 is a server that pushes a message for a specified app (for example, a game app, a navigation app, a social app, a video app, or a reading app) installed on the terminal device 100. The app server 200 may further provide another service for the foregoing specified app, for example, provide a real-time navigation service for the navigation app, and provide an instant messaging service for the social app. This is not specifically limited herein.

The push server 100 may be a server, or a server cluster including a plurality of servers, or a cloud computing center. The push server 100 is configured to perform preprocessing (for example, security detection) on a push message from the app server 200, and may send a preprocessed push message to the terminal device 100.

In this embodiment of this application, the app server 200 may apply to the push server 100 for a push message persistence service of a specified app (for example, an app 1). In addition, on a basis of the push message persistence service, the app server 200 may further apply to the push server 100 for a global pinning-to-top service, an in-app pinning-to-top service, and a highlighting service that are of a push message of the app 1. A push message 1 is used as an example.

The push message persistence service refers to the following: Within persistence duration of the push message 1, the push message 1 is stored in a push message box of the terminal device 100, to prevent the push message 1 from being automatically cleared by a system of the terminal device 100 within a preset time period.

The push message global pinning-to-top service refers to the following: Within global pinning-to-top duration of the push message 1, the push message 1 is displayed as the $1^{st}$ one on a top of push messages of the push message box that is displayed on the terminal device 100.

The push message in-app pinning-to-top service refers to the following: Within in-app pinning-to-top duration of the push message 1, the push message 1 is displayed as the $1^{st}$ one on the top of the push messages of the app 1 in the push message box displayed on the terminal device 100.

The push message highlighting service refers to the following: Within highlighting duration of the push message 1, the push message 1 is displayed in a more eye-catching manner in the push messages of the push message box that is displayed on the terminal device 100. For example, the push message 1 has a brighter background light, a special character color, bold characters, and/or a specific icon. This is not specifically limited herein.

In this embodiment of this application, the push message 1 is used as an example. The push message 1 sent by the app server 200 may carry parameters such as a persistence mark, a global pinning-to-top mark, an in-app pinning-to-top mark, and/or a highlighting mark. The foregoing four parameters are respectively used to identify a persistence state, a global pinning-to-top state, an in-app pinning-to-top state, and a highlighted state that are of the push message. Correspondingly, the push message sent by the app server 200 may further carry parameters such as persistence duration, global pinning-to-top duration, in-app pinning-to-top duration, and/or highlighting duration of the push message 1. The push server may preprocess the push message based on the parameter carried in the push message that is sent by the app server 200. The terminal device 100 may perform, based on a parameter carried in a push message delivered by the push server, global pinning-to-top, in-app pinning-to-top, highlighting, and/or the like on the push message on a user interface of the push message box.

In this embodiment of this application, the terminal device 100 may be a terminal carrying iOS, Android, Microsoft, or another operating system. For example, the terminal device 100 may be a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart home device, a smart city device, and/or the like. A specific type of the terminal device 100 is not specially limited in this embodiment of this application.

The terminal device 100, the app server 200, and the push server 300 may be deployed on land, including indoor or outdoor devices, handheld devices, or vehicle-mounted devices; or may be deployed on a water surface; or may be deployed on an airplane or an artificial satellite in the air. This is not limited in this embodiment of this application.

It should be understood that FIG. 1 is merely a schematic diagram of a system structure of a communications system according to an embodiment of this application. The communications system may further include another device, for example, a wireless relay device and a wireless backhaul device (not shown in FIG. 1). This is not limited herein.

The Following Describes a Software System of the Terminal Device 100 in Embodiments of this Application.

A software system of the terminal device 100 may use a layered architecture, an event-driven architecture, a microkernel architecture, a microservice architecture, or a cloud architecture. In this embodiment of the present invention, an Android system with a layered architecture is used as an example to describe a software structure of the terminal device 100.

Figure 2:
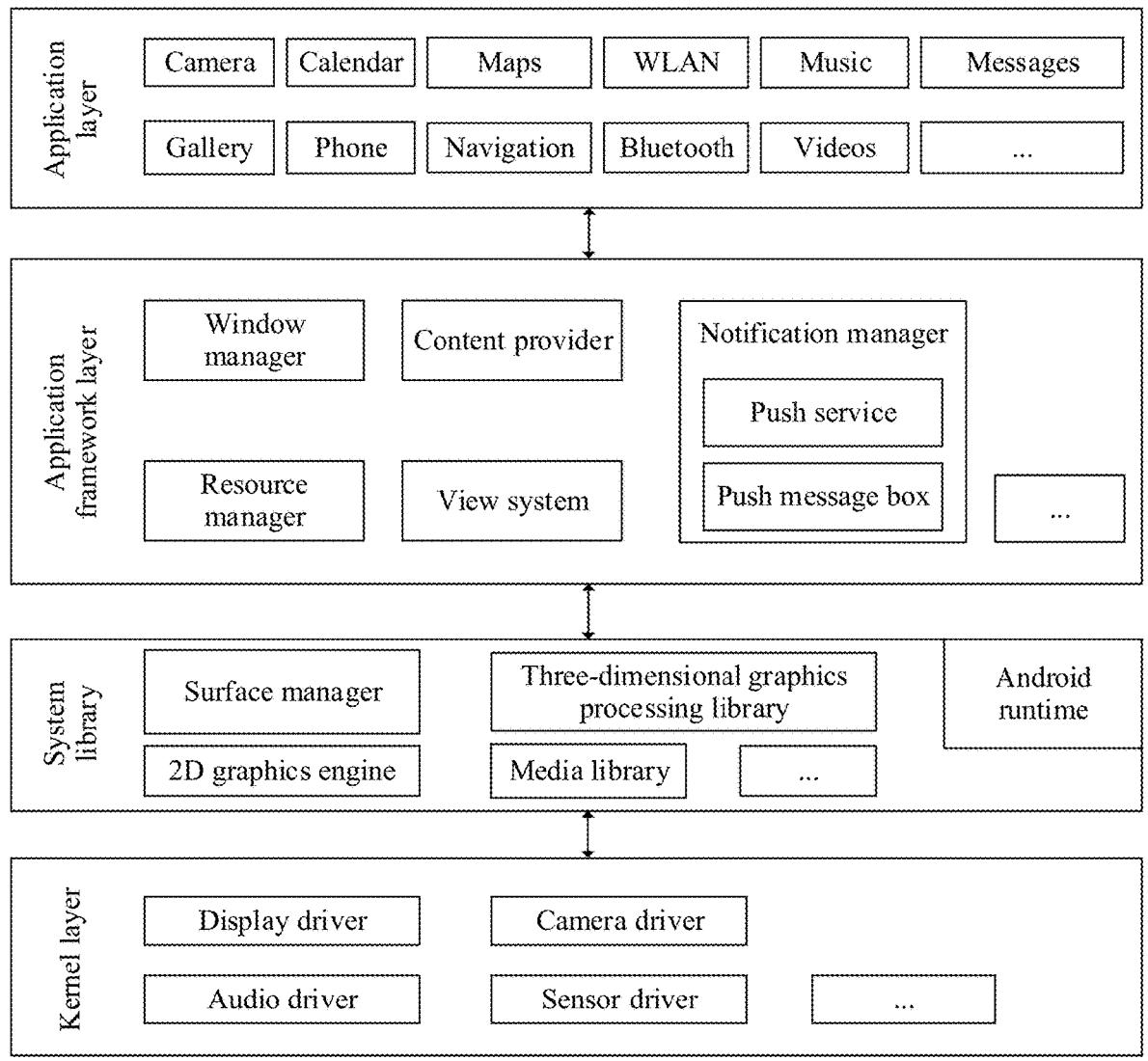
FIG. 2 is a block diagram of a software structure according to an embodiment of this application.

FIG. 2 is a block diagram of a software structure of the terminal device 100 according to an embodiment of the present invention.

In the layered architecture, software is divided into several layers, and each layer has a clear role and a clear task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Maps, Navigation, WLAN, Bluetooth, Music, Videos, and Messages.

The application framework layer provides an application programming interface (Application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, whether a screen is locked, whether a screenshot is taken, and the like.

The content provider is configured to: store and obtain data, and enable the data to be accessed by an application. The data may include a video, an image, audio, calls that are made and received, a browsing history and bookmarks, a phone book, and the like.

The view system includes a visual control, for example, a control for displaying text or a control for displaying a picture. The view system may be used to build an application. A display interface may include one or more views. For example, a display interface including a message notification icon may include a text display view and a picture display view.

The phone manager is configured to provide a communication function of the terminal device 100, for example, management of a call status (including answering, declining, or the like).

The resource manager provides various resources for an application, such as a localized character string, an icon, a picture, a layout file, and a video file.

The notification manager enables an application to display notification information in a status bar, and may be configured to convey a notification-type message. The displayed information may automatically disappear after a short pause without user interaction. For example, the notification manager is configured to: notify download completion, give a message notification, and the like. The notification manager may alternatively be a notification that appears in a top status bar of the system in a form of a graph or a scroll bar text, for example, a notification of an application running in the background, or may be a notification that appears on a screen in a form of a dialog window. For example, text information is prompted in the status bar, a prompt tone is played, an electronic device vibrates, or an indicator light blinks.

In this embodiment of this application, the notification manager includes a push service and a push message box.

The push service is responsible for establishing a long link to the push server 200, receiving a push message delivered by the push server 200, and executing corresponding logic of each parameter (for example, a persistence mark, a global pinning-to-top mark, an in-app pinning-to-top mark, and/or a highlighting mark, persistence duration, global pinning-to-top duration, in-app pinning-to-top duration, and/or highlighting duration) in the push message delivered by the push server. In this way, the push message can be persistently displayed, global pinning-to-top, in-app pinning-to-top, and highlighted in the push message box.

The push message box is a system entrance provided by an intelligent terminal system for storing push messages. On a user interface of the push message box, the terminal device 100 may perform global pinning-to-top, in-app pinning-to-top, and/or highlighting on the push messages according to parameters in each push message.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem, and provide fusion of 2D and 3D layers for a plurality of applications.

The media library supports playback and recording in a plurality of commonly used audio and video formats, static image files, and the like. The media library may support a plurality of audio and video encoding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The Following Describes an Example of an Application Scenario of a Message Pushing Method Provided in Embodiments of this Application with Reference to the Accompanying Drawings.

The following describes an example of a home interface 11 provided in this embodiment of this application.

Figure 3A:
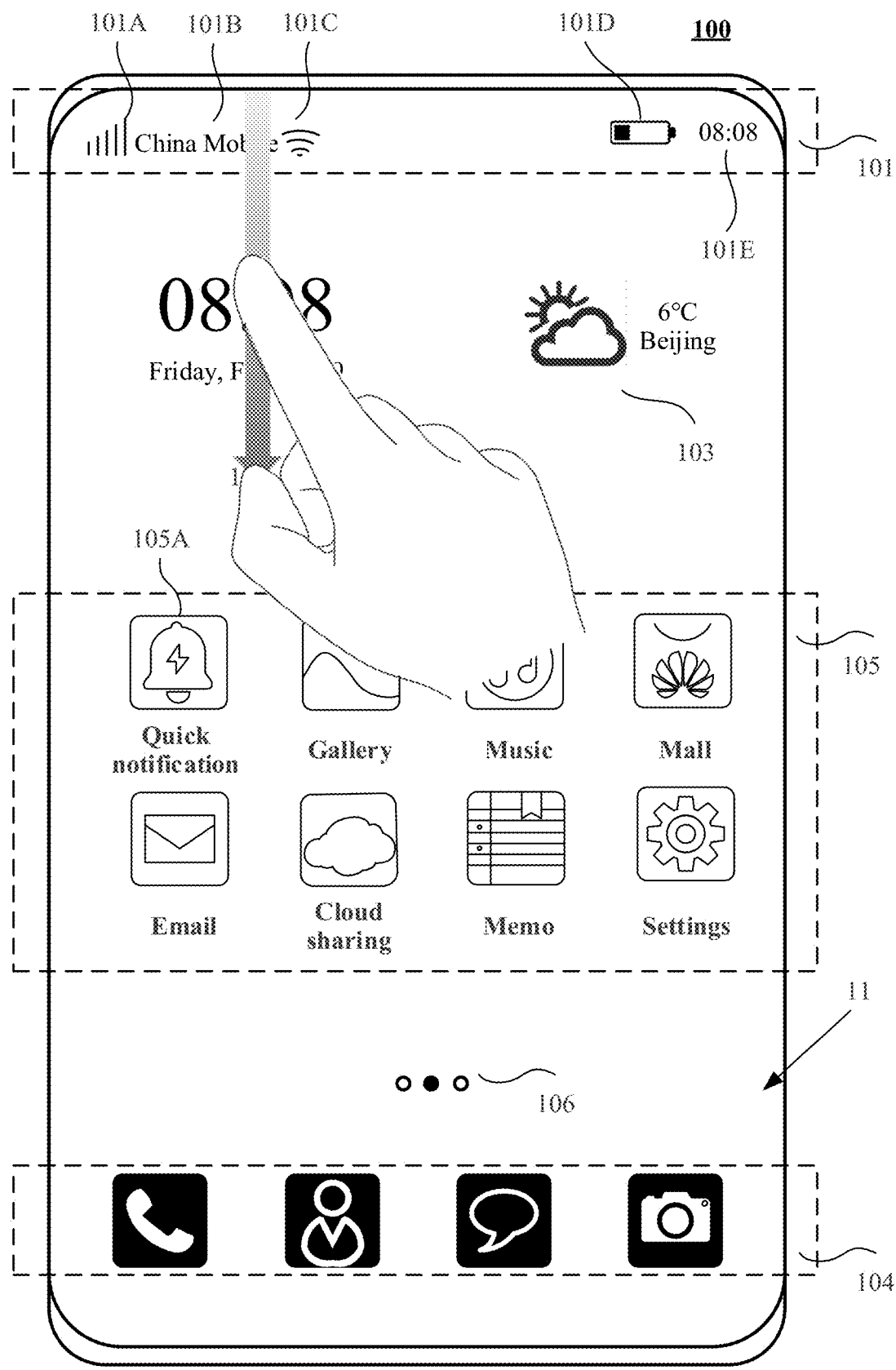
FIG. 3A and FIG. 3B are a schematic diagram of a user interface of a notification panel according to an embodiment of this application.

For example, FIG. 3A shows the home interface 11 that is on the terminal device 100 and that is configured to display applications installed on the terminal device 100. The home interface 11 may include: a status bar 101, a calendar indicator 102, a weather indicator 103, a tray 104 including icons of commonly used applications, and other application icons 105.

The tray 104 including icons of commonly used applications may display: a "Phone" icon, a "Contacts" icon, a "Messages" icon, and a "Camera" icon. The other application icons 105 may display: a "Message box" icon 105A, an "Album" icon, a "Music" icon, an "Email" icon, a "Memo" icon, a "Settings" icon, and the like. The home interface 11 may further include a page indicator 106. The other application icons may be distributed on a plurality of pages, and the page indicator 106 may be used to indicate a specific page on which an application is currently viewed by a user. The user may slide leftward or rightward in an area including the other application icons, to view an application icon on another page.

It may be understood that FIG. 3A merely shows an example of the user interface on the terminal device 100, and should not constitute a limitation on this embodiment of this application.

The following describes an example of a notification bar interface 12 provided in this embodiment of this application.

Figure 3B:
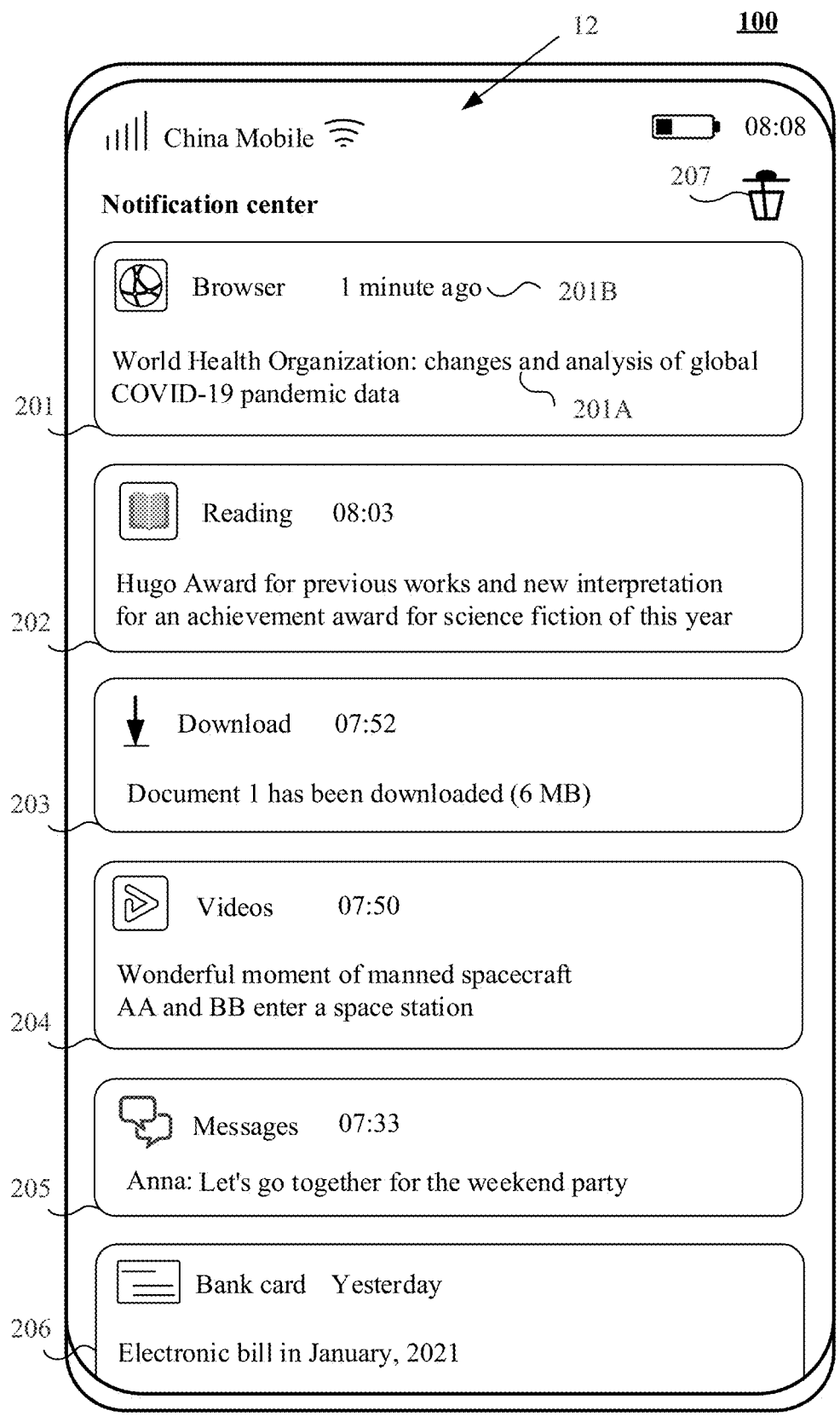

For example, the status bar 101 may receive an input operation (for example, a finger sliding-down operation shown in FIG. 3A) of the user, and in response to the input operation, the terminal device 100 may display the notification bar interface 12 shown in FIG. 3B.

As shown in FIG. 3B, the notification bar interface 12 may display message cards (for example, a message card 201 to a message card 206) corresponding to push messages that are recently stored in the notification bar.

The message card 201 is used as an example. The message card includes a push message 201A and a receiving moment 201B of the push message. For example, the push message 201A may receive an input operation (for example, a touch operation) of the user, and in response to the input operation, the terminal device 100 displays detailed content of the push message 201A. Based on receiving moments in the message card 201 to the message card 206, the push messages are arranged from top to bottom in a reverse sequence of the receiving moments on the notification bar interface 12. To be specific, for two push messages sequentially received, a message card of a push message received later is closer to a top of the terminal device than a message card of a push message received currently. It may be understood that, when a large quantity of push messages are stored in the notification bar, the user manually searches for a needed push message, which is time-consuming and causes poor user experience.

It should be noted that, in this embodiment of this application, specific display content of the push message (for example, the push message 201A) in the message card may be a title, an introduction, or some content of the push message 201A. This is not specifically limited herein.

In some embodiments, the notification bar interface 12 may include a deletion control 207. The deletion control 207 may receive an input operation (for example, a touch operation) of the user, and in response to the input operation, the terminal device 100 may delete all push messages stored in the notification bar. Generally, the terminal device 100 periodically and automatically clears push messages stored in the notification bar, or automatically clears push messages stored in the notification bar after being restarted. Consequently, the user may miss an important push message.

It should be noted that a display form of a push message is not specifically limited in this application. Herein, a display form of a message card is used as an example for description. The message card may also be referred to as a message bar or a message box. This is not specifically limited herein.

In this embodiment of this application, for a push message 1 having a persistence mark, the terminal device 100 makes a copy of the push message 1, stores the copy in a push message box, and may display the copy on a user interface of the push message box. The terminal device 100 deletes the push message 1 only after persistence duration of the push message 1 expires. In addition, when the push message 1 carries a global pinning-to-top mark, global pinning-to-top is performed on the push message 1 on the user interface of the push message box; when the push message 1 carries an in-app pinning-to-top mark, in-app pinning-to-top is performed on the push message 1 on the user interface of the push message box; and when the push message 1 carries a highlighting mark, highlighting is performed on the push message 1 on the user interface of the push message box. It may be understood that a global pinning-to-top display manner, an in-app pinning-to-top display manner, and/or a highlighting display manner can help the user quickly locate an important push message.

Figure 3C:
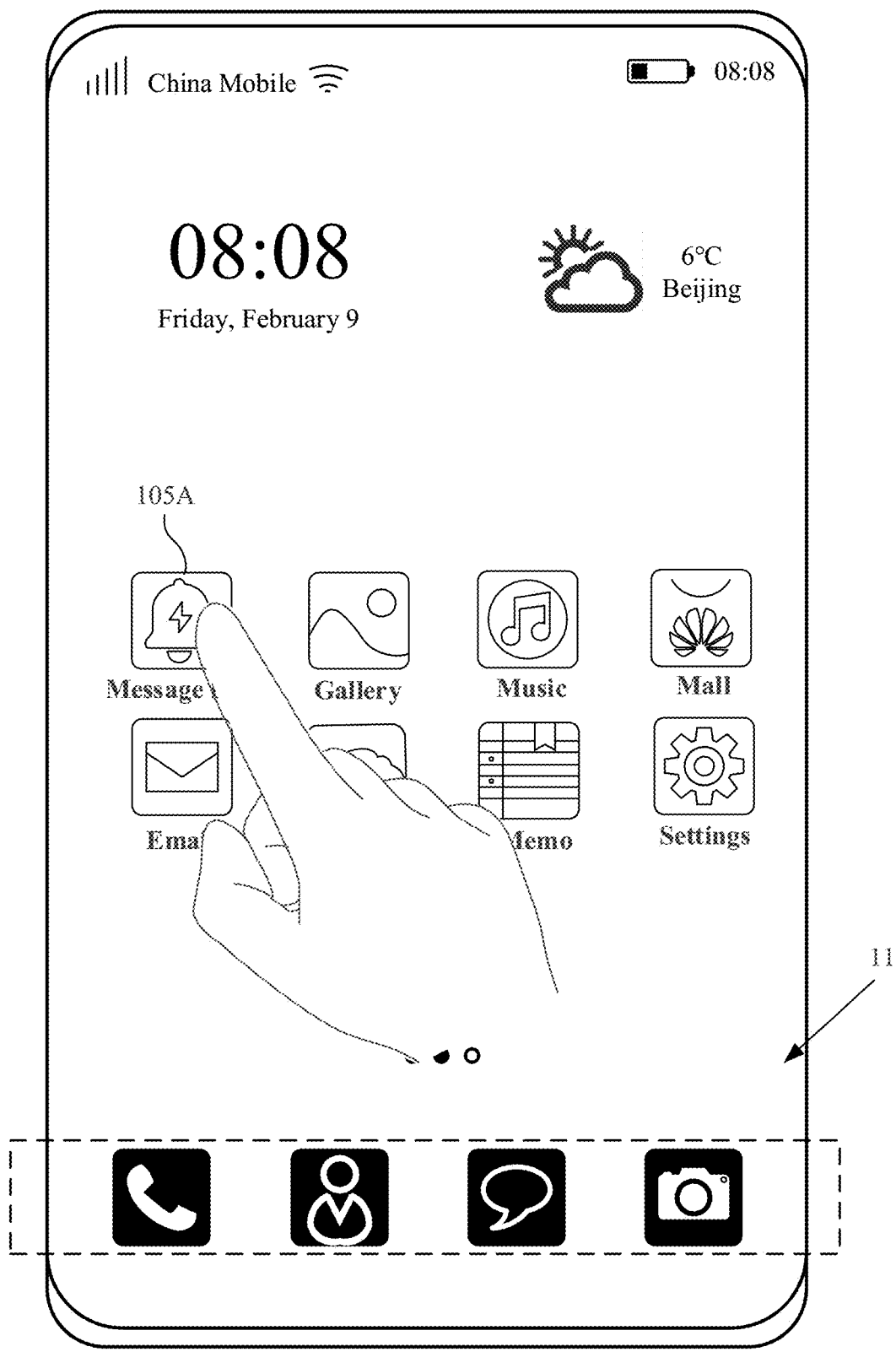
FIG. 3C to FIG. 3E are a schematic diagram of a user interface of a push message box according to an embodiment of this application.
Figure 3D:
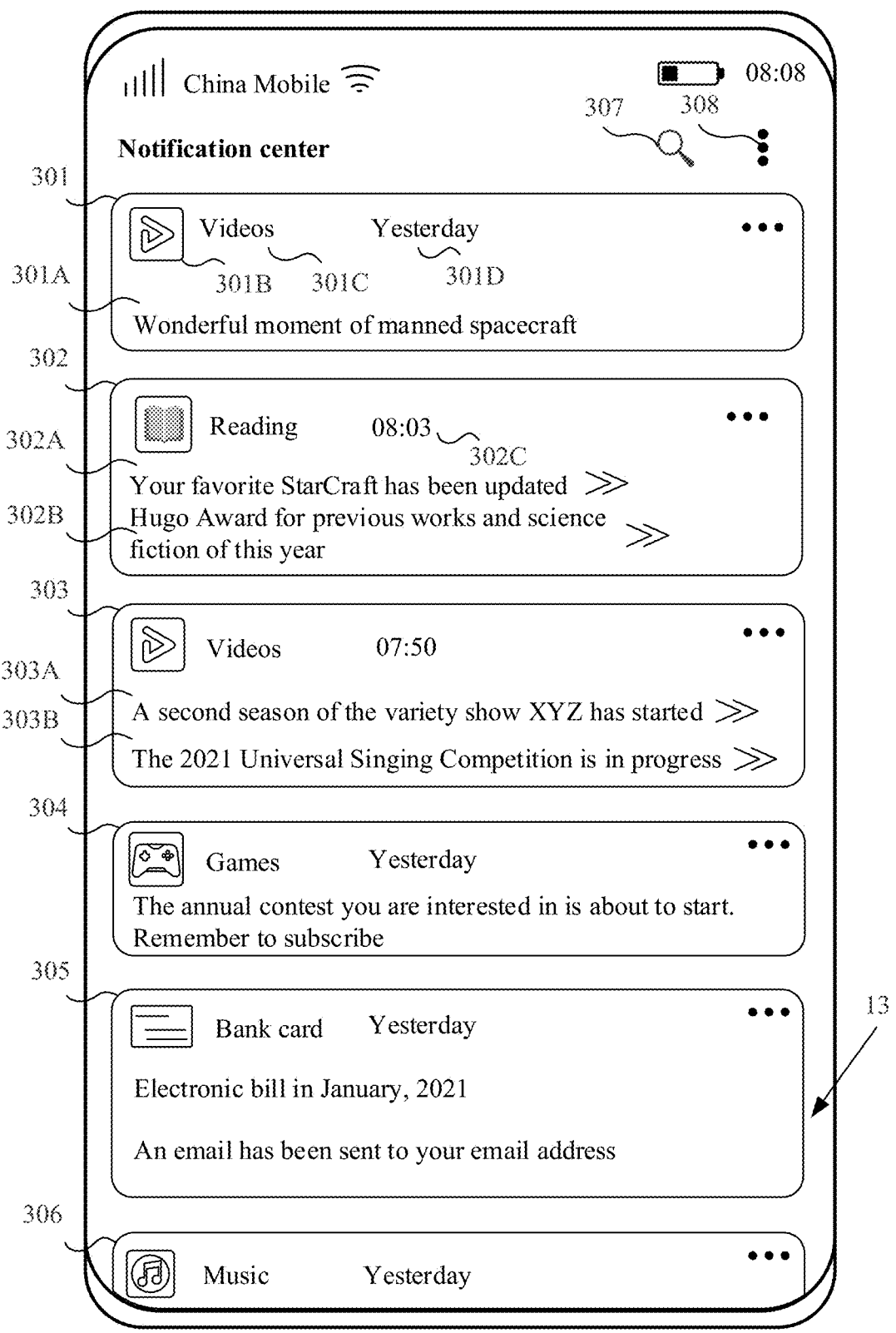

For example, the "Message box" icon 105A shown in FIG. 3C may receive an input operation (for example, a touch operation) of the user, and in response to the input operation, the terminal device 100 displays a user interface 13 of the push message box shown in FIG. 3D.

In some embodiments, the user interface 13 of the push message box includes several message cards. Each of the first N message cards (for example, a message card 301) may display a global pinning-to-top push message stored in the push message box, and message cards following the first N message cards are message cards corresponding to several apps that each have applied for a persistence service, for example, a message card 302 corresponding to a reading app, a message card 303 corresponding to a video app, a message card 304 corresponding to a game app, a message card 305 corresponding to a bank card app, and a message card 306 corresponding to a music app. N is a positive integer.

In some embodiments, the user interface 13 may further include a search control 307 and/or a setting control 308. The search control 307 is configured to: search, based on a character entered by the user, the push message box for a push message that is related to the character. The setting control 308 may receive an input operation (for example, a touch operation) of the user, and in response to the input operation, the terminal device 100 displays a setting interface of the push message box.

In some embodiments, when the push message box already displays N global pinning-to-top push messages, if the terminal device 100 receives another global pinning-to-top push message, global pinning-to-top on an earliest received push message in the N global pinning-to-top push messages is canceled.

A value of N is not specifically limited in this embodiment of this application. In some embodiments, a maximum value of N is 1, and the push message box can store only one global pinning-to-top message at a time. In some embodiments, a value of N may be greater than 1, and a top-to-bottom arrangement sequence of the N message cards on the user interface 13 may be a reverse sequence of receiving moments of global pinning-to-top push messages corresponding to the message cards. For example, the user interface 13 includes only one global pinning-to-top push message. As shown in FIG. 3D, the first message card 301 on a top of the user interface 13 includes a global pinning-to-top push message 301A. Optionally, the message card 301 may further include at least one of an app icon 301B and an app name 301C that are of an app (that is, a video app) corresponding to the push message 301A, and a receiving moment 301D of the push message 301A.

It may be understood that, when the push message box does not store a global pinning-to-top push message, the user interface 13 does not include a message card corresponding to the global pinning-to-top push message.

In some embodiments, a message card corresponding to each app may manage a plurality of push messages. However, on the user interface 13, the message card may display a maximum of M push messages, and other push messages managed by the message card are folded and not displayed. M is a positive integer. A value of M is not specifically limited in this embodiment of this application. For example, M is equal to 1, or M is equal to 2, or M is equal to 3. In a subsequent embodiment, an example in which M is equal to 2 is used for description. For example, the push message box stores at least two non-global pinning-to-top push messages of the reading app, at least two non-global pinning-to-top push messages of the video app, one non-global pinning-to-top push message of the game app, and one non-global pinning-to-top push message of the bank card app. As shown in FIG. 3D, the message card 302 of the reading app includes a push message 302A and a push message 302B, the message card 303 of the video app includes a push message 303A and a push message 303B, and the message card 304 of the game app and the message card 305 of the bank card app each include one push message.

In some embodiments, a message card corresponding to each app (for example, the app 1) may receive an input operation of the user, and in response to the input operation, the terminal device 100 may display more push messages managed by the message card of the app 1.

In some embodiments, the message card corresponding to each app further includes a receiving moment of a push message recently received by the app. For example, the message card 302 further includes a receiving moment 302C of a push message recently received by the reading app.

In some embodiments, a message card corresponding to each app manages a maximum of K in-app pinning-to-top push messages, where K is a positive integer. A value of K is not specifically limited in this embodiment of this application. For example, K is equal to 1, or K is equal to 2, or K is equal to 3. Optionally, a top-to-bottom arrangement sequence of the first K in-app pinning-to-top push messages displayed in the message card corresponding to each app is a reverse sequence of receiving moments of the push messages. A top-to-bottom arrangement sequence of non-in-app pinning-to-top push messages displayed in the message card corresponding to each app is also a reverse sequence of receiving moments of the push messages. In a subsequent embodiment, an example in which a value of K is 1 is used for description. It may be understood that, if the push message box stores an in-app pinning-to-top push message of the app 1, the $1^{st}$ push message displayed in the message card corresponding to the app 1 is the in-app pinning-to-top push message; otherwise, the $1^{st}$ push message displayed in the message card corresponding to the app 1 is a non-in-app pinning-to-top push message.

In some embodiments, a value of M, a value of N, and/or a value of K may be preset by the user, or may be preset by the terminal device 100. This is not specifically limited herein.

In some embodiments, a top-to-bottom arrangement sequence of message cards corresponding to apps on the user interface 13 may be a reverse sequence of latest receiving moments of push messages managed by the message cards corresponding to the apps. To be specific, for two apps that sequentially receive non-global pinning-to-top push messages, a message card of an app receiving a push message later is closer to a top of the terminal device 100 than a message card of an app receiving a push message currently.

Figure 3E:
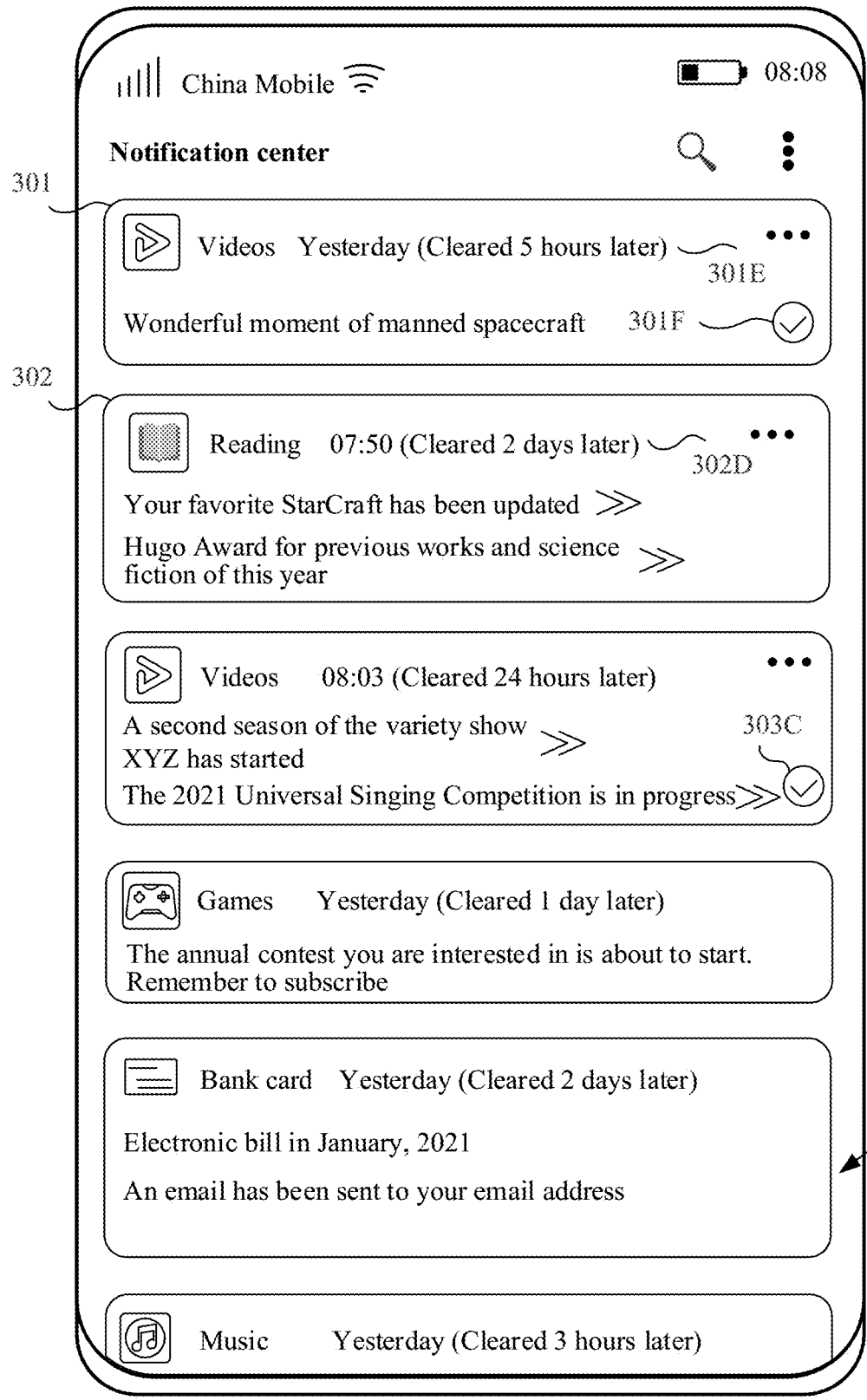

In this embodiment of this application, after persistence duration of each persistence push message expires, the push message box deletes the push message. In some embodiments, a message card of a global pinning-to-top push message further includes a deletion time point of the push message, and a message card of an app further includes a deletion time point of a push message recently received by the app. For example, as shown in FIG. 3E, the message card 301 further includes a deletion time point 301E of the push message 301A, and the message card 302 further includes a deletion time point 302D of a push message recently received by the reading app.

In some embodiments, a view state of each push message is further identified on the user interface 13, and the view state of the push message may include read and/or unread. For example, as shown in FIG. 3E, when the global pinning-to-top push message has been viewed by the user, the terminal device 100 identifies the push message by using a read icon 301F; and when the push message 303B in the message card 303 of the video app has been viewed, the terminal device 100 identifies the push message by using a read icon 303C. In this embodiment of this application, a push message that is not viewed by the user may be identified by using an unread identifier.

It should be noted that, in an implementation, the push message box may be a system application independent of the notification bar, and the "Message box" icon 105A is a shortcut entry of the system application. In another implementation, the push message box may be a function implementation of the notification bar, and the "Message box" icon 105A is a shortcut entry of the function. This is not specifically limited in this application.

Figure 3F:
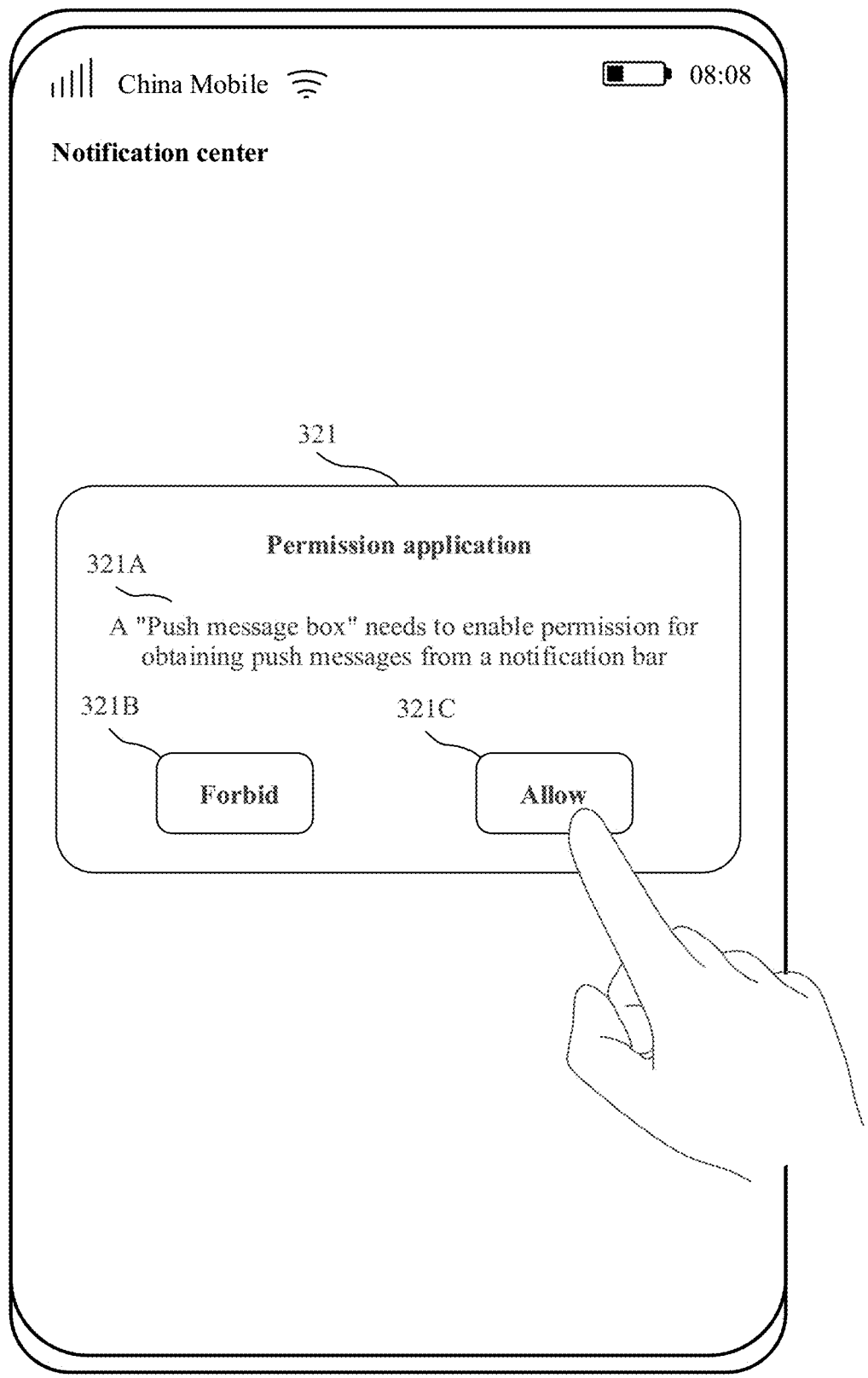
FIG. 3F to FIG. 3I are a schematic diagram of a user interface for opening a push message box according to an embodiment of this application.

In some embodiments, the push message box is an application independent of the notification bar. The push message box may obtain a push message in the notification bar in real time, and manage and display the obtained push message. Optionally, the push message box can obtain a push message in the notification bar only after the user enables permission of the push message box to obtain a push message in the notification bar. For example, after the "Message box" icon 105A receives an input operation of the user, the terminal device 100 first displays a permission application box 321 shown in FIG. 3F. The permission application box 321 includes prompt information 321A, a "Forbid" control 321B, and an "Allow" control 321C. The prompt information 321A is used to prompt the user that the "push message box" needs to enable the permission to obtain a push message in the notification bar. The "Forbid" control 321B is used to reject the permission application and close the permission application box 321. The "Allow" control 321C is used to allow the permission application. For example, in response to an input operation on the "Allow" control 321C, the terminal device 100 allows the push message box to obtain a push message in the notification bar, and displays, based on the push message obtained by the push message box, the user interface 13 of the push message box shown in FIG. 3D.

Figure 3G:
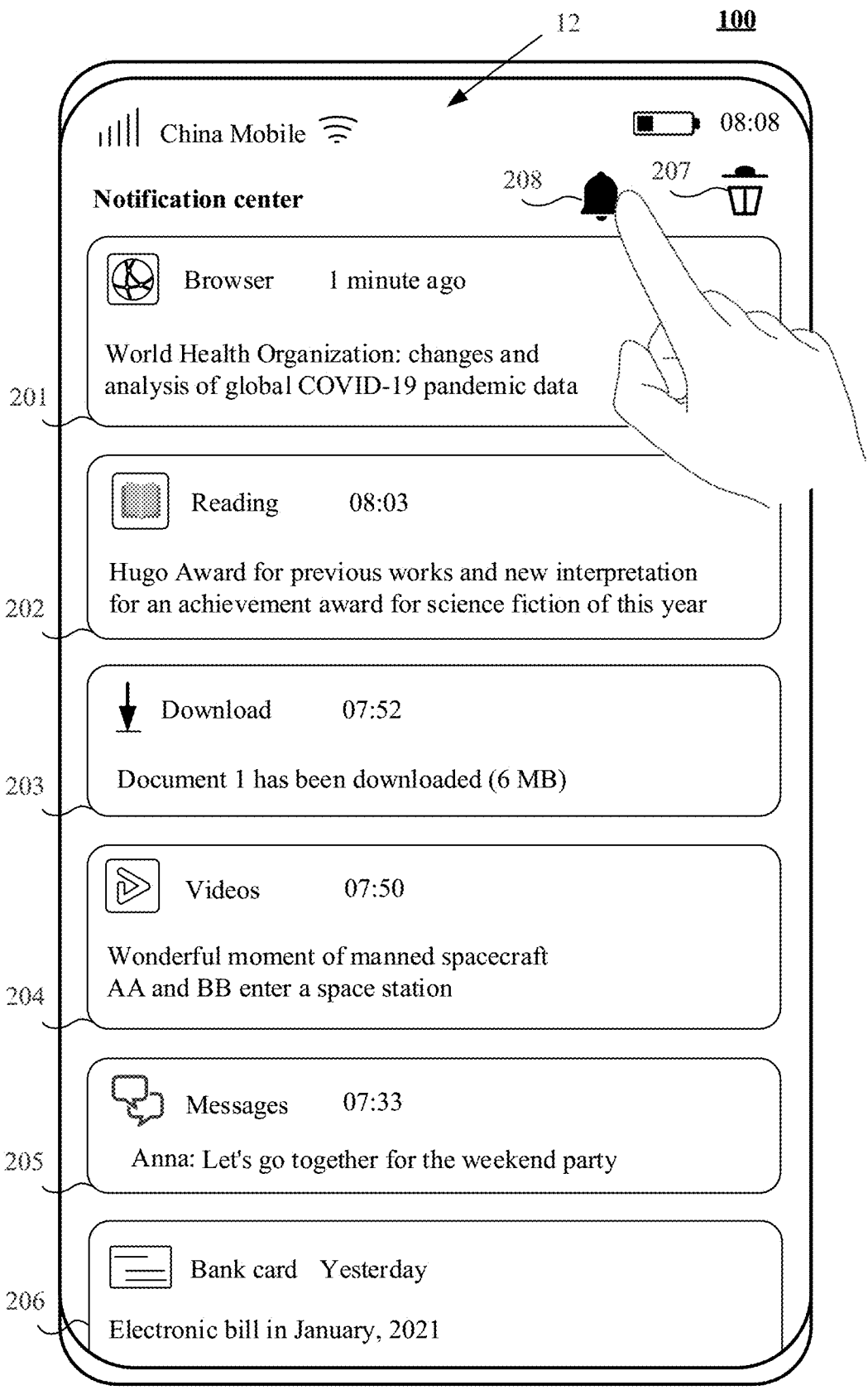
Figure 3H:
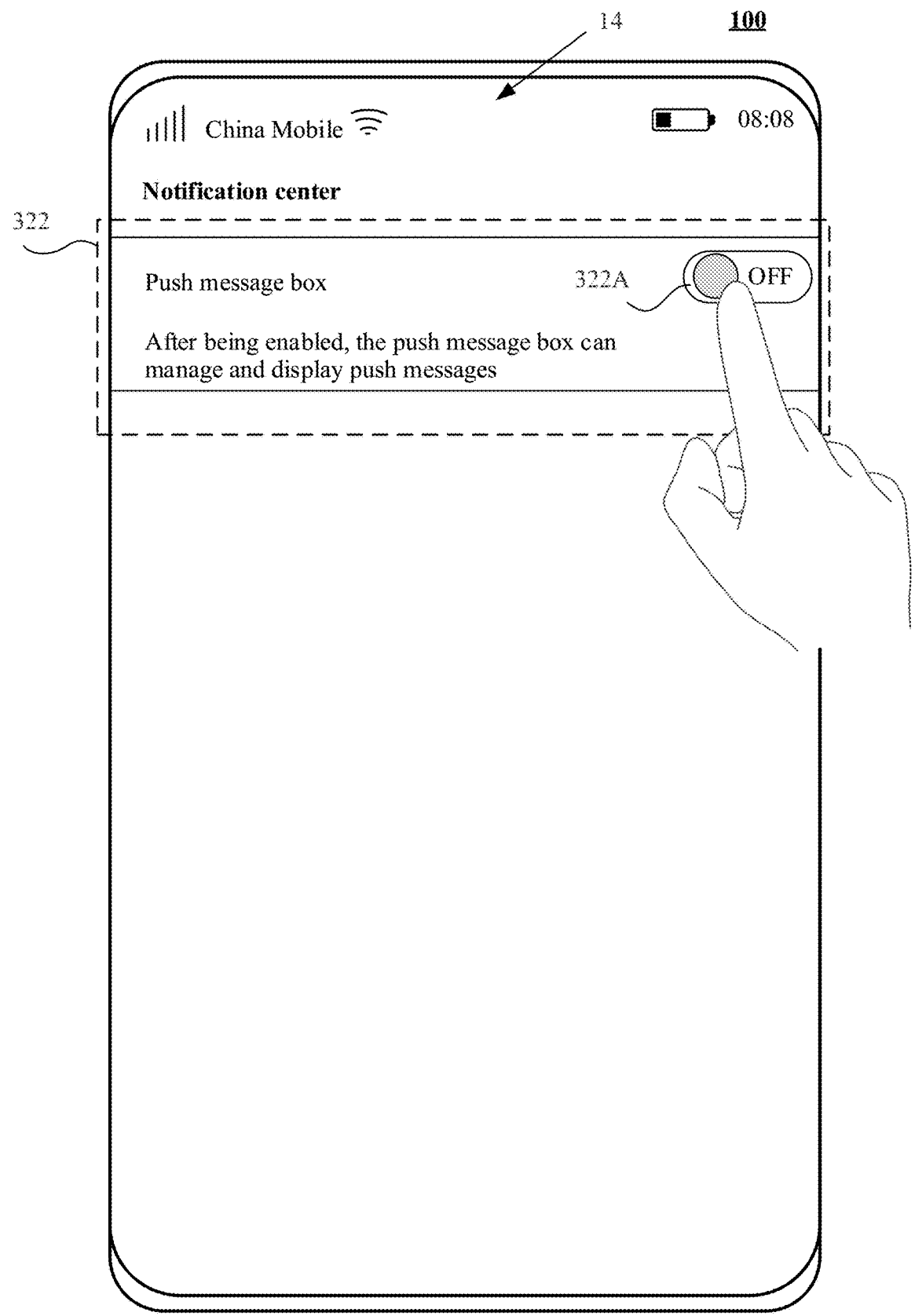
Figure 3I:
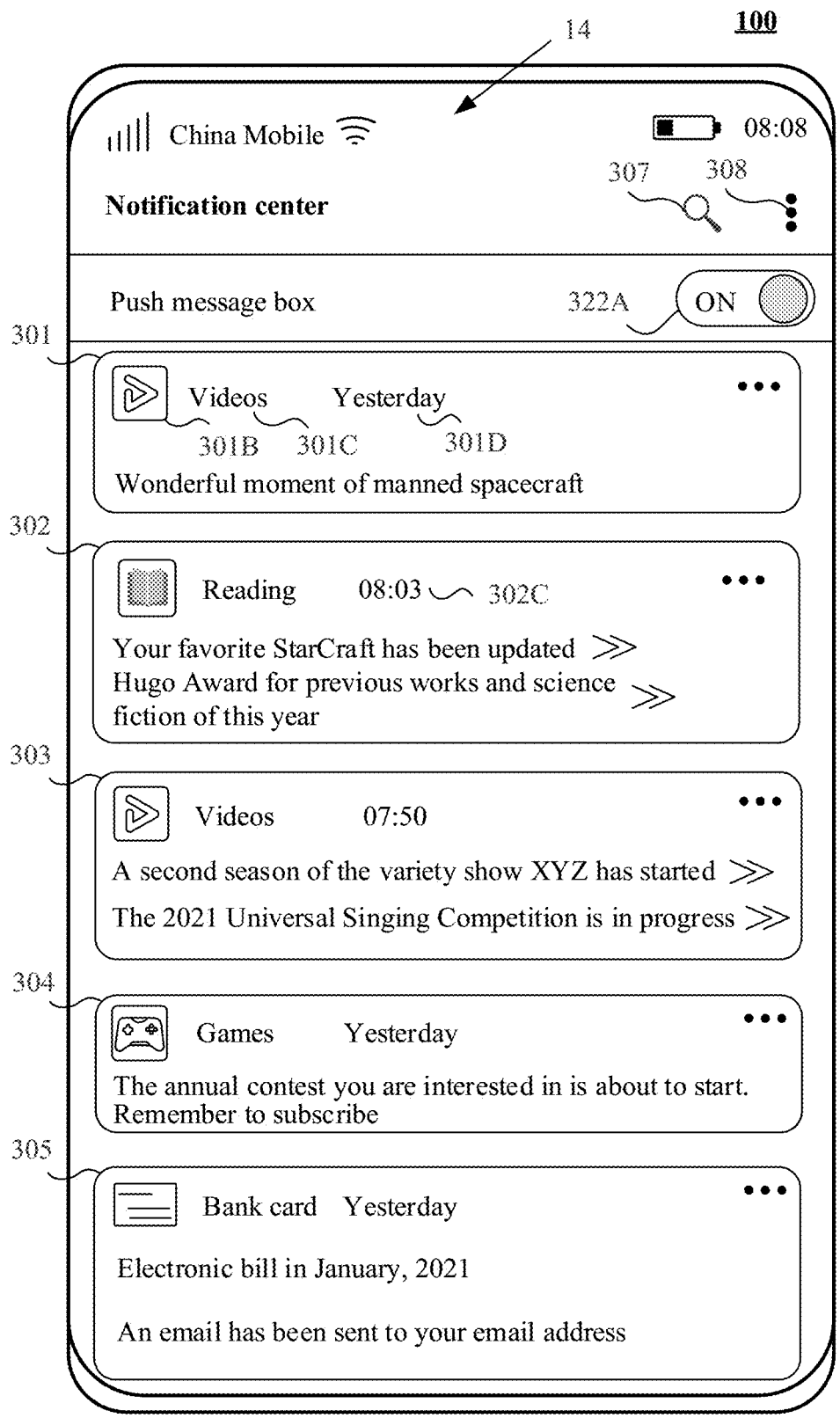

In some embodiments, the push message box is a function implementation of the notification bar. The terminal device 100 can manage and display a push message by using the push message box only after the user enables a function of the push message box in the notification bar. For example, the notification bar interface 12 may further include a control 208 shown in FIG. 3G. As shown in FIG. 3H, in response to an input operation on the control 208, the terminal device 100 may display a function control bar 322 of the push message box on a user interface 14, where the function control bar 322 includes an "ON/OFF" control 322A. When the "ON/OFF" control 322A is in an ON (ON) state, the function of the push message box is enabled; or when the "ON/OFF" control 322A is in an OFF (OFF) state, the function of the push message box is disabled. For example, in response to an input operation (for example, a touch operation) for the "ON/OFF" control 322A, the terminal device may switch a state of the "ON/OFF" control 322A to an ON state shown in FIG. 3I, and displays the message card 301 to the message card 305 on the user interface 14 based on push messages received by the notification bar. Optionally, in response to the input operation, the search control 307 and/or the setting control 308 are/is further displayed on the user interface 14. In some embodiments, after the user enables the function of the push message box by using the "ON/OFF" control 322A, in response to the input operation on the "Message box" icon 105A, the terminal device 100 may display the user interface 14 shown in FIG. 3I.

In some embodiments, in response to the input operation of the user shown in FIG. 3A, the terminal device 100 displays the user interface 13, and the user interface 13 is the notification bar interface of the terminal device 100.

The following uses the terminal device 100 shown in FIG. 3D as an example to describe a user interface displayed after the terminal device 100 receives various persistence push messages. For example, on the user interface 13 shown in FIG. 3D, the push message 301A is global pinning-to-top, and the push message 302A and the push message 303A are in-app pinning-to-top.

In some embodiments, for example, a value of N is 1. After receiving a global pinning-to-top push message (for example, a push message 309A), the terminal device 100 converts a global pinning-to-top push message (for example, the push message 301A shown in FIG. 3D) currently set by the system into a non-global pinning-to-top push message, and sets the push message 309A to a global pinning-to-top push message. In addition, after the push message 301A of the video app is converted into a non-global pinning-to-top push message, the message card 303 of the video app manages the push message 301A. Optionally, the push message 301A is a non-in-app pinning-to-top push message of the video app, and the message card 303 sorts and displays the push message 301A based on a receiving moment of the push message 301A.

Figure 4A:
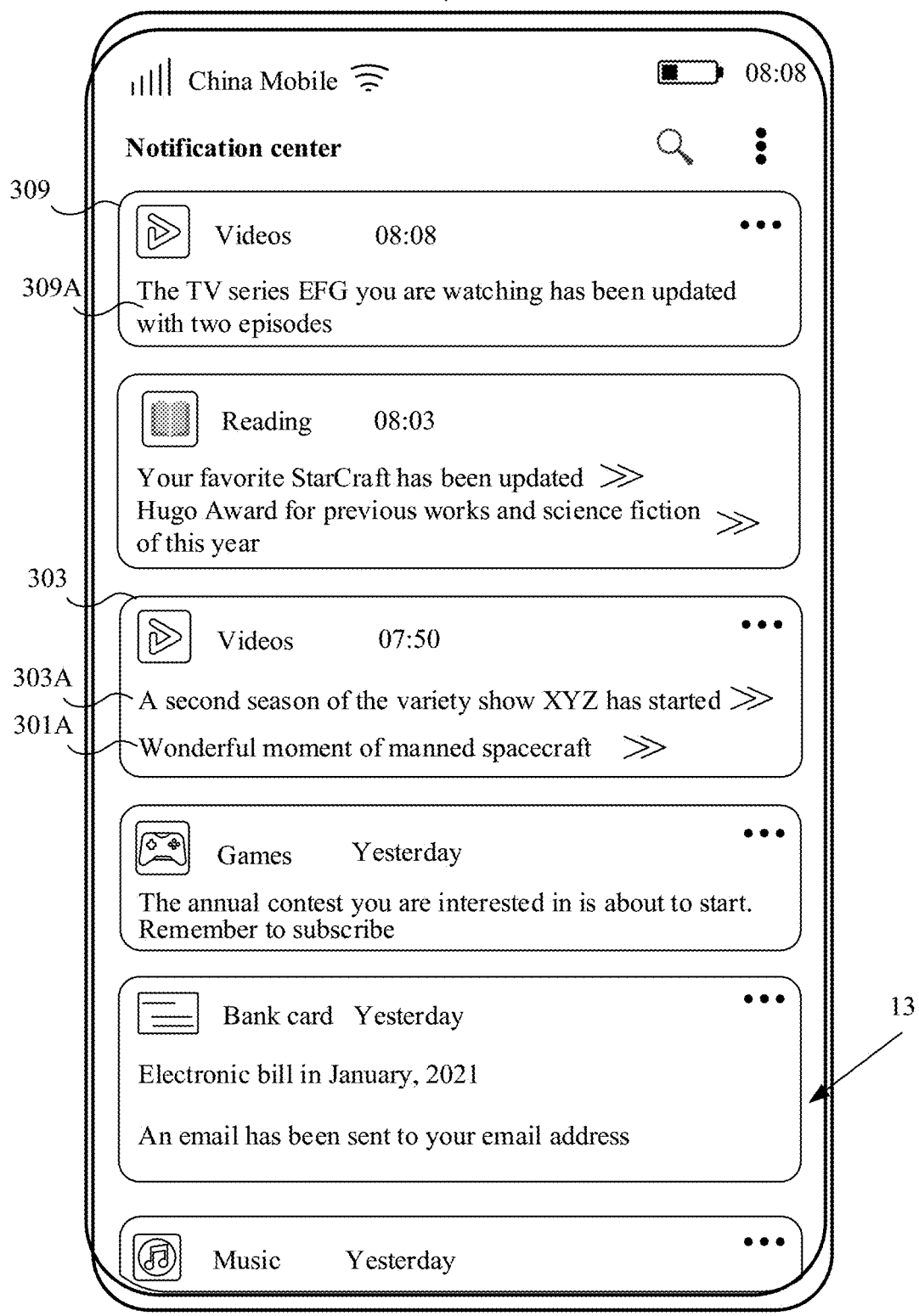
FIG. 4A is a schematic diagram of a user interface displayed after a global pinning-to-top push message is received according to an embodiment of this application.

For example, after the terminal device 100 shown in FIG. 3D receives the push message 309A shown in FIG. 4A, the terminal device displays, on the user interface 13, a message card 309 corresponding to the push message 309A shown in FIG. 4A. The message card 309 is the $1^{st}$ message card at the top of the user interface 13 shown in FIG. 4A. Optionally, the push message 301A is a recently received push message of the video app except the in-app pinning-to-top push message 303A. After global pinning-to-top on the push message 301A is cancelled, the push message 301A is displayed as a push message following the push message 303A in the message card 303 of the video app.

Figure 4B:
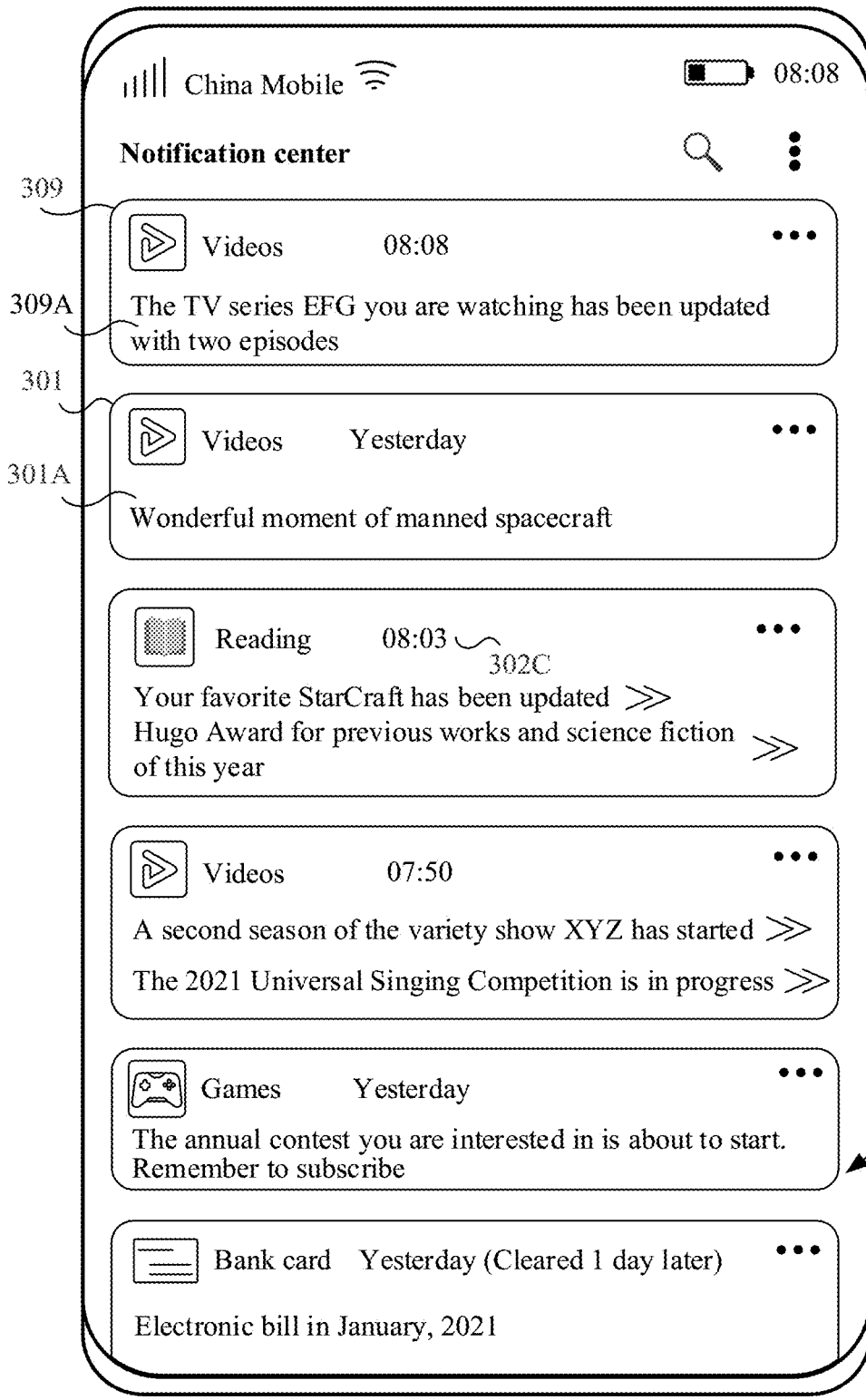
FIG. 4B is a schematic diagram of a user interface displayed after an in-app pinning-to-top push message is received according to an embodiment of this application.

In some embodiments, for example, a value of N is 2. The user interface 13 shown in FIG. 3D currently displays only one global pinning-to-top push message 301A. For example, as shown in FIG. 4B, after receiving a global pinning-to-top push message (for example, the push message 309A), the terminal device 100 shown in FIG. 3D moves downward a global pinning-to-top push message (for example, the push message 301A shown in FIG. 3D) currently set by the system, displays the push message as the $2^{nd}$ push message at the top of the user interface 13, and sets the push message 309A to a global pinning-to-top push message.

In some embodiments, after receiving an in-app pinning-to-top push message (for example, the push message 303D), the terminal device 100 performs in-app pinning on the push message 303D in the message card 303 of the corresponding video app. Optionally, a value of K is greater than 1. After the terminal device 100 receives the push message 303D, the current $1^{st}$ in-app pinning-to-top push message 303A of the video app is moved downwards to be the $2^{nd}$ in-app pinning-to-top push message of the video app. Optionally, a value of K is 1. After receiving the push message 303D, the terminal device 100 cancels in-app pinning of the current $1^{st}$ push message 303A of the video app. The message card 303 sorts and displays the push message 303A based on a receiving moment of the push message 303A. In a subsequent embodiment, an example in which a value of K is 1 is used for description.

Figure 4C:
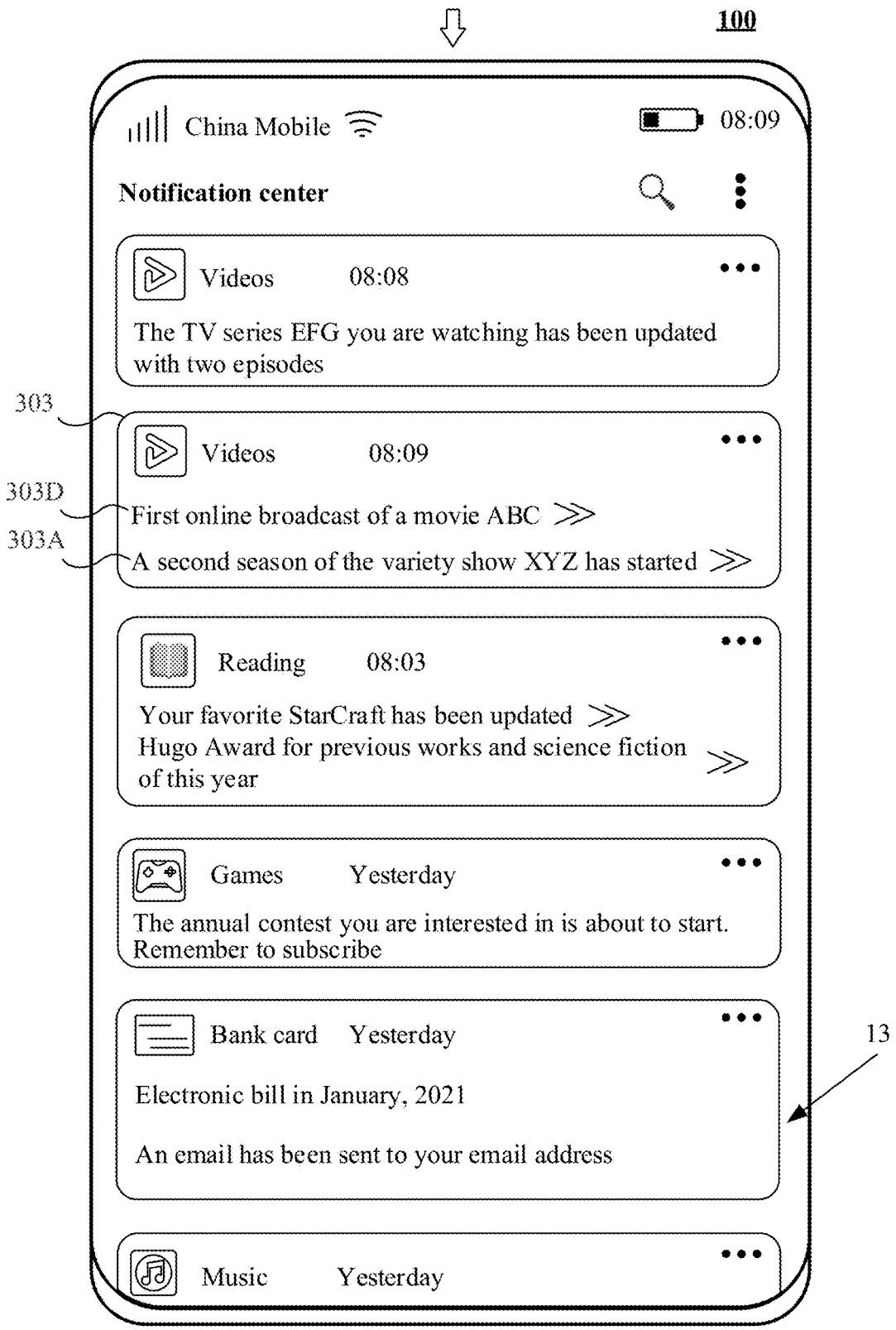
FIG. 4C to FIG. 4F are a schematic diagram of a user interface displayed after a highlighted push message is received according to an embodiment of this application.

For example, as shown in FIG. 4C, after receiving the push message 303D, the terminal device 100 shown in FIG. 4A cancels in-app pinning of the push message 303A, displays the push message 303D as the $1^{st}$ push message in the message card 303, and displays the push message 303A as the $2^{nd}$ push message in the message card 303.

In some embodiments, after receiving a highlighted push message (for example, a push message 302E), the terminal device 100 displays, in the message card 302 of the reading app corresponding to the push message 302E, the push message as the $1^{st}$ one of non-in-app pinning-to-top push messages based on a receiving moment of the push message. In addition, the push message is highlighted during display.

Figure 4D:
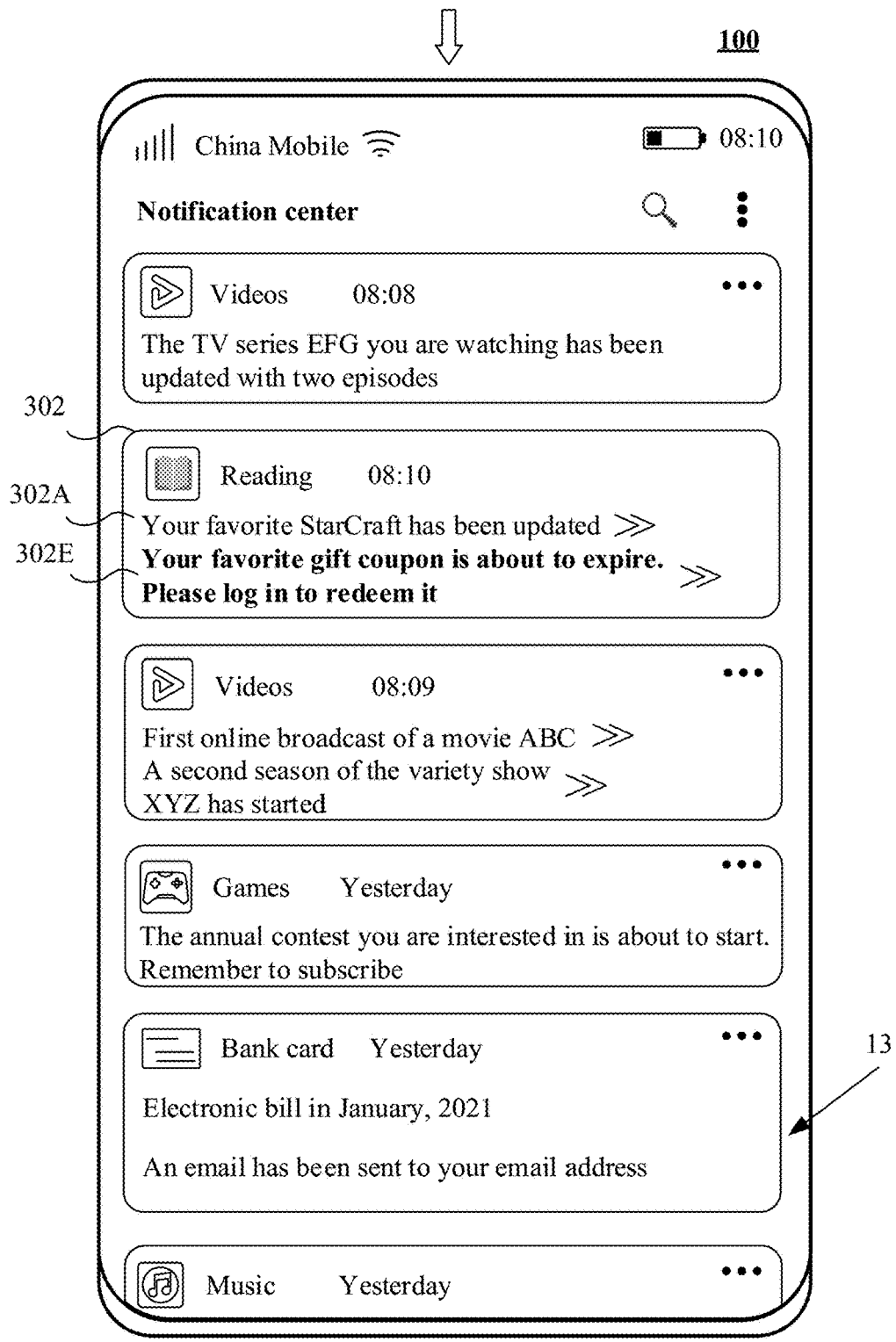

For example, the push message 302A in the message card 302 of the reading app shown in FIG. 4C is in-app pinning-to-top. As shown in FIG. 4D, after receiving the push message 302E, the terminal device 100 shown in FIG. 4C displays the push message 302E as the $2^{nd}$ push message in the message card 303, and displays displayed content of the push message 302E in bold.

Figure 4E:
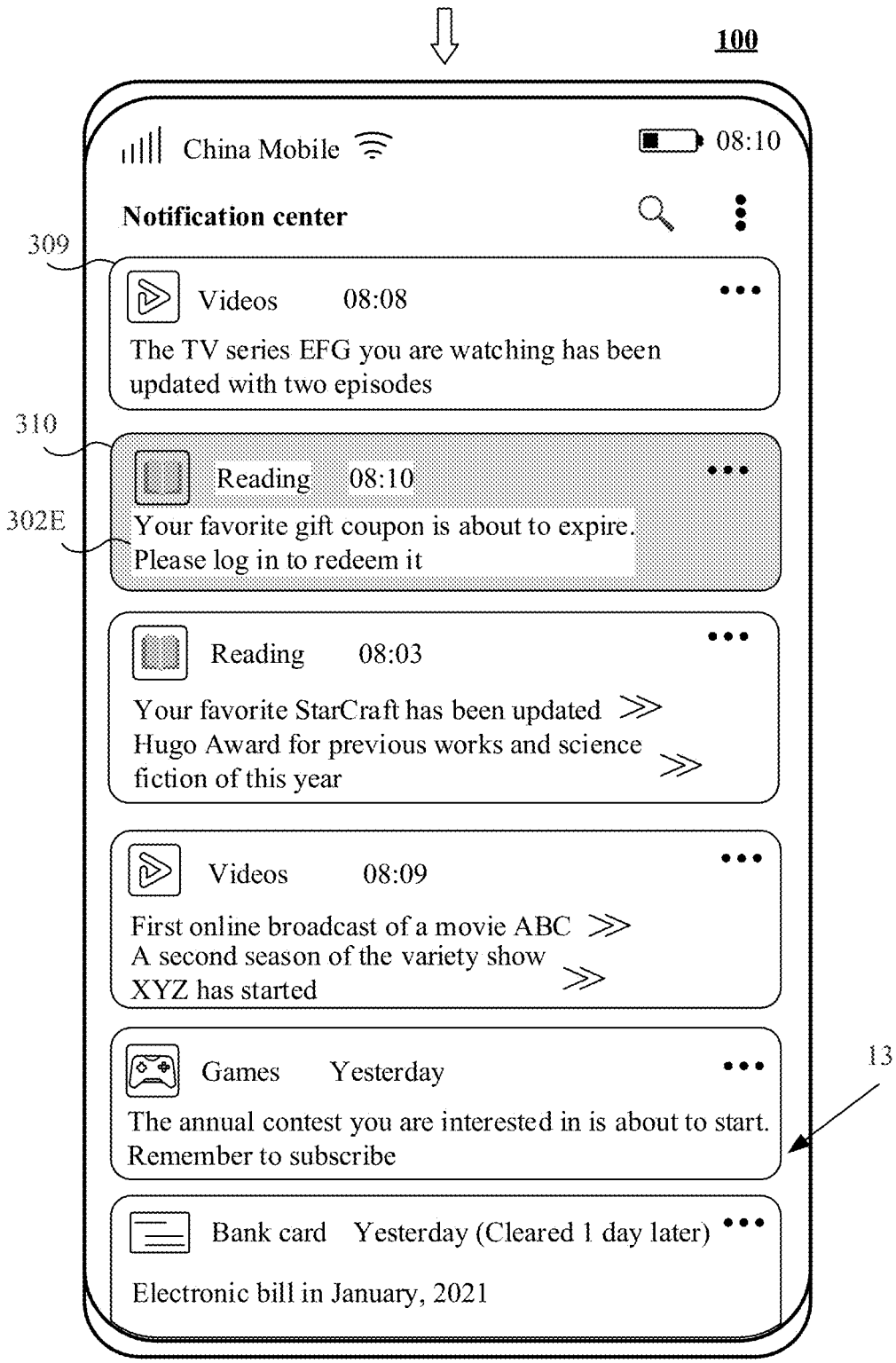

In some embodiments, after receiving a highlighted push message (for example, the push message 302E), the terminal device 100 separately displays the push message 302E on a newly created message card, and highlights the message during the display process. Optionally, the newly created message card is adjacent to the message card 302 of the reading app corresponding to the push message 302E, and is closer to a top of the terminal device 100. For example, as shown in FIG. 4E, after the terminal device 100 shown in FIG. 4C receives the push message 302E, the terminal device 100 displays the push message 302E on a message card 310, and highlights background light of the message card 310.

Figure 4F:
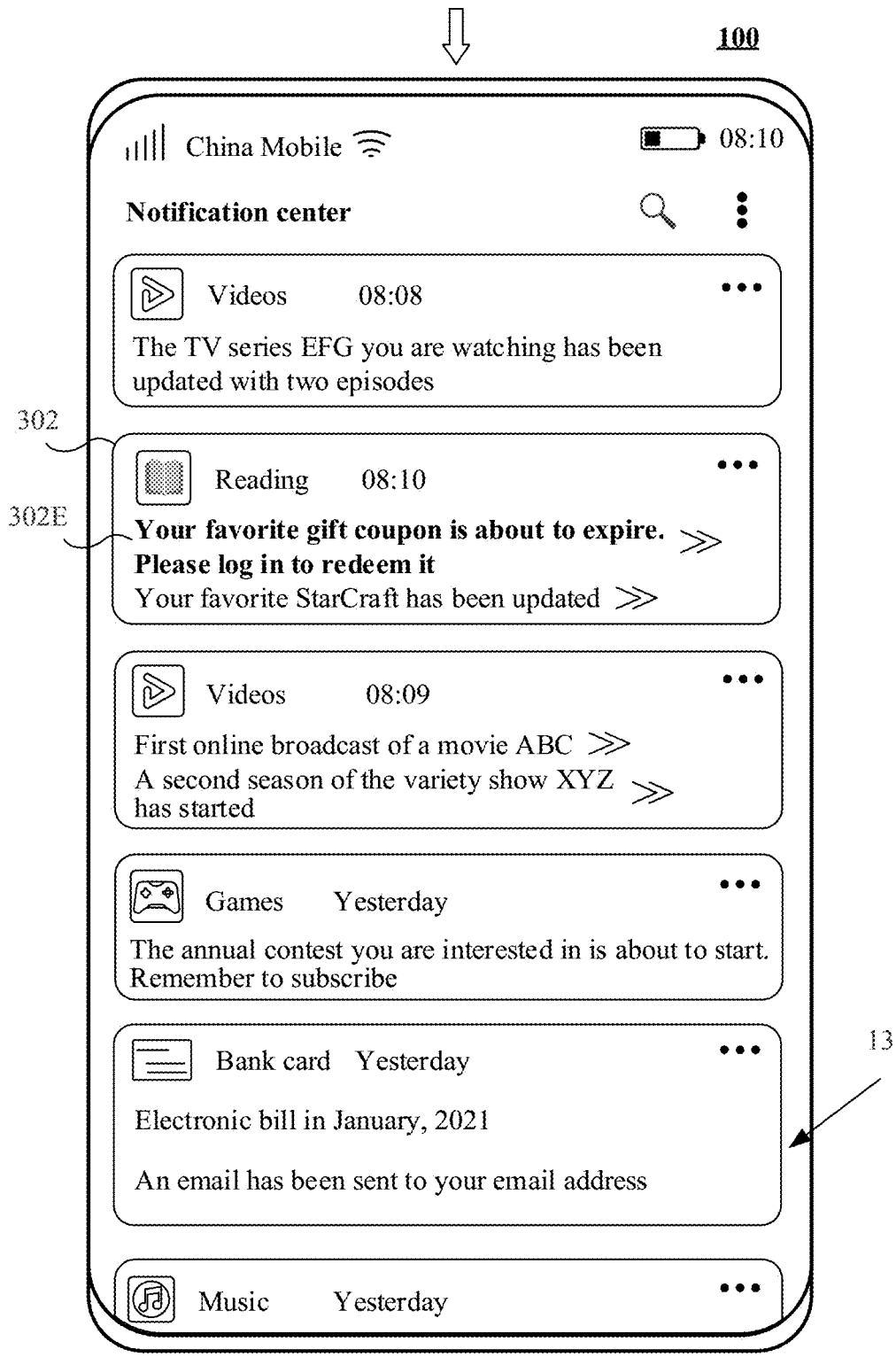

In some embodiments, after receiving an in-app pinning-to-top and highlighted push message (for example, the push message 302E), the terminal device 100 simultaneously performs in-app pinning and highlighting on the push message 302E in the message card 302 of the reading app. For example, as shown in FIG. 4F, after receiving the in-app pinning-to-top and highlighted push message 302E, the terminal device 100 shown in FIG. 4C displays the push message 302E as the $1^{st}$ push message in the message card 302, and displays the displayed content of the push message 302E in bold.

It may be understood that the push message 302E may be more eye-catching after being highlighted. A specific implementation of highlighting is not limited in this embodiment of this application.

In this embodiment of this application, for a push message displayed in the push message box, the user may manually set an information state of the push message based on a requirement and a hobby of the user. The information state of the push message includes a pinning-to-top state, a highlighted state, a viewed state, and the like of the push message.

The following uses the user interface 13 of the push message box shown in FIG. 4E as an example to describe in detail how the user manually sets the information state of the push message.

In some embodiments, a push message on the user interface 13 of the push message box is obtained by the terminal device 100 from the notification bar in real time. An arrangement sequence of push messages on the user interface 13 may be the same as or different from an arrangement sequence of push messages in the notification bar. This is not specifically limited herein.

In this embodiment of this application, a push message 1 displayed on the user interface 13 may receive an input operation of the user, and in response to the input operation, the terminal device 100 may change a pinning-to-top state of the push message 1 on the user interface 13. The pinning-to-top state of the push message 1 includes a global pinning-to-top state, an in-app pinning-to-top state, or a non-global and non-in-app pinning-to-top state.

Figure 5A:
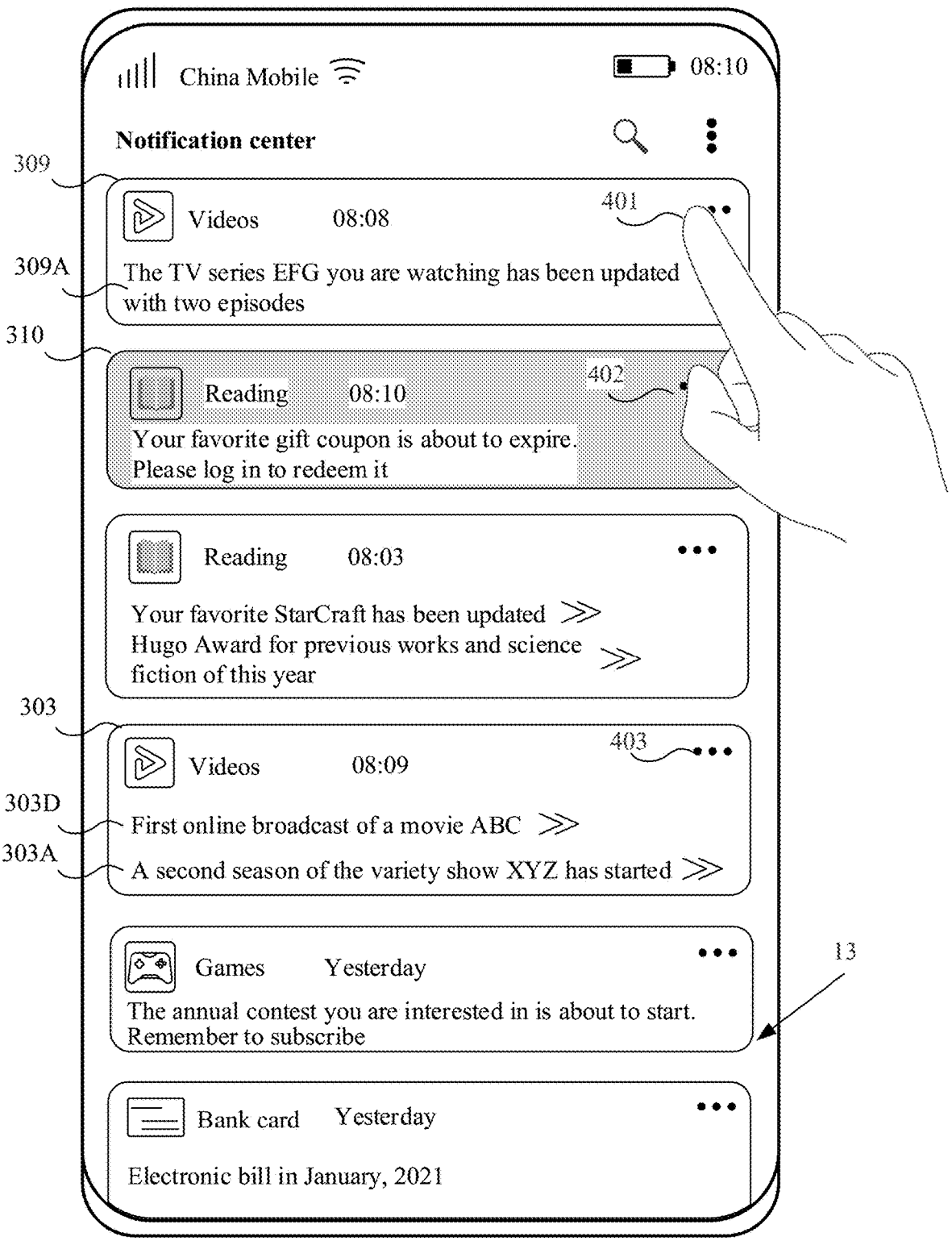
FIG. 5A to FIG. 5G are a schematic diagram of a user interface for manually setting a pinning-to-top state according to an embodiment of this application.

In some embodiments, each message card on the user interface 13 further includes a pinning-to-top control used to change a pinning-to-top state. For example, as shown in FIG. 5A, a message card 309 includes a pinning-to-top control 401, a message card 310 includes a pinning-to-top control 402, and a message card 303 includes a pinning-to-top control 403.

For a global pinning-to-top push message, the following uses the message card 309 as an example to describe how a user manually sets a pinning-to-top state of the push message.

Figure 5B:
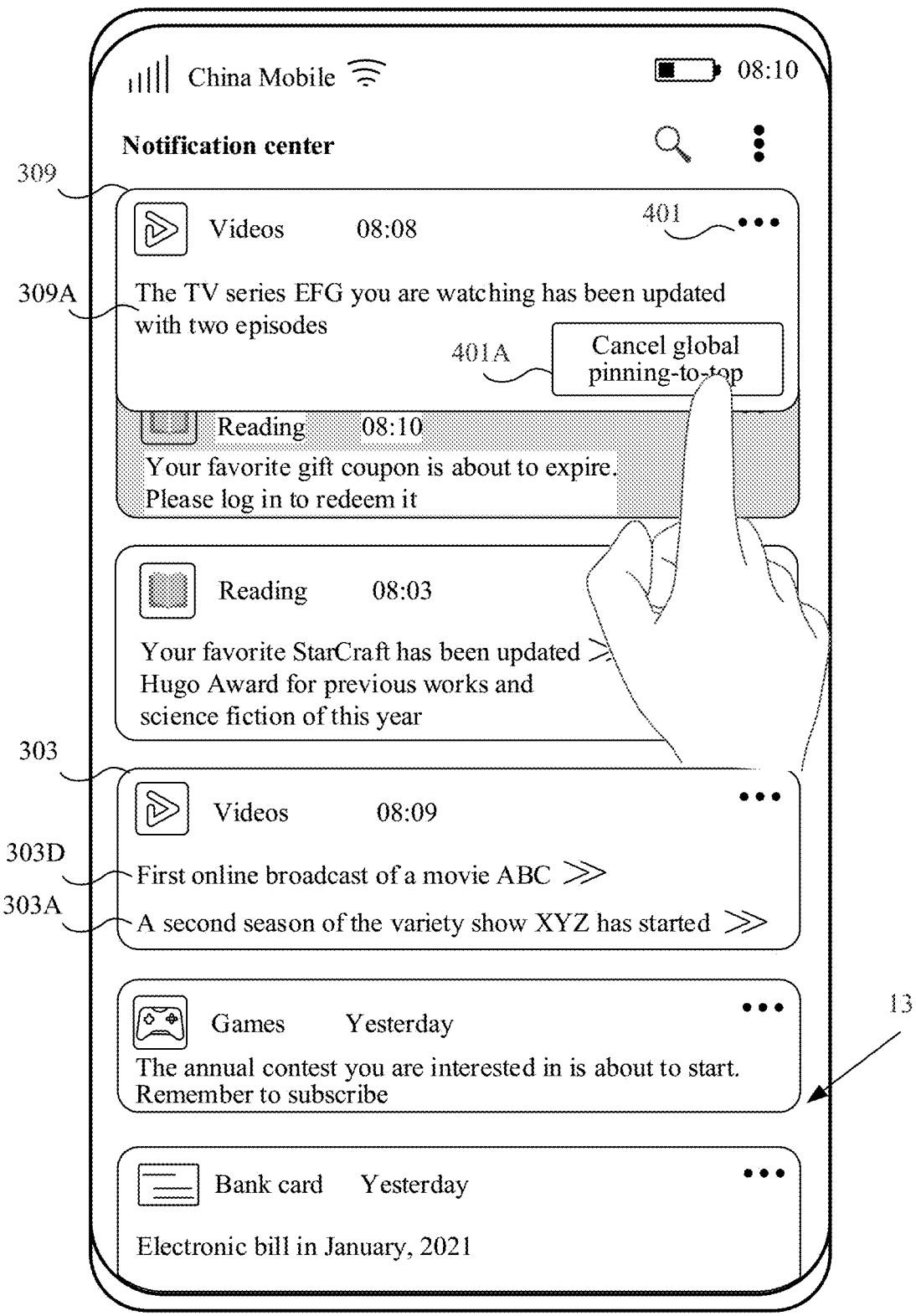
Figure 5C:
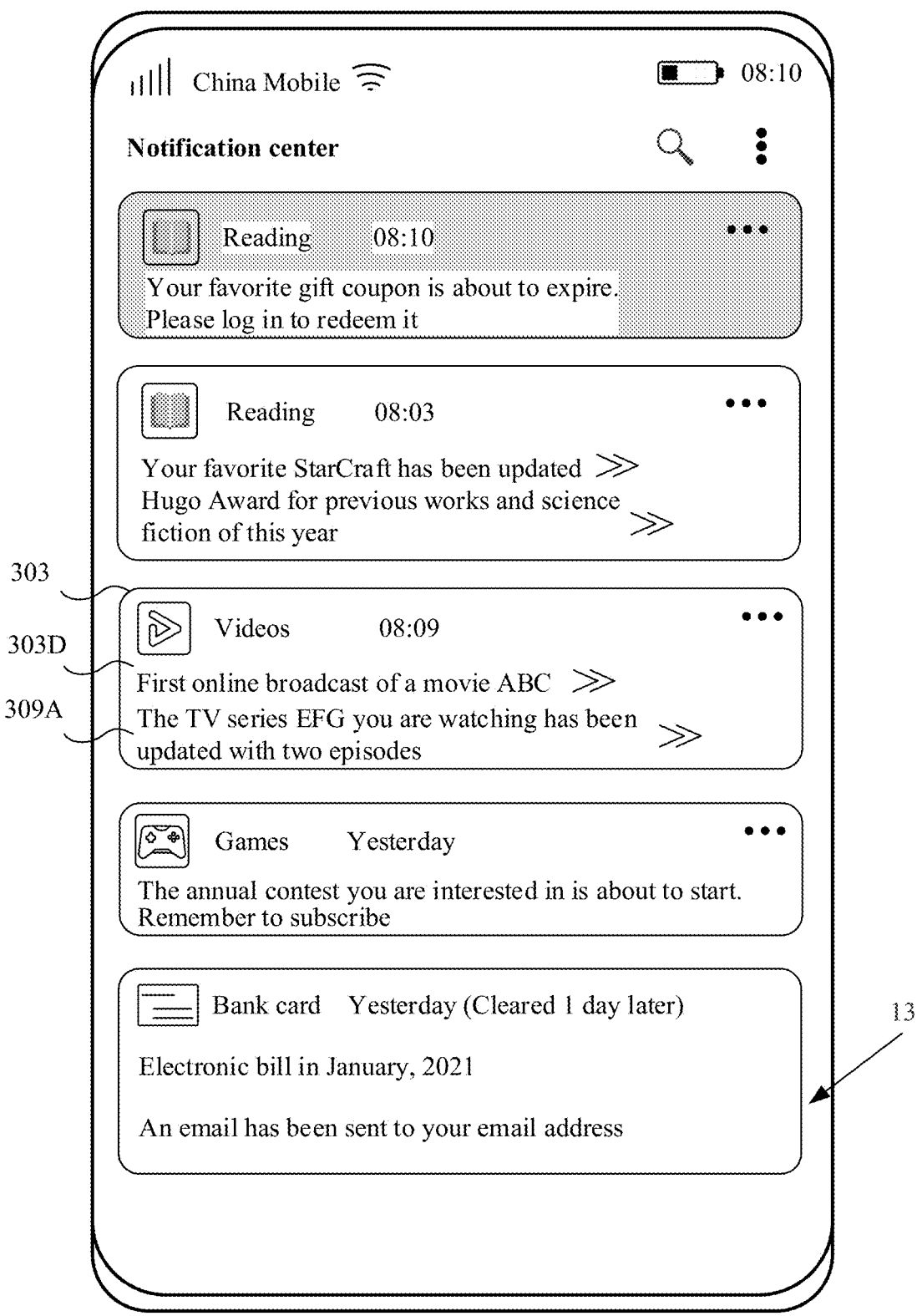

The message card 309 includes only one global pinning-to-top push message 309A of the video app. The pinning-to-top control 401 may receive an input operation (for example, a touch operation) of the user. In response to the input operation, the terminal device 100 displays a "Cancel global pinning-to-top" control 401A shown in FIG. 5B. The "Cancel global pinning-to-top" control 401A may receive an input operation (for example, a touch operation) of the user. In response to the input operation, the terminal device 100 cancels global pinning-to-top on the push message 309A, and sorts and displays the push message 309A by using the message card 303 of the video app. For example, as shown in FIG. 5C, in response to the input operation, the push message 309A is displayed as the $2^{nd}$ push message in the message card 303.

For a message card including only one non-global pinning-to-top push message, the following uses the message card 310 as an example to describe how a user manually sets a pinning-to-top state of the push message.

Figure 5D:
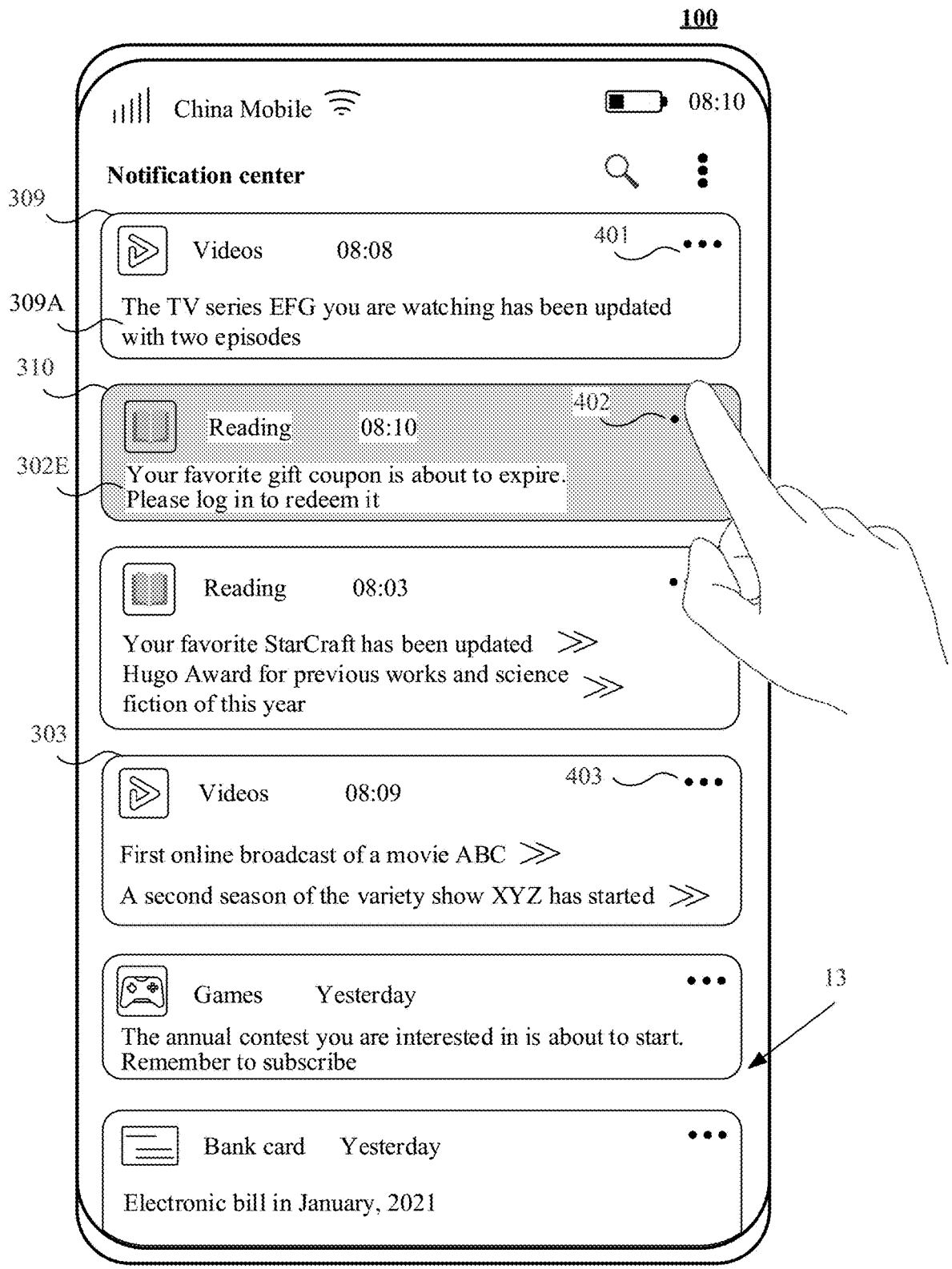
Figure 5E:
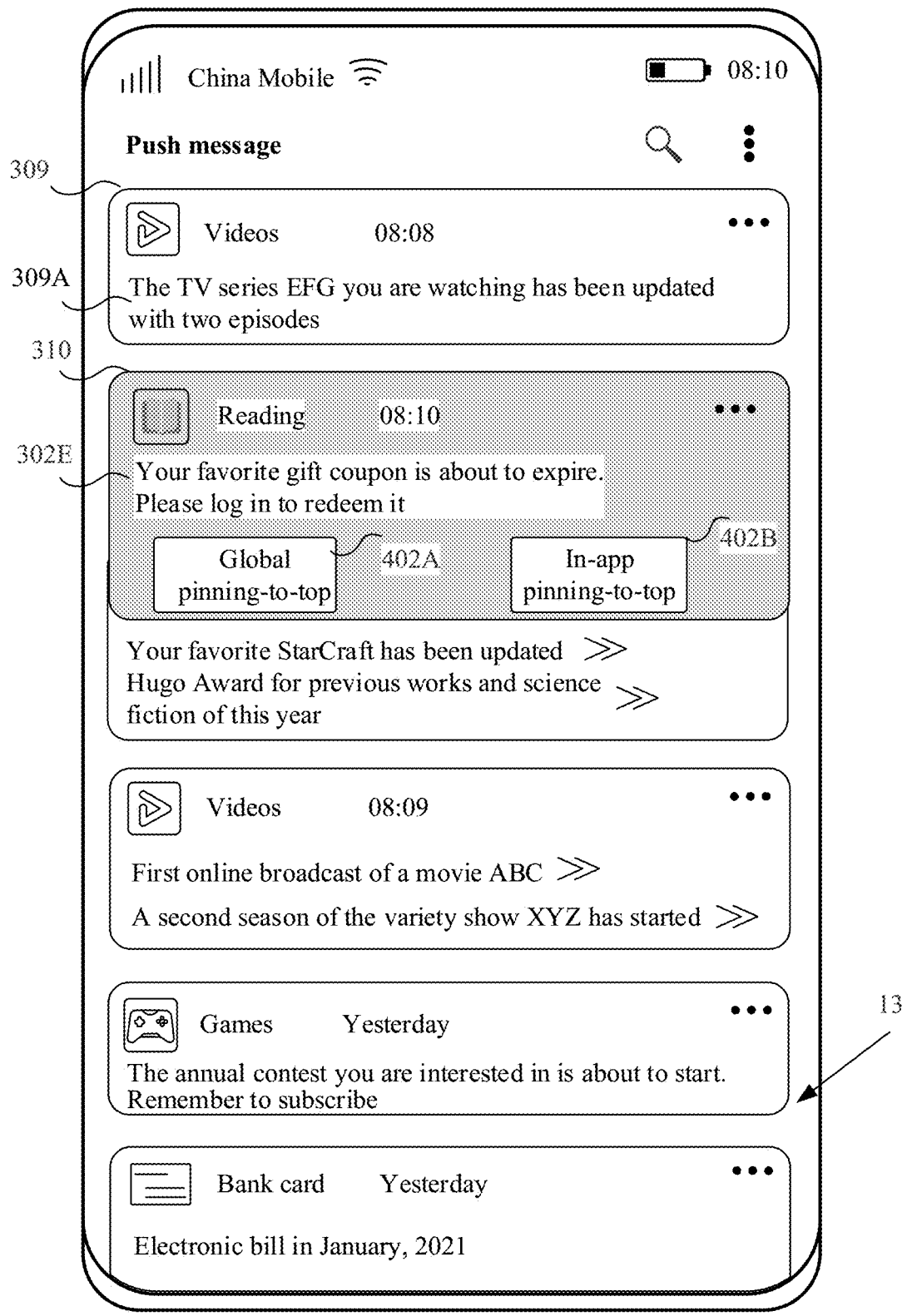
Figure 5F:
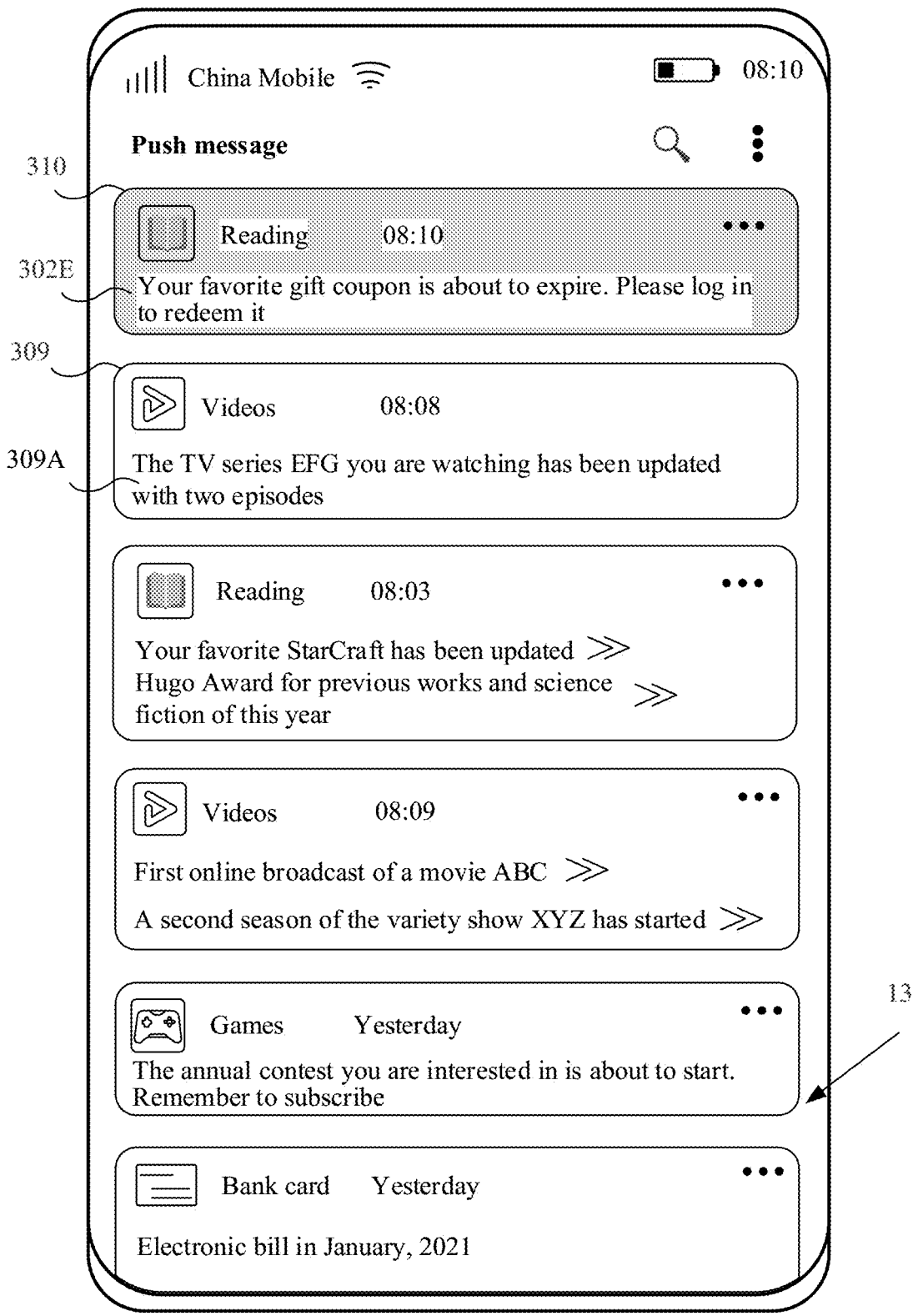
Figure 5G:
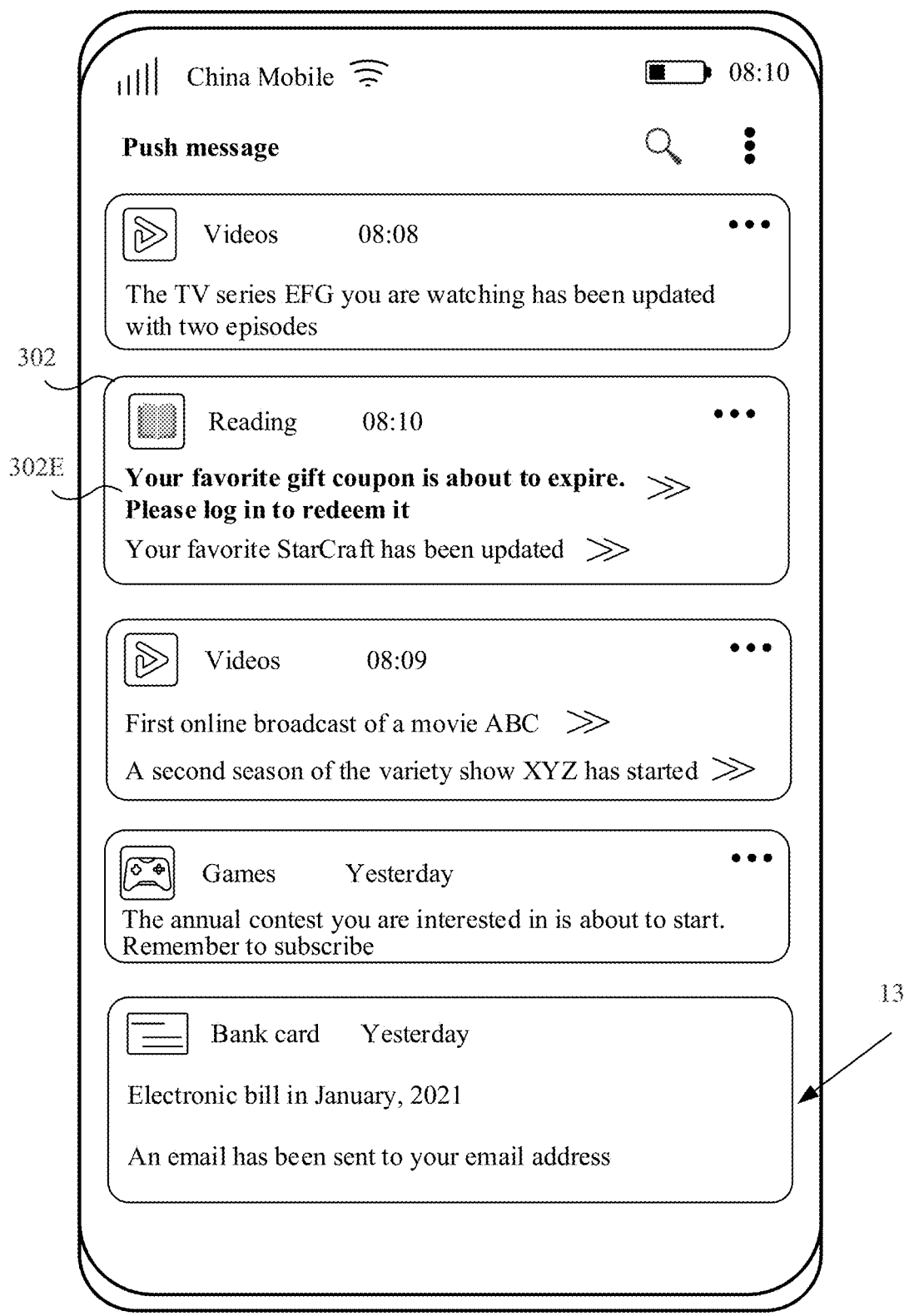

As shown in FIG. 5D, the message card 310 includes only one highlighted push message 302E, and the pinning-to-top control 402 may receive an input operation (for example, a touch operation) of the user. In response to the input operation, the terminal device 100 displays a "Global pinning-to-top" control 402A and an "In-app pinning-to-top" control 402B that are shown in FIG. 5E. As shown in FIG. 5E and FIG. 5F, the "Global pinning-to-top" control 402A may receive an input operation (for example, a touch operation) of the user, and in response to the input operation, the terminal device 100 pins the message card 310 to the top. As shown in FIG. 5F and FIG. 5G, the "In-app pinning-to-top" control 402B may receive an input operation (for example, a touch operation) of the user, and in response to the input operation, the terminal device 100 displays the push message 302E as the $1^{st}$ push message in the message card 302.

For a message card including a plurality of non-global pinning-to-top push messages, the following uses the message card 303 as an example to describe how a user manually sets a pinning-to-top state of the push message.

Figure 6A:
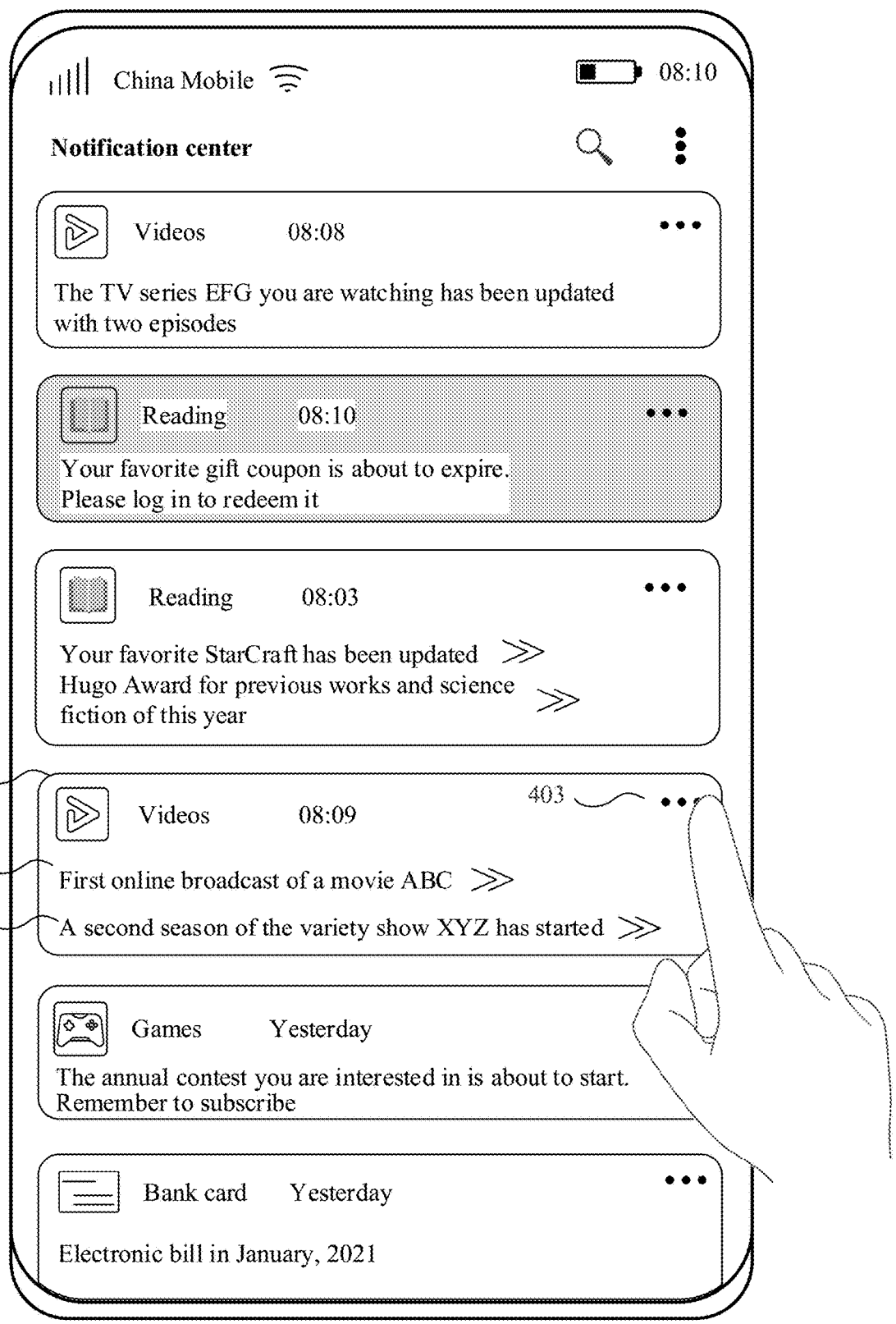
FIG. 6A to FIG. 6L are a schematic diagram of another user interface for manually setting a pinning-to-top state according to an embodiment of this application.
Figure 6B:
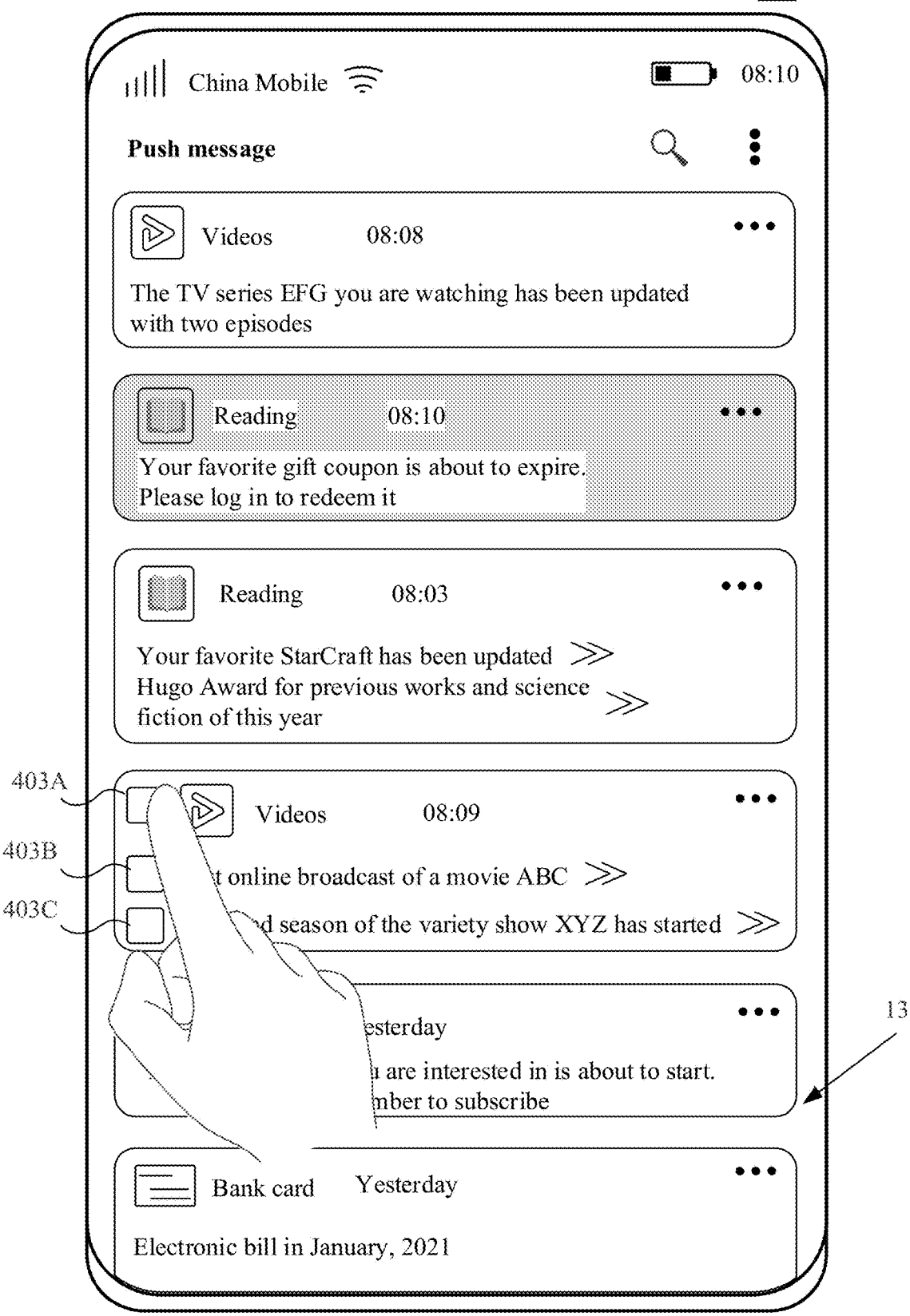

As shown in FIG. 6A and FIG. 6B, the message card 303 of the video app includes a plurality of non-global pinning-to-top push messages (for example, the push message 303D and the push message 303A), and the pinning-to-top control 403 may receive an input operation (for example, a touch operation) of the user. In response to the input operation, the terminal device 100 displays a selection control 403A corresponding to the video app, a selection control 403B corresponding to the push message 303D, and a selection control 403C corresponding to the push message 303A.

Figure 6C:
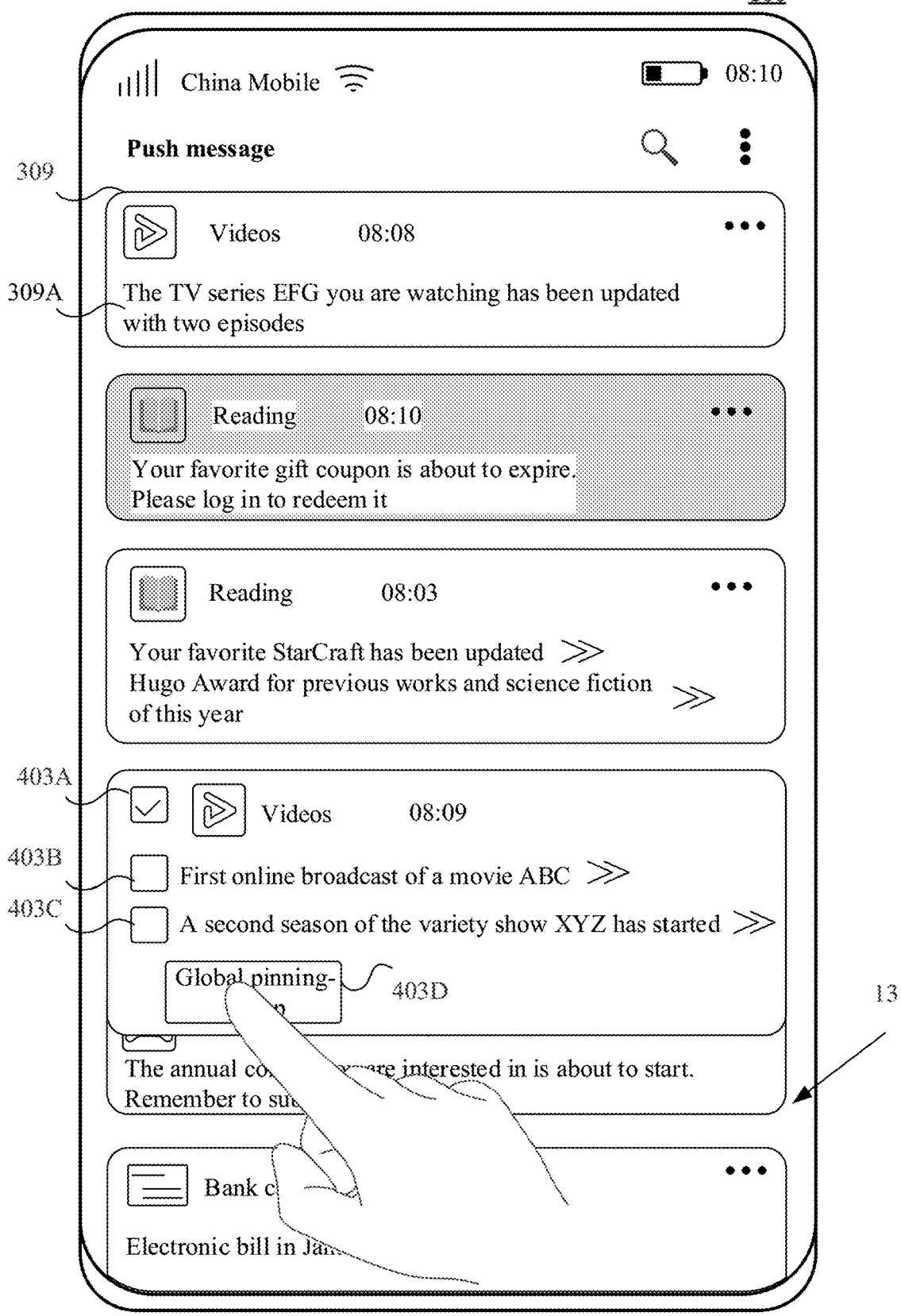
Figure 6D:
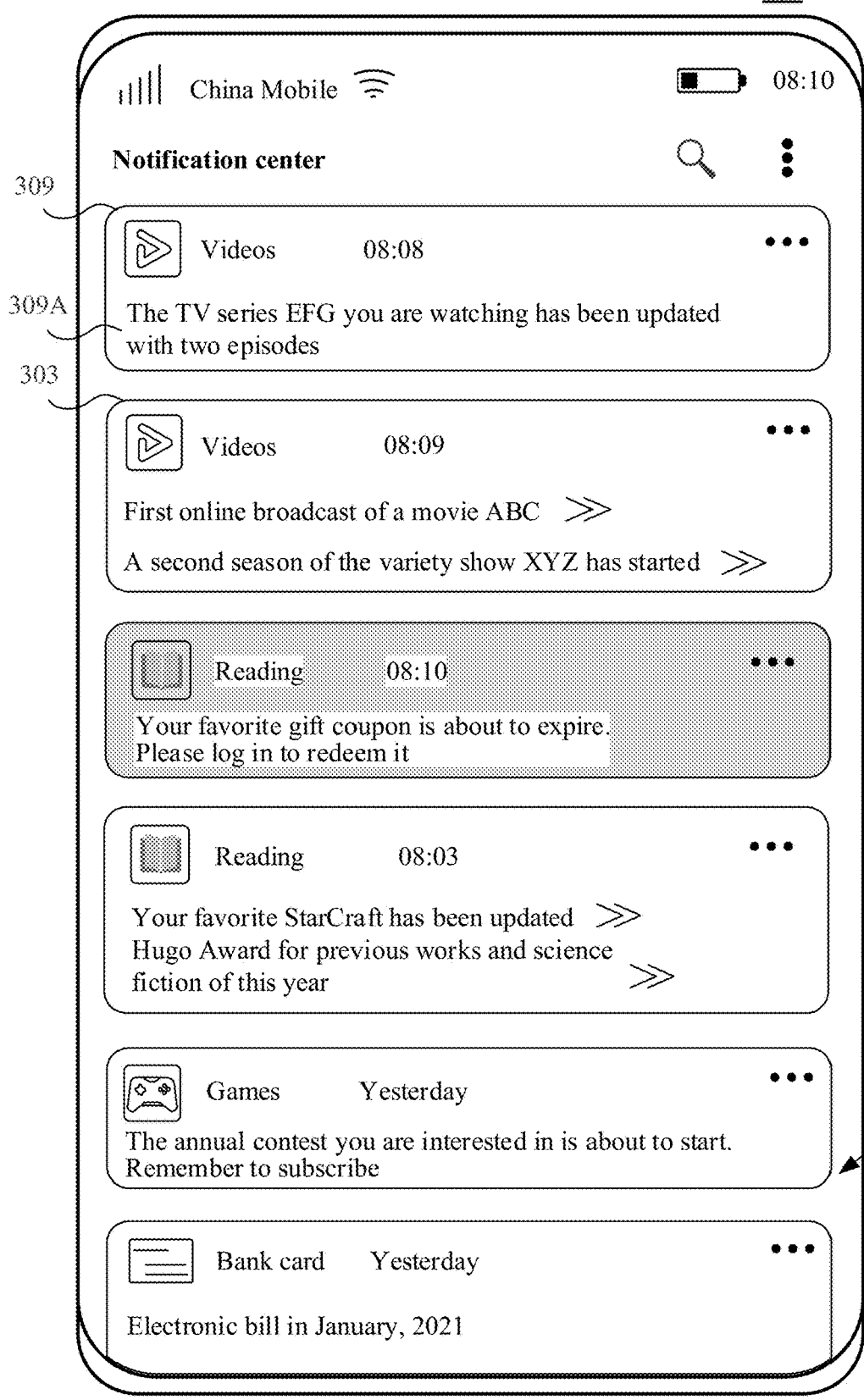

As shown in FIG. 6B, after the user selects the selection control 403A corresponding to the video app, the terminal device 100 displays the "Global pinning-to-top" control 403D shown in FIG. 6C. In this case, the "Global pinning-to-top" control 403D is used to perform global pinning-to-top on the message card 303 of the video app. For example, as shown in FIG. 6D, in response to an input operation (for example, a touch operation) for the "Global pinning-to-top" control 403D, the terminal device 100 displays the message card 303 of the video app in the first in message cards corresponding to a plurality of apps on the user interface 13. Optionally, as shown in FIG. 6D, the message card 303 of the video app is displayed after the message card 309 of the global pinning-to-top push message 309A. Optionally, the message card 303 of the video app may also be displayed as the $1^{st}$ message card on the top of the user interface 13.

Figure 6E:
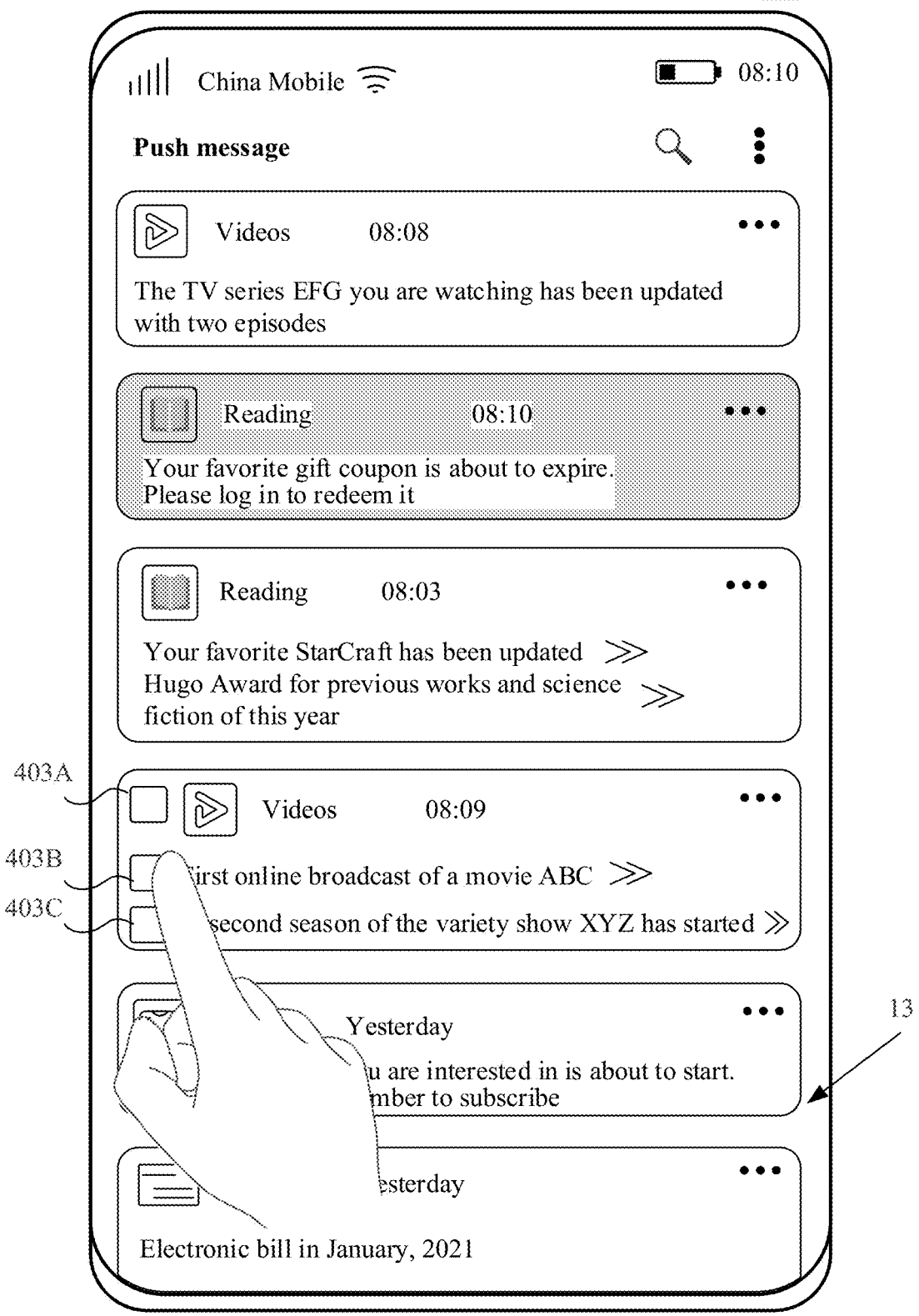
Figure 6F:
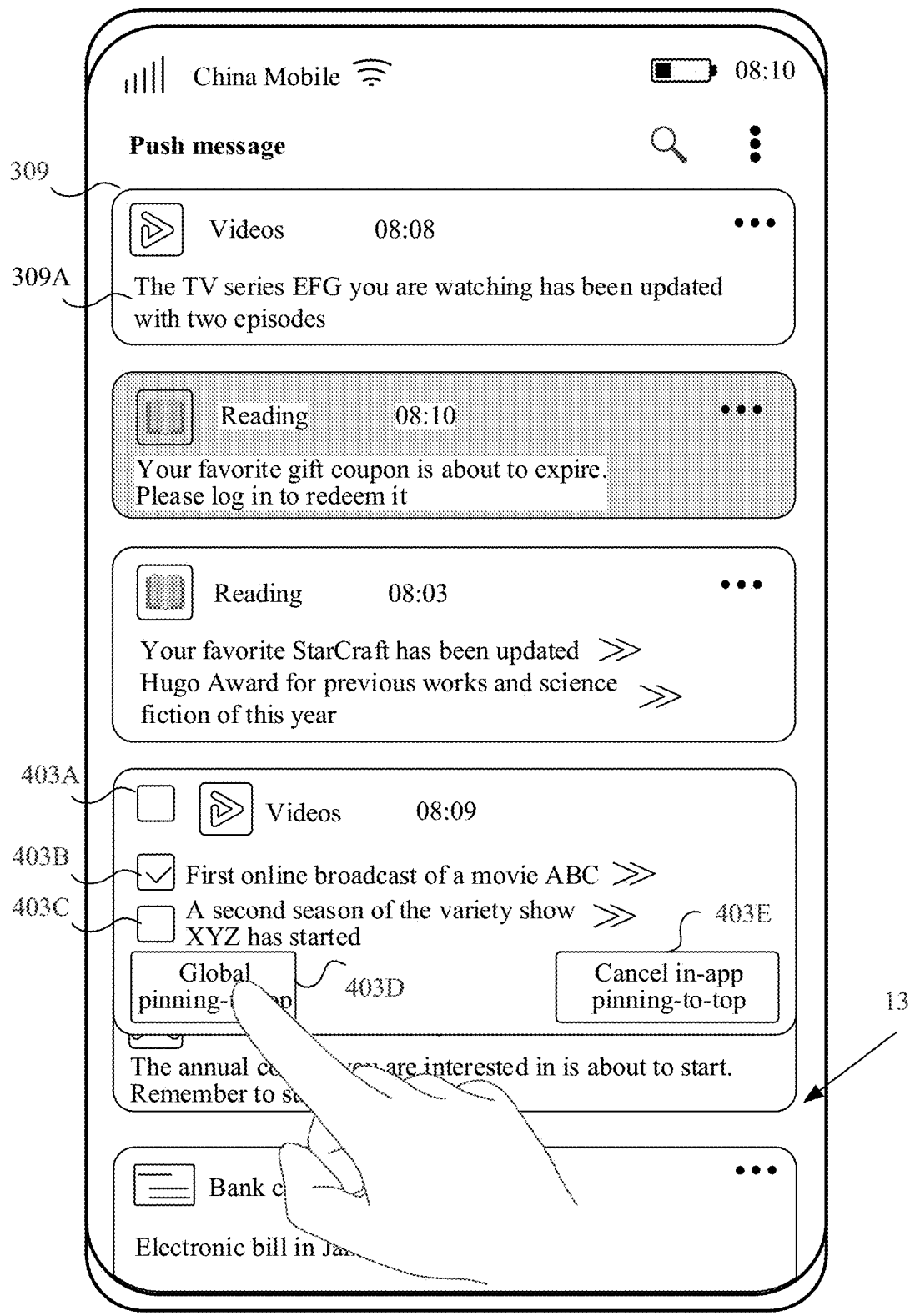
Figure 6G:
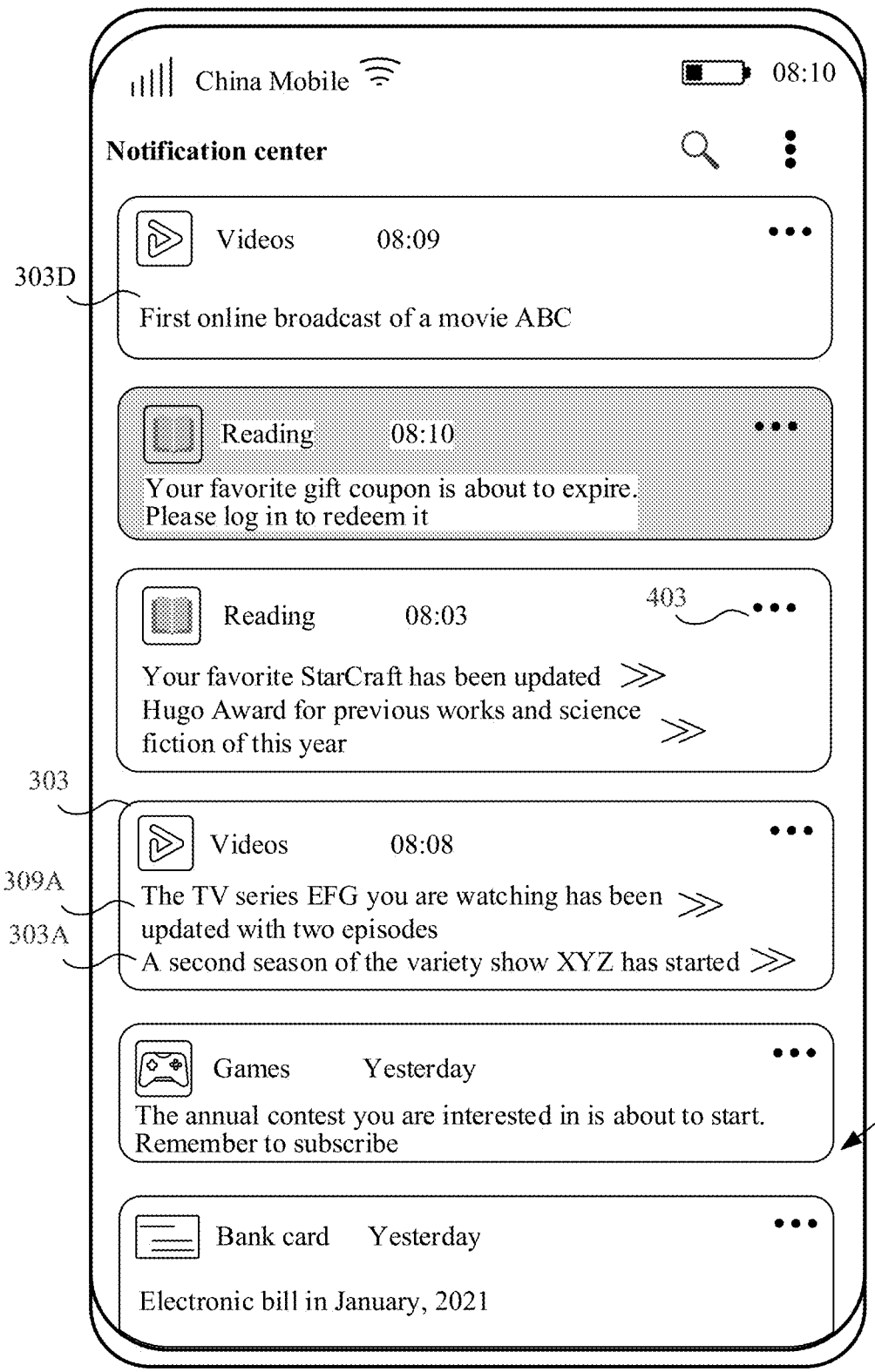

As shown in FIG. 6E, after the user selects the selection control 403B corresponding to the push message 303D, the terminal device 100 displays the "Global pinning-to-top" control 403D and the "Cancel in-app pinning-to-top" control 403E that are shown in FIG. 6F. In this case, the "Global pinning-to-top" control 403D is used to display the push message 303D in a global pinning-to-top manner. The "Cancel in-app pinning-to-top" control 403E is used to cancel in-app pinning-to-top on the push message 303D. As shown in FIG. 6G, in response to an input operation (for example, a touch operation) for the "Global pinning-to-top" control 403D, the terminal device 100 displays the push message 303D on the $1^{st}$ message card that is on the top.

Figure 6H:
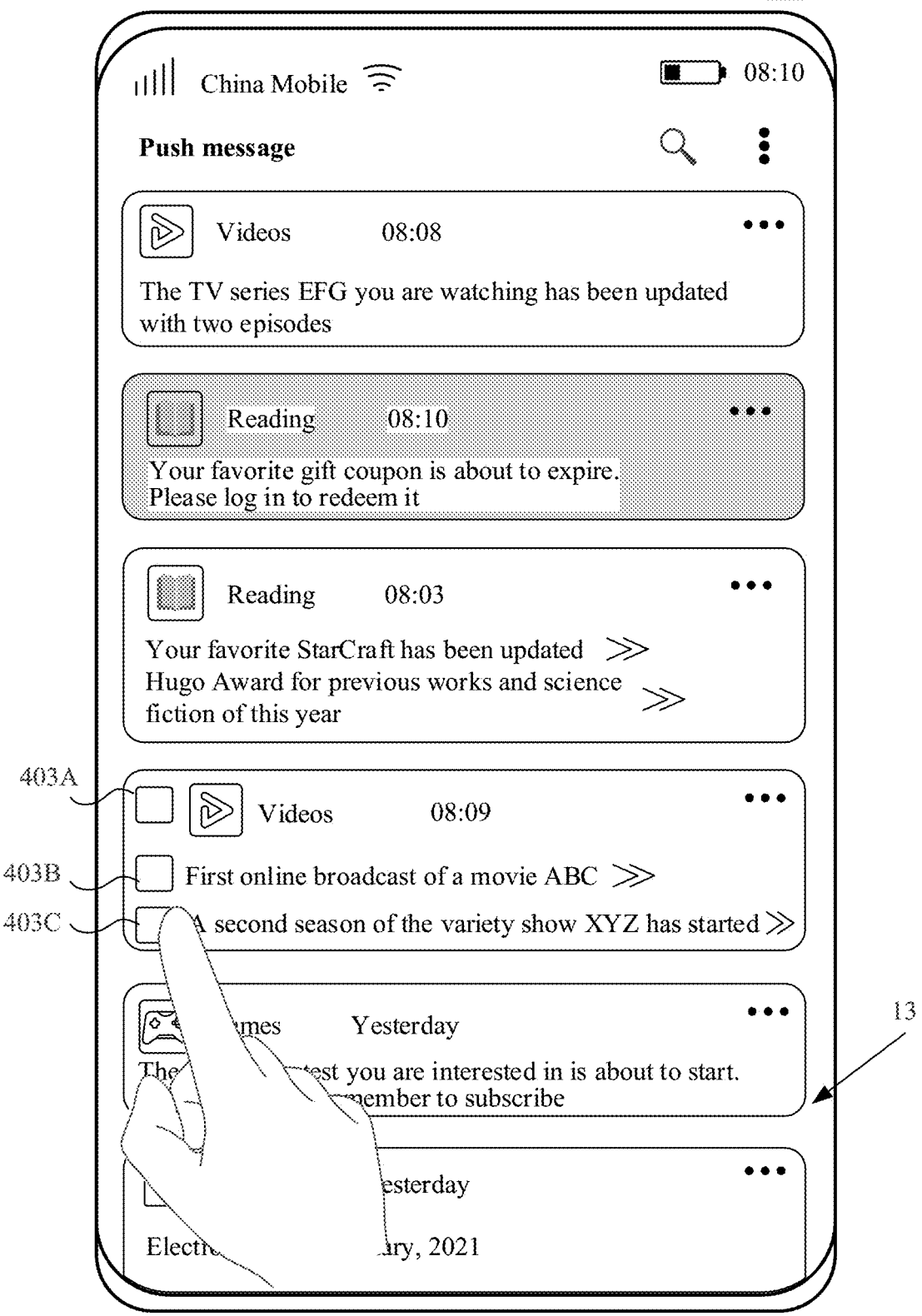
Figure 6I:
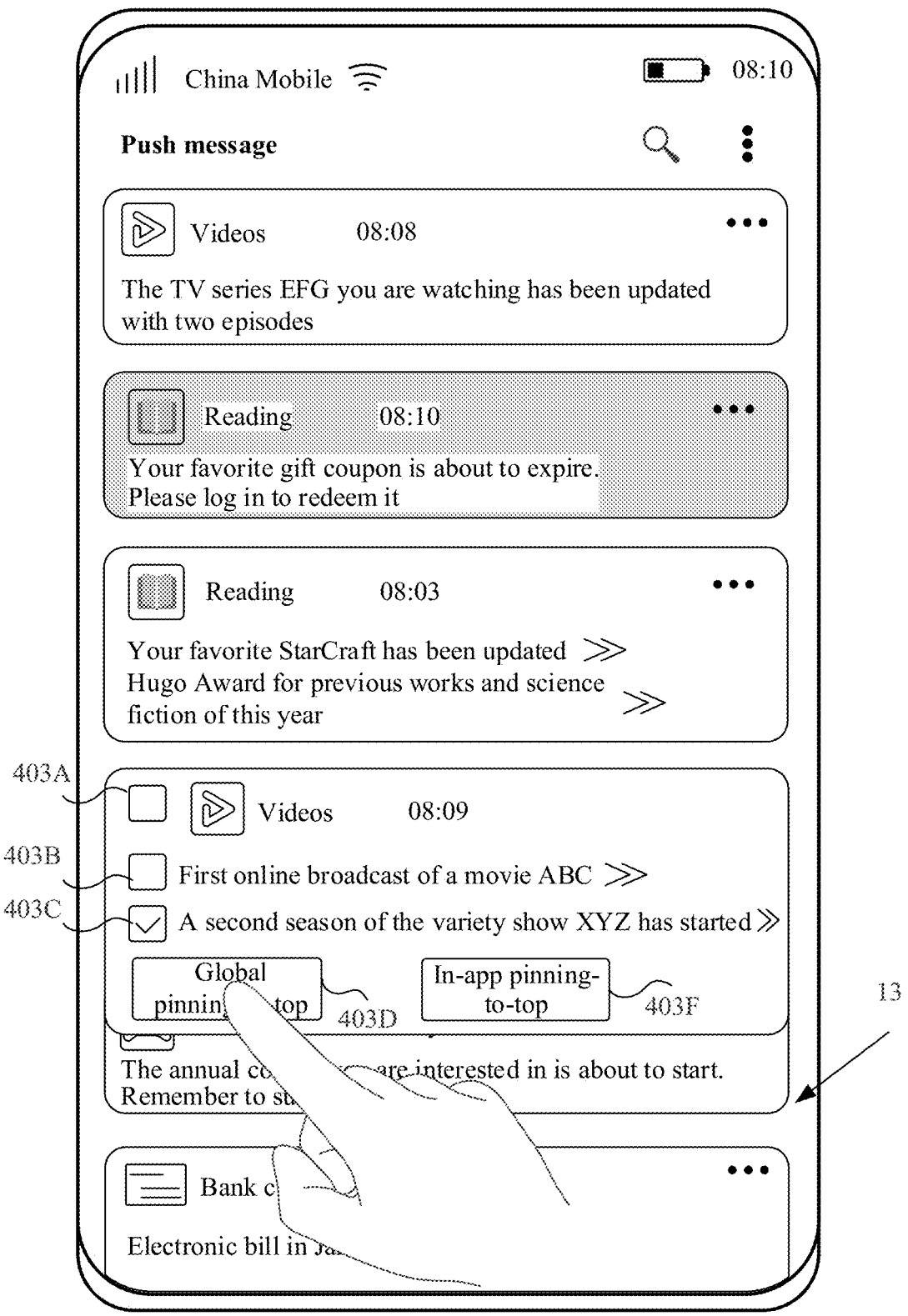
Figure 6J:
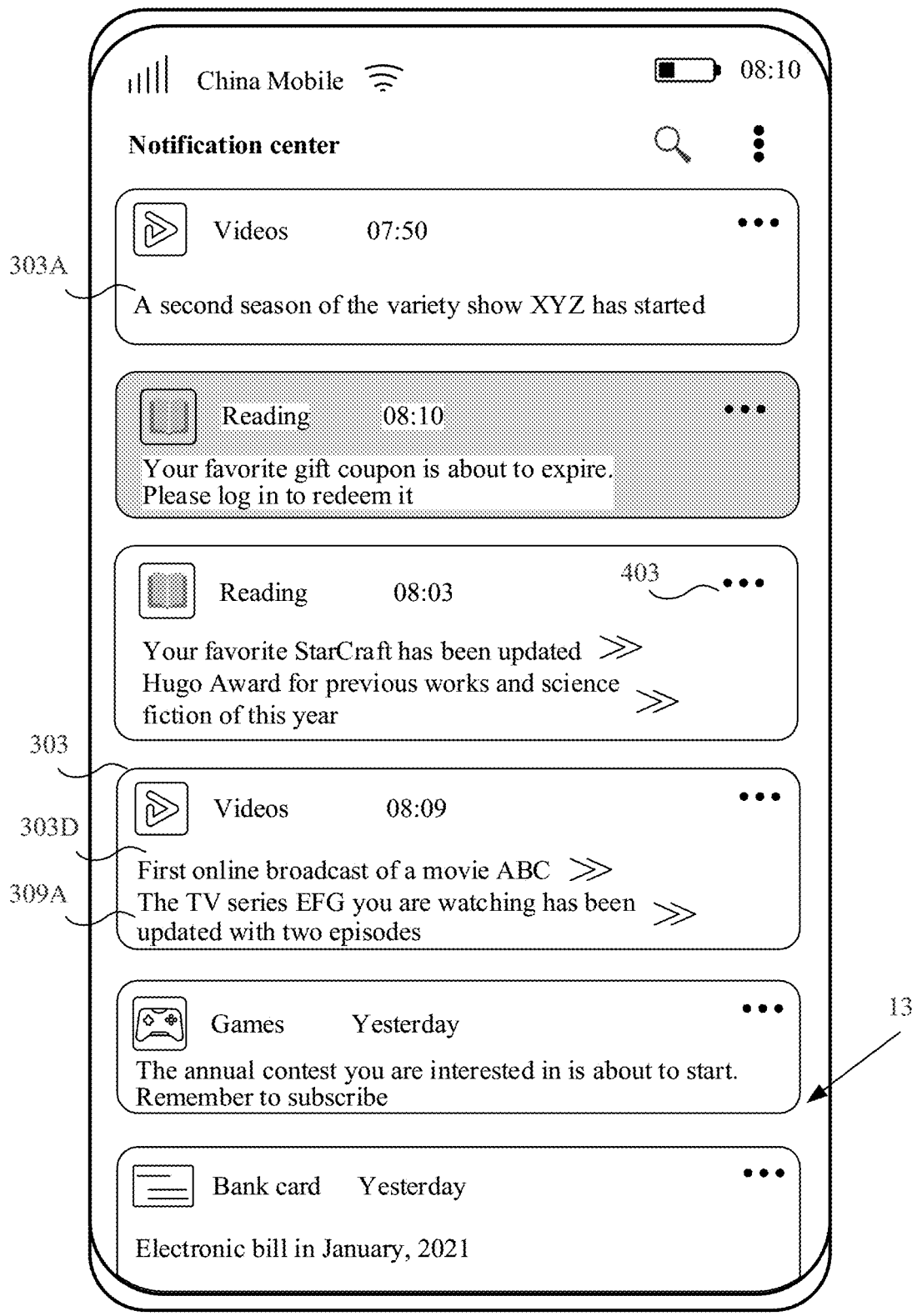
Figure 6K:
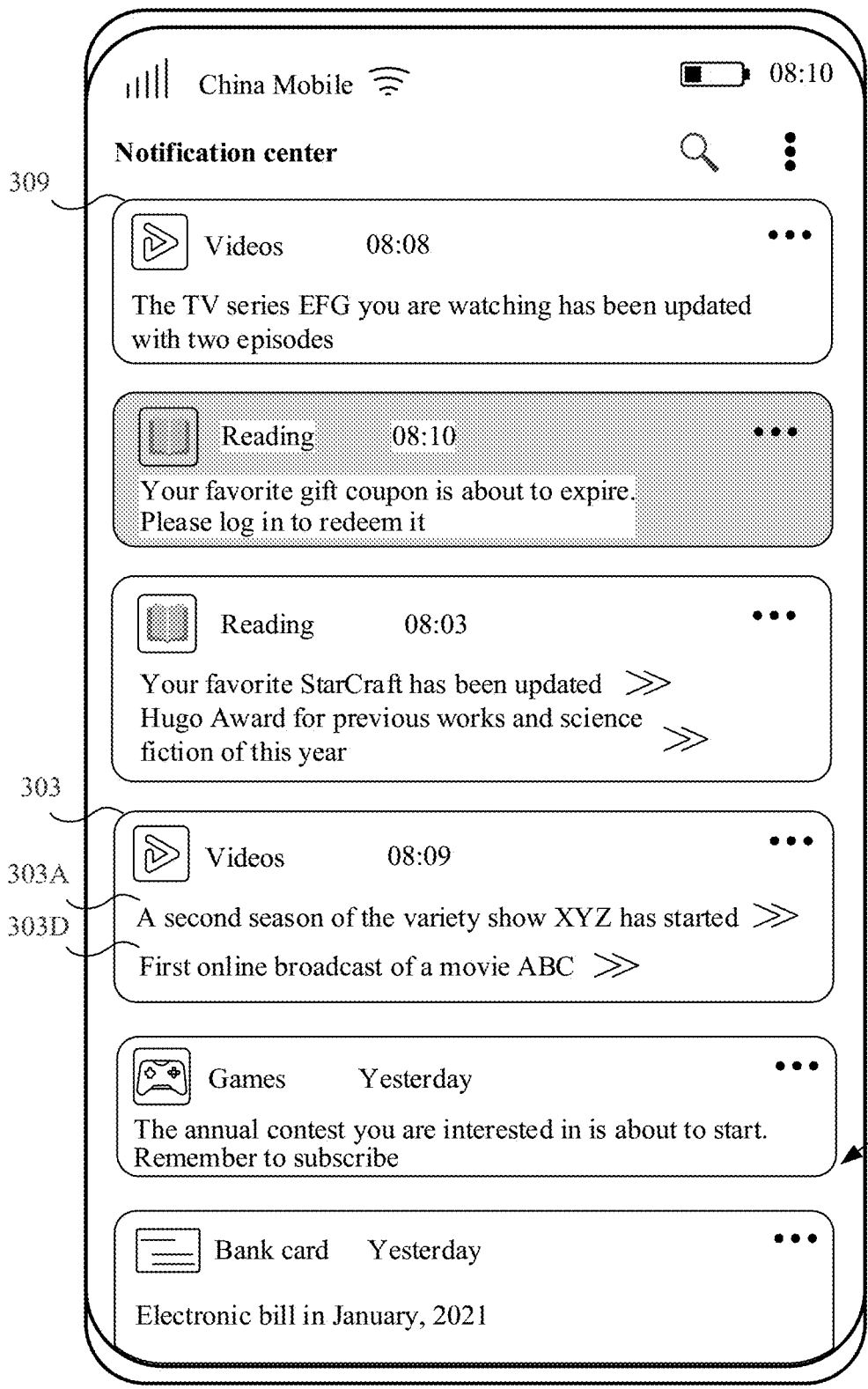

As shown in FIG. 6H, after the user selects the selection control 403C corresponding to the push message 303A, the terminal device 100 displays the "Global pinning-to-top" control 403D and an "In-app pinning-to-top" control 403F that are shown in FIG. 6I. In this case, the "Global pinning-to-top" control 403D is used to perform global pinning-to-top on the push message 303A, and the "In-app pinning-to-top" control 403F is used to perform in-app pinning-to-top on the push message 303A. For example, as shown in FIG. 6J, in response to an input operation (for example, a touch operation) for the "Global pinning-to-top" control 403D, the terminal device 100 displays the push message 303A on the $1^{st}$ message card that is on the top. For example, as shown in FIG. 6K, in response to an input operation (for example, a touch operation) on the "In-app pinning-to-top" control 403F, the terminal device 100 displays the push message 303A as the $1^{st}$ push message in the message card 303 of the video app.

Figure 6L:
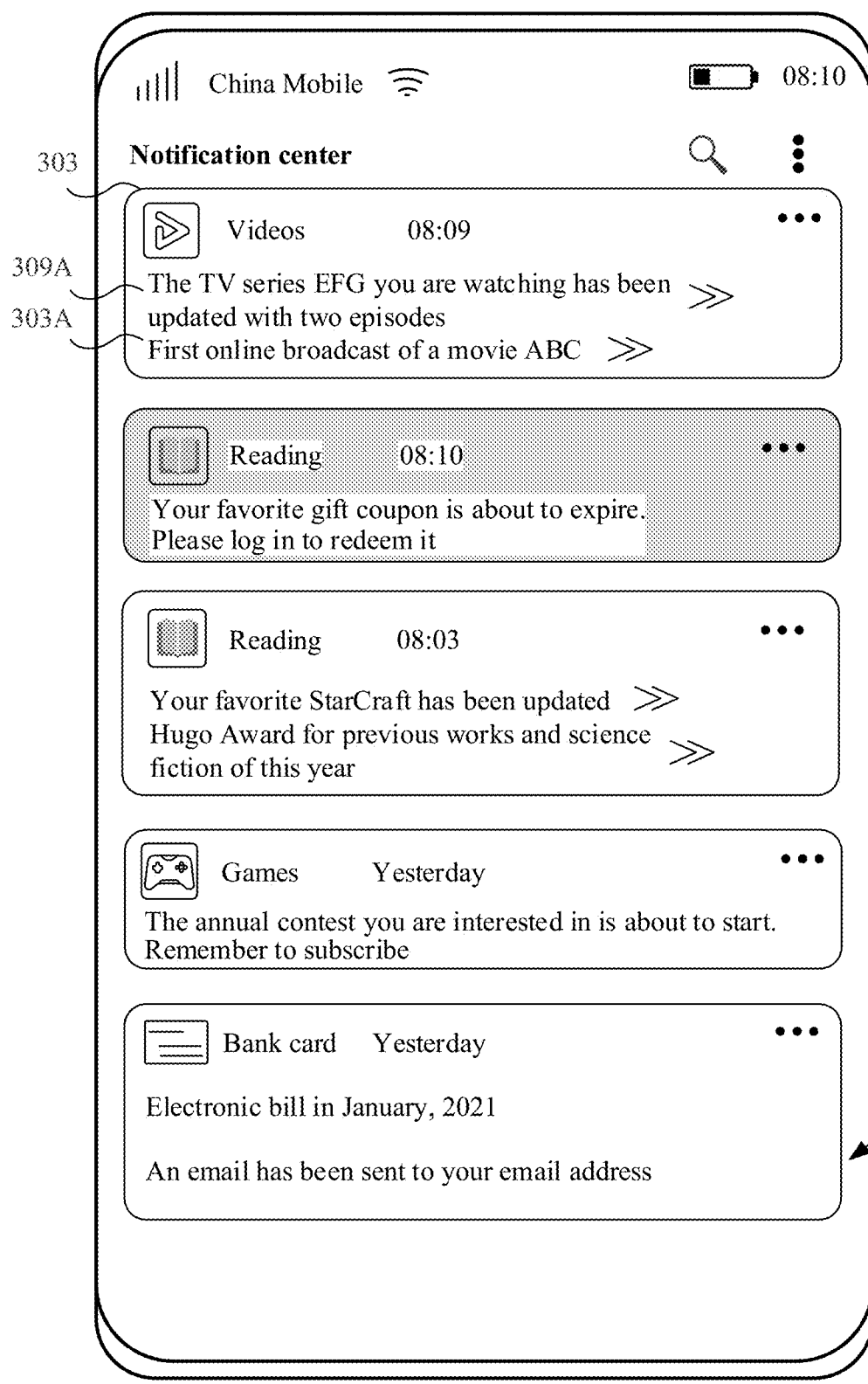

In some embodiments, when a to-be-global pinning-to-top app that is selected by the user (for example, the video app corresponding to the message card 303 shown in FIG. 6C) is the same as an app corresponding to a global pinning-to-top push message (for example, the push message 309A shown in FIG. 6C), in response to an input operation on the "Global pinning-to-top" control 403D, the terminal device 100 merges the message card 303 and the message card 309 that corresponds to the push message 309A, and displays a merged message card as the $1^{st}$ message card on the user interface 13. For example, as shown in FIG. 6L, in response to the input operation, the terminal device 100 stops displaying the push message card 309, displays the push message 309A as the $1^{st}$ push message in the message card 303, and displays the message card 303 as the $1^{st}$ message card on the user interface 13.

In some embodiments, after the user sets the push message 1 (for example, the push message 303D shown in FIG. 6G or the push message 303D shown in FIG. 6J) to be a global pinning-to-top push message, the terminal device 100 displays the push message 1 in a global pinning-to-top manner, until the user cancels global pinning-to-top on the push message 1.

In some embodiments, after the user sets the push message 1 (for example, the push message 303D shown in FIG. 6G or the push message 303D shown in FIG. 6J) as a global pinning-to-top push message, if the terminal device 100 receives a push message 2 carrying a global pinning-to-top mark, the terminal device 100 displays the push message 2 as a next push message (that is, the $2^{nd}$ global pinning-to-top push message on the top) of the push message 1 on the user interface 13.

In some embodiments, after the user sets the push message 1 (for example, the push message 303A shown in FIG. 6K) as an in-app pinning-to-top push message of the app 1, the terminal device 100 pins the push message 1 to the top of message cards of the app 1, until the user cancels in-app pinning-to-top on the push message 1.

In some embodiments, after the user sets the push message 1 (for example, the push message 303A shown in FIG. 6K) as an in-app pinning-to-top push message of the app 1, if the terminal device 100 receives a push message 2 of the app 1 that carries an in-app pinning-to-top mark, the terminal device 100 displays the push message 2 as a next push message (that is, the $2^{nd}$ in-app pinning-to-top push message in the message card of the app 1) of the push message 1 in the message card (for example, the push message card 303 shown in FIG. 6K) of the app 1.

In this embodiment of this application, the push message 1 on the user interface 13 may receive an input operation of the user, and in response to the input operation, the terminal device 100 may change a highlight state of the push message 1. The highlight state of the push message 1 includes a highlighted state and a non-highlighted state.

For a message card including only one highlighted push message, the following uses the message card 310 as an example to describe how a user manually sets a highlight state of the push message.

Figure 7A:
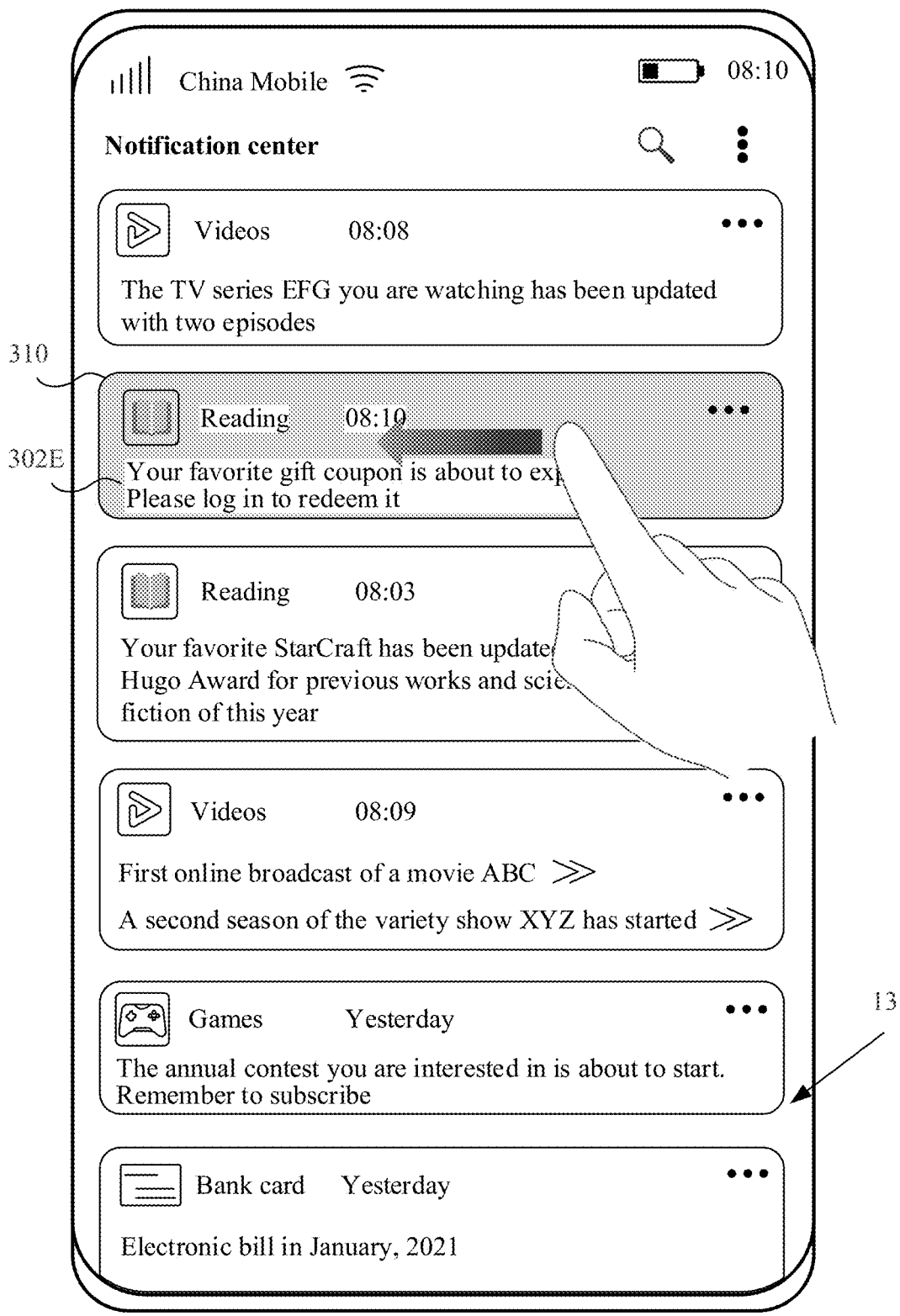
FIG. 7A to FIG. 7F are a schematic diagram of a user interface for manually setting a highlighted state according to an embodiment of this application.
Figure 7B:
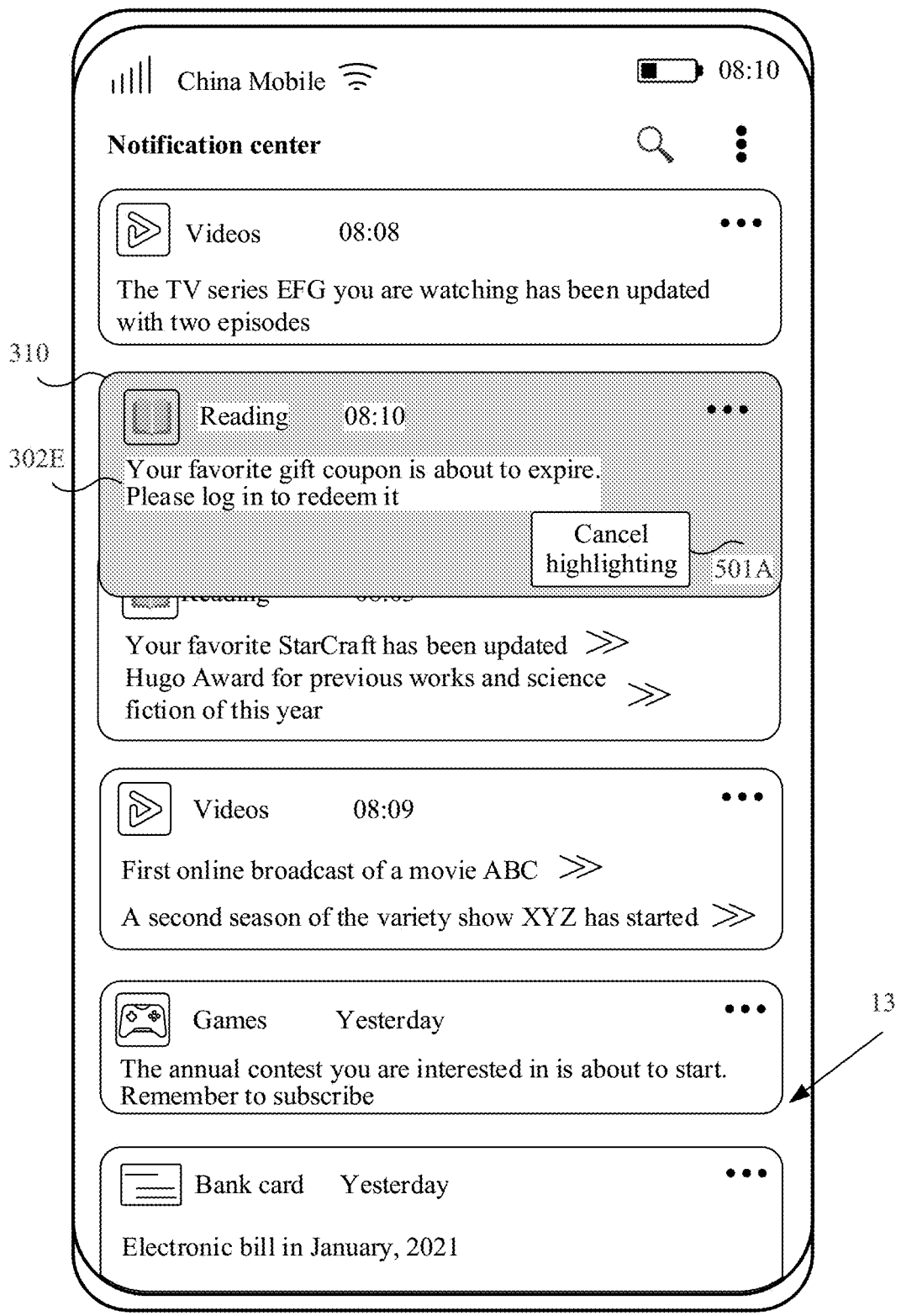
Figure 7C:
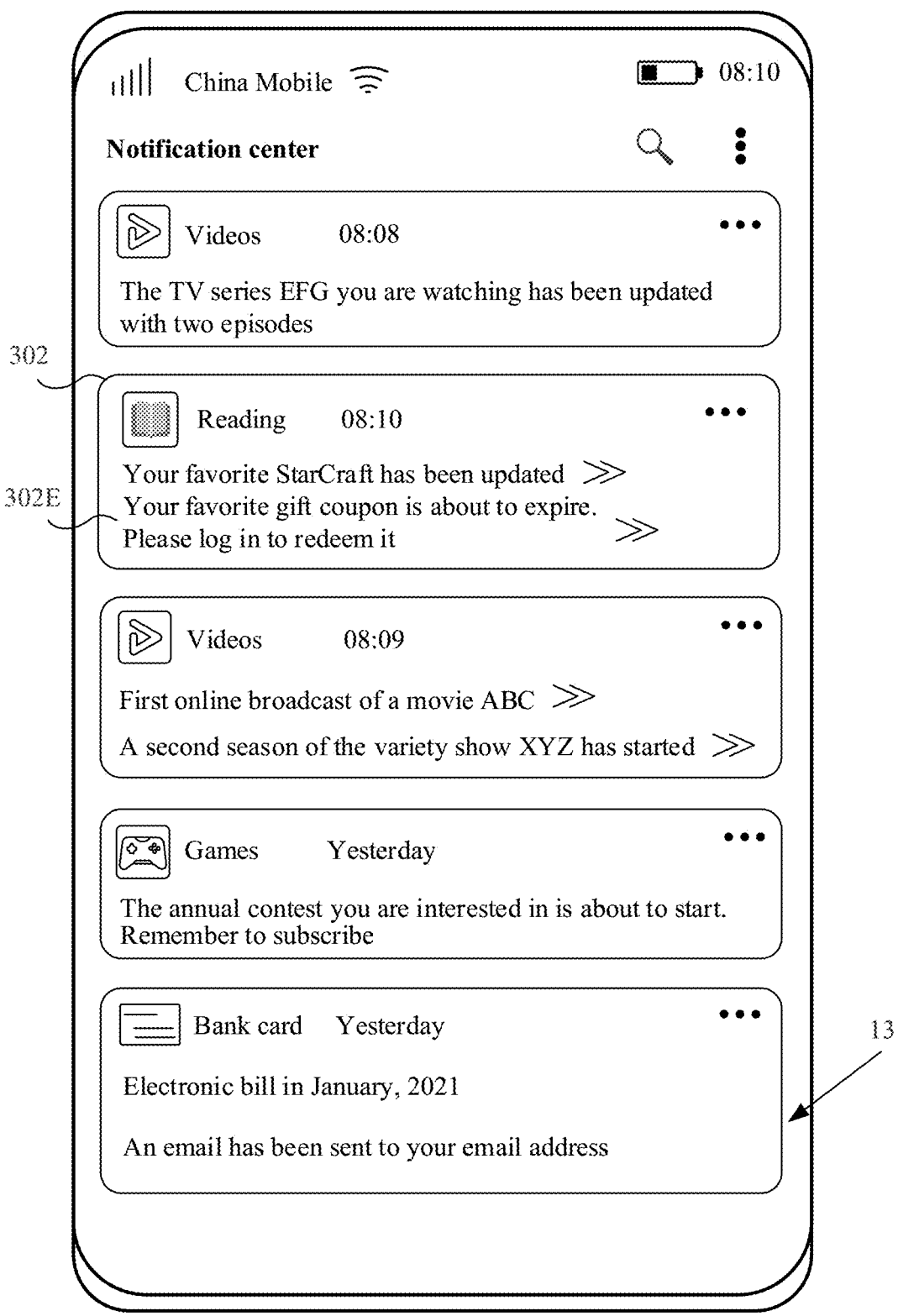

For example, as shown in FIG. 7A and FIG. 7B, the message card 310 includes a highlighted push message 302E of a reading app, and the message card 310 may receive an input operation (for example, a leftward sliding operation shown in FIG. 7A) of the user. In response to the input operation, the terminal device 100 displays a Cancel highlighting" control 501A. As shown in FIG. 7C, in response to an input operation (for example, a touch operation) on the "Cancel highlighting" control 501A, the terminal device 100 displays the push message 302E in the message card 302 of the reading app in a non-highlighting manner.

For a message card including only one non-highlighted push message, the following uses the message card 309 as an example to describe how a user manually sets a highlight state of the push message.

Figure 7D:
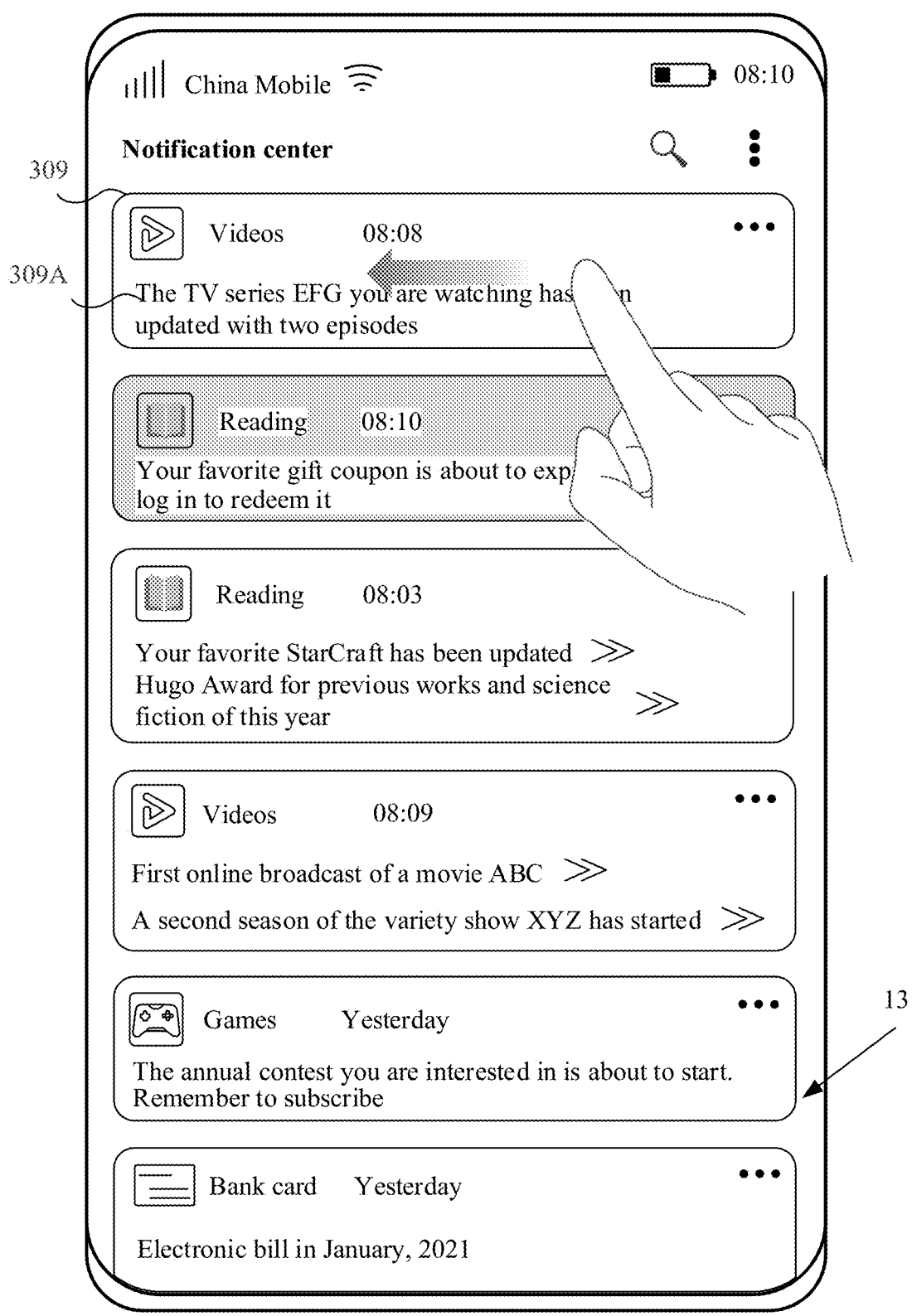
Figure 7E:
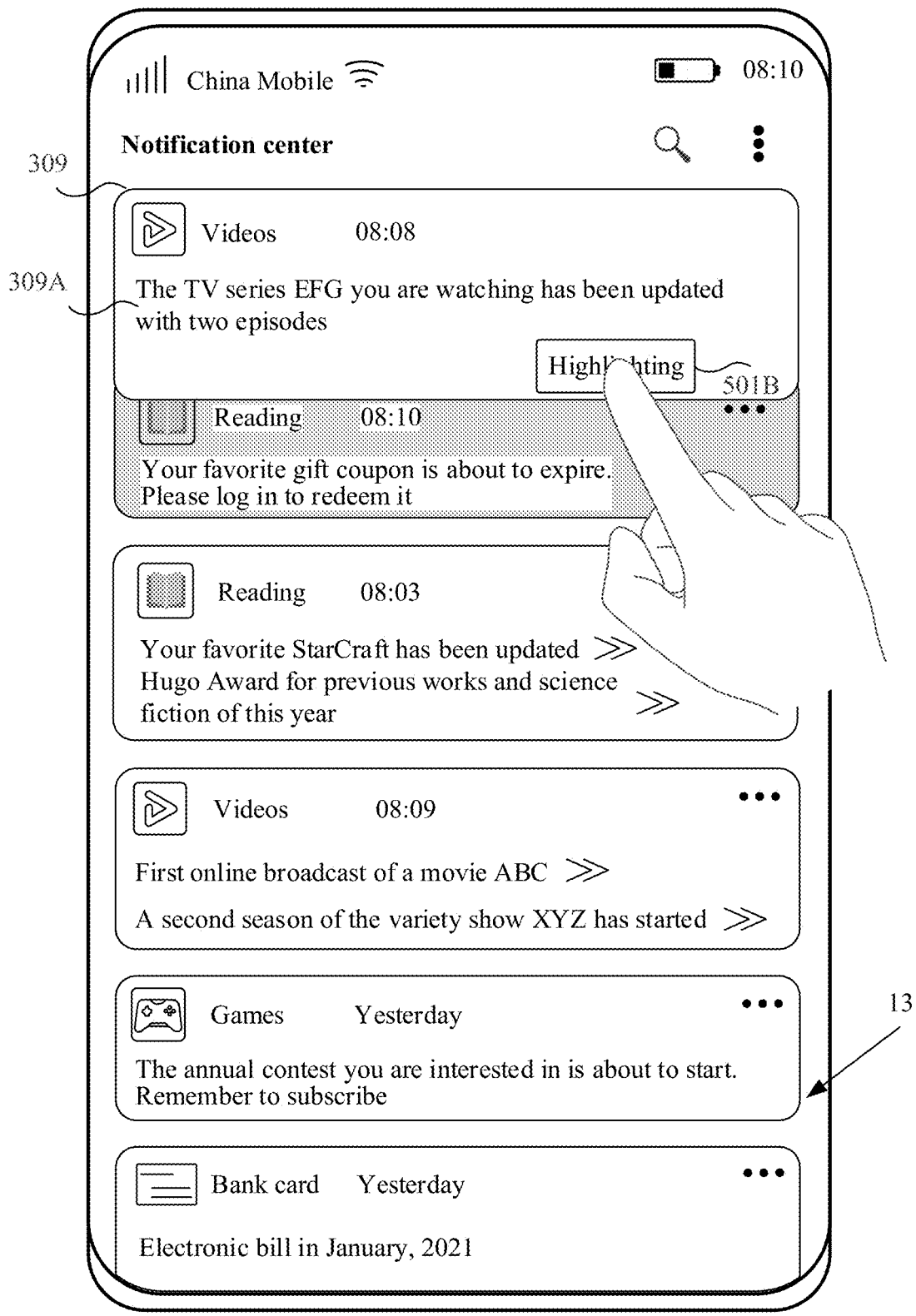
Figure 7F:
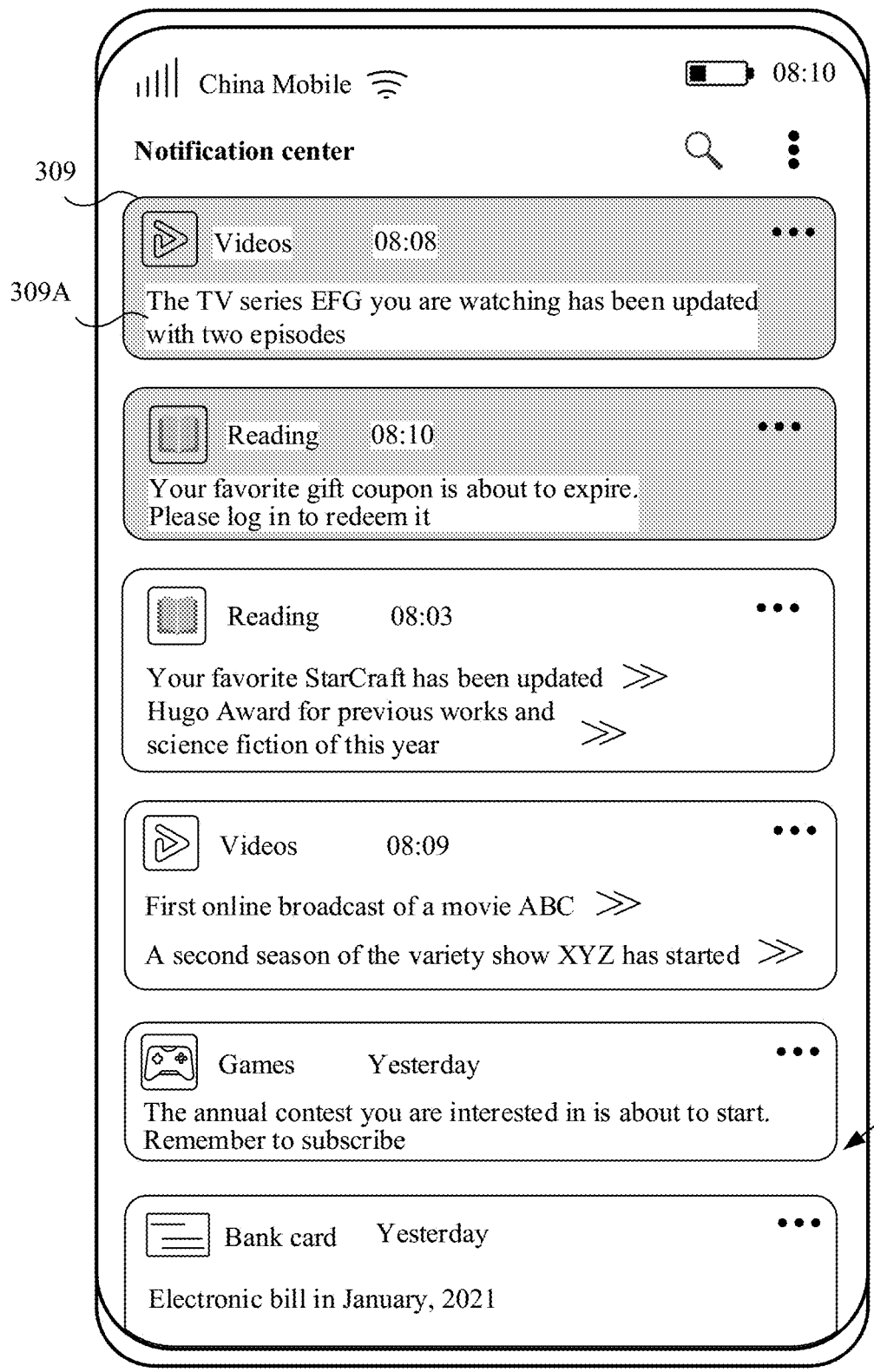

For example, as shown in FIG. 7D and FIG. 7E, the message card 309 includes a non-highlighted push message 309A of a video app, and the message card 309 may receive an input operation (for example, a leftward sliding operation shown in FIG. 7D) of the user. In response to the input operation, the terminal device 100 displays a "Highlighting" control 501B. As shown in FIG. 7F, in response to an input operation (for example, a touch operation) for the "Highlighting" control 501B, the terminal device 100 highlights background light of the message card 309.

For a message card including a plurality of push messages, the following uses the message card 303 as an example to describe how a user manually sets a highlight state of the push message.

Figure 8A:
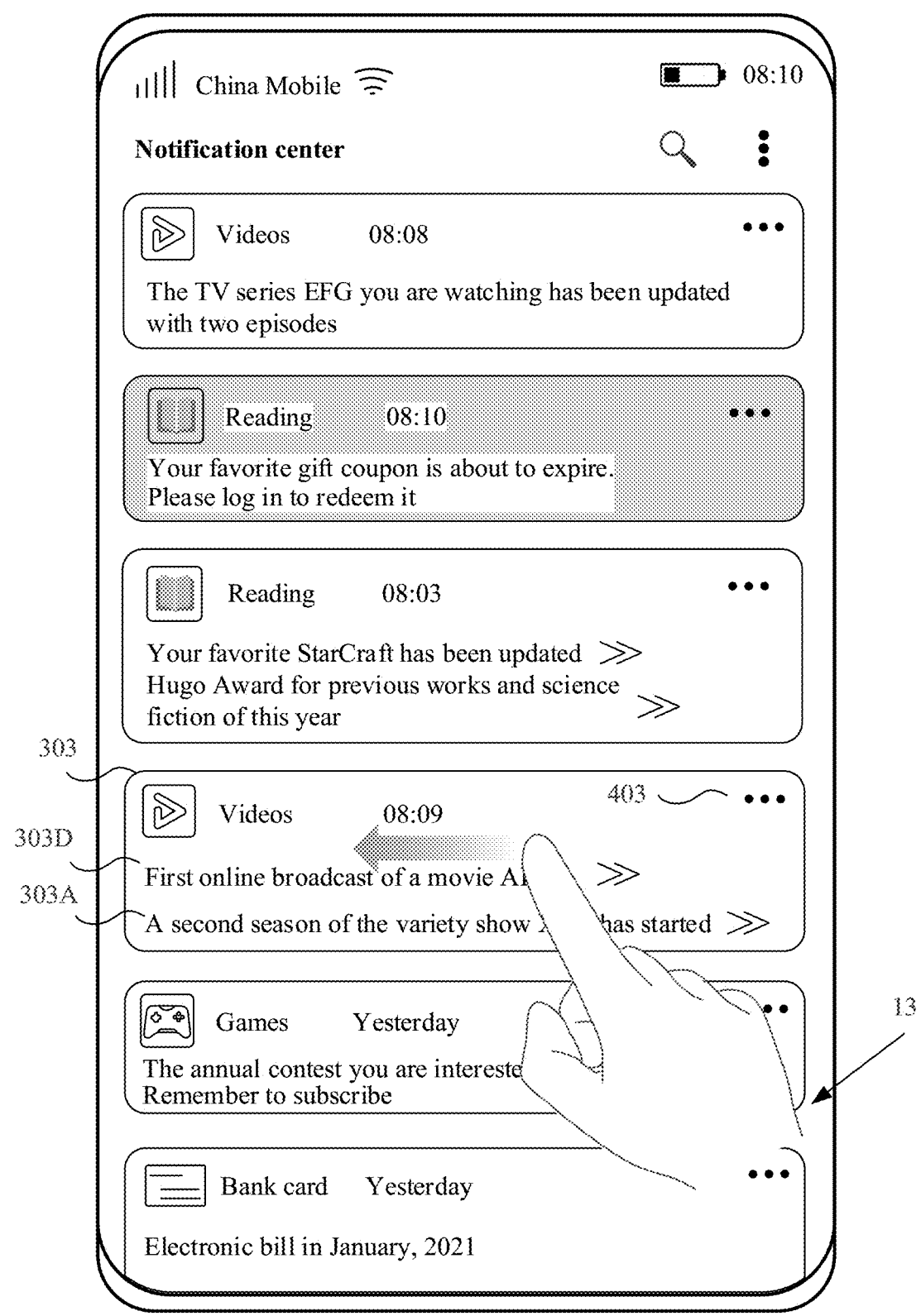
FIG. 8A to FIG. 8F are a schematic diagram of another user interface for manually setting a highlighted state according to an embodiment of this application.
Figure 8B:
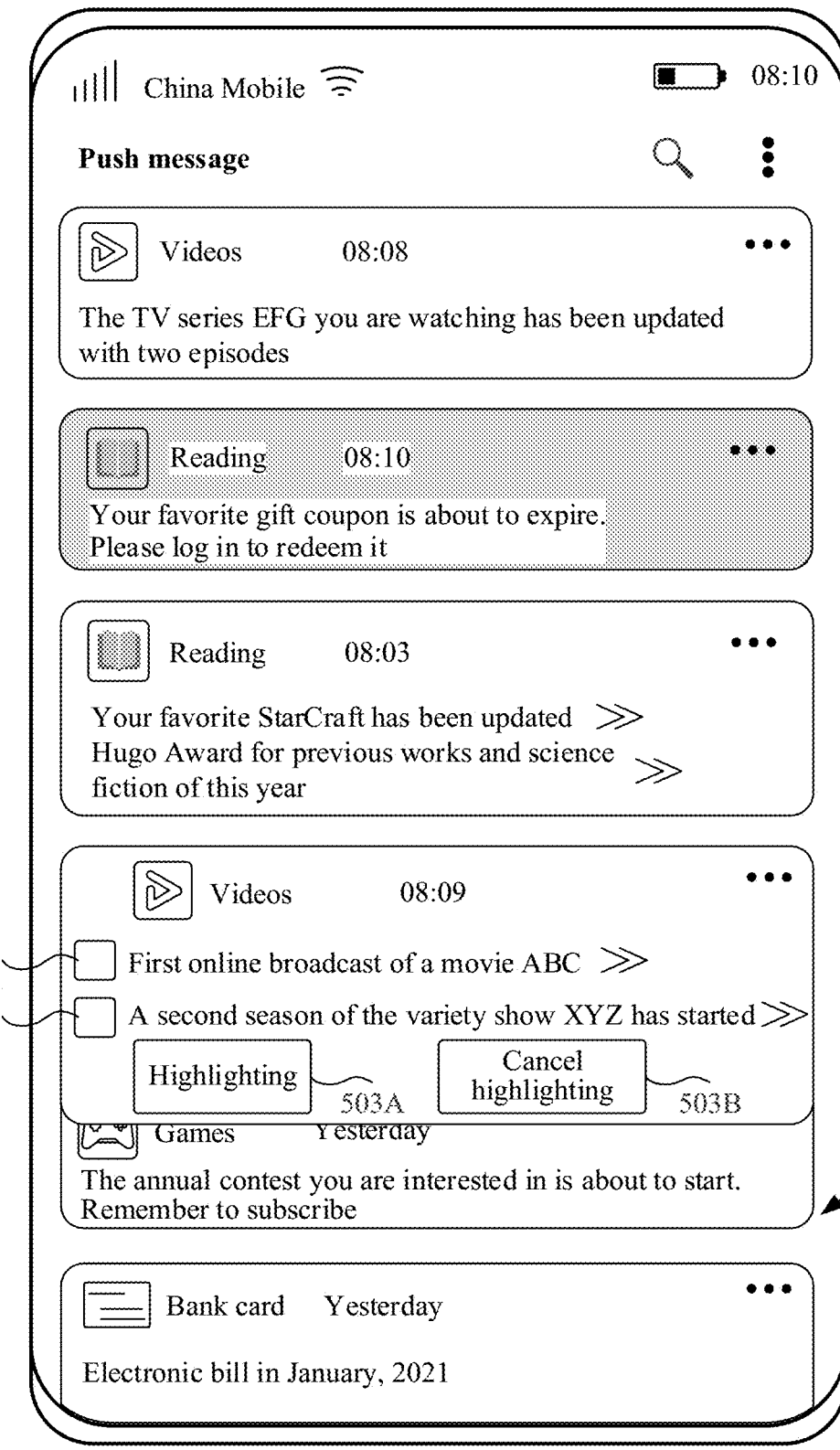

For example, as shown in FIG. 8A and FIG. 8B, the message card 303 includes a non-highlighted push message 303D and a non-highlighted push message 303A that are of the video app, and the message card 303 may receive an input operation (for example, a leftward sliding operation shown in FIG. 8A) of the user. In response to the foregoing input operation, the terminal device 100 displays a selection control 502A of the push message 303D, a selection control 502B of the push message 303A, a "Highlighting" control 503A, and a "Cancel highlighting" control 503B.

Figure 8C:
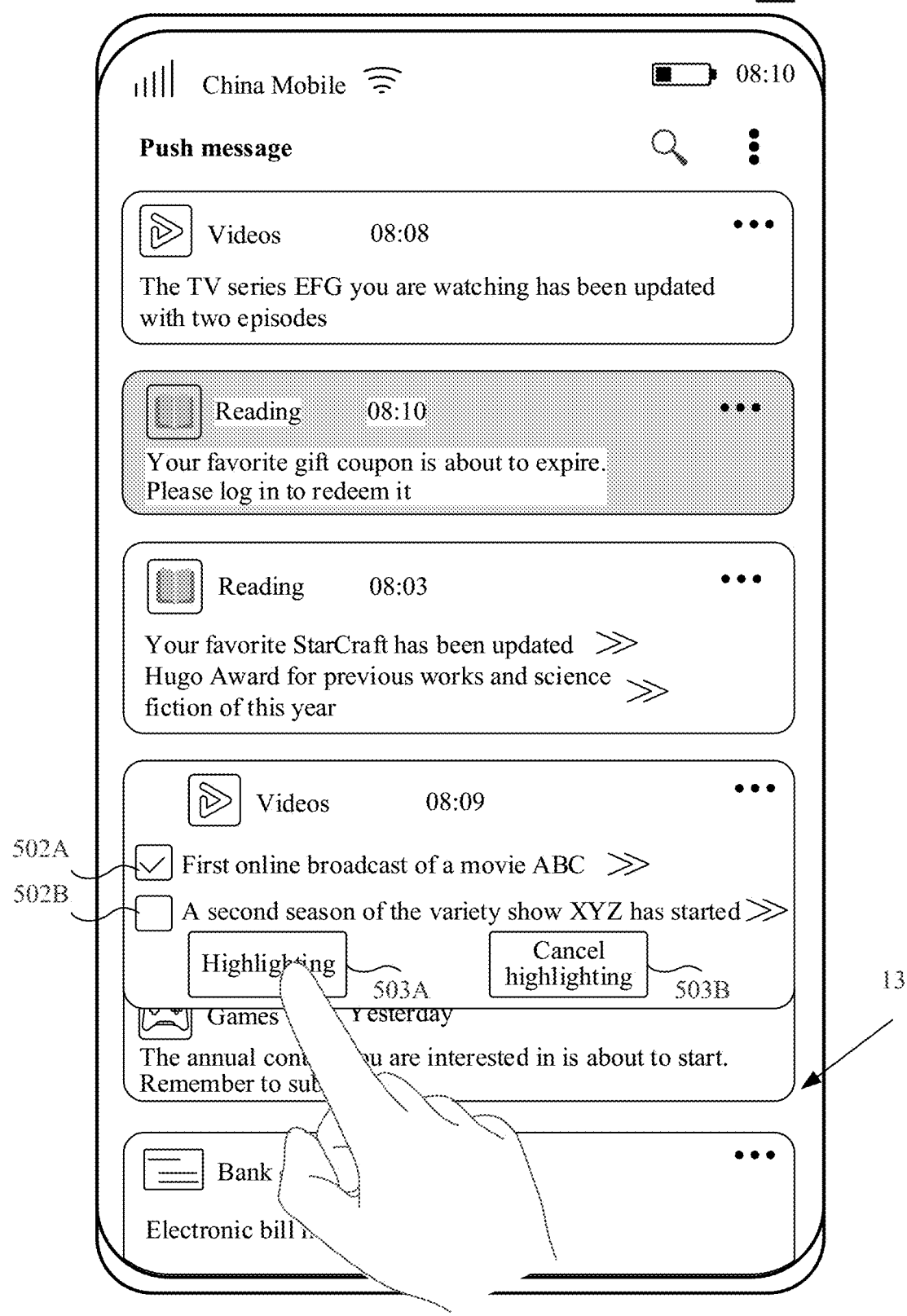
Figure 8D:
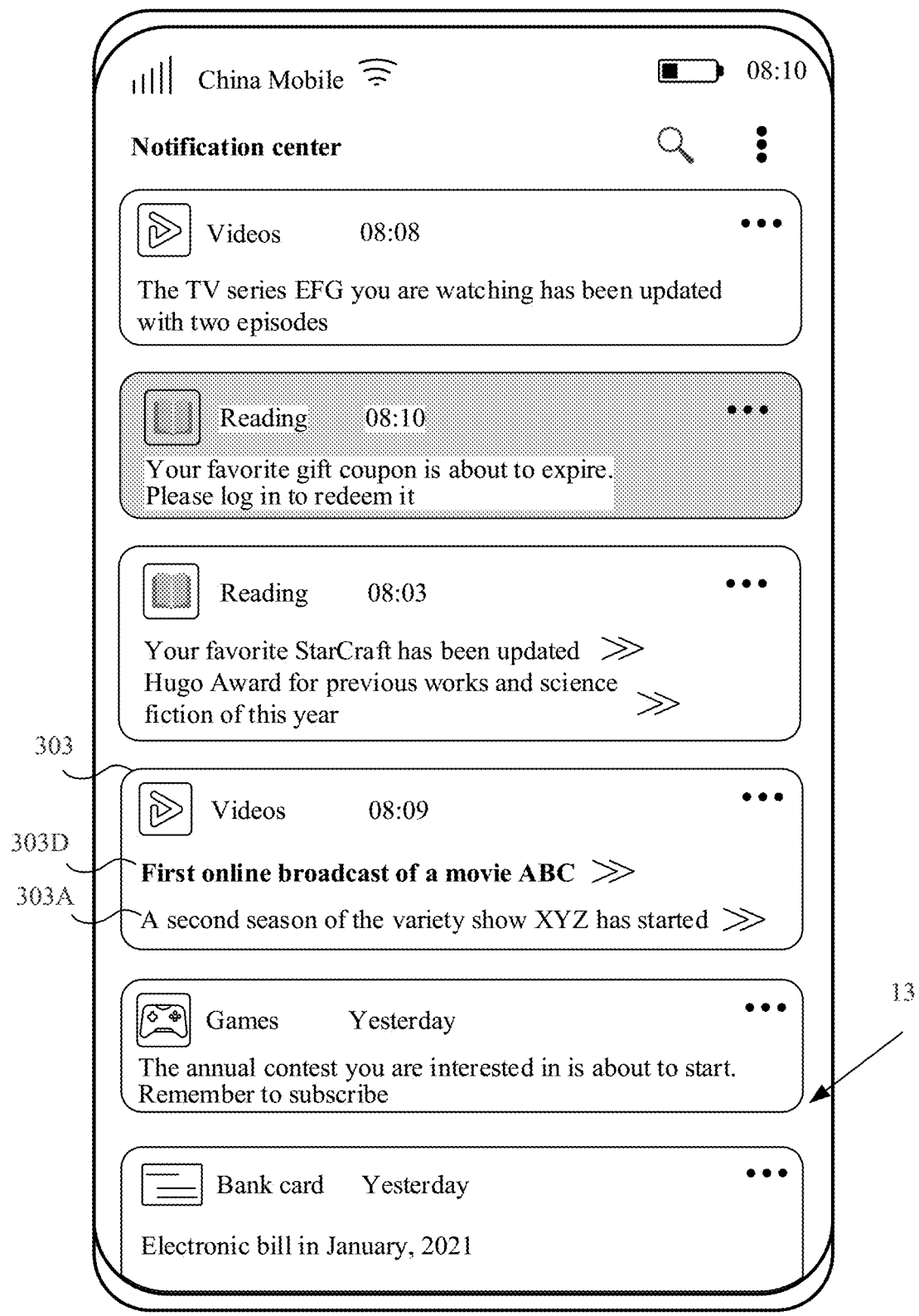
Figure 8E:
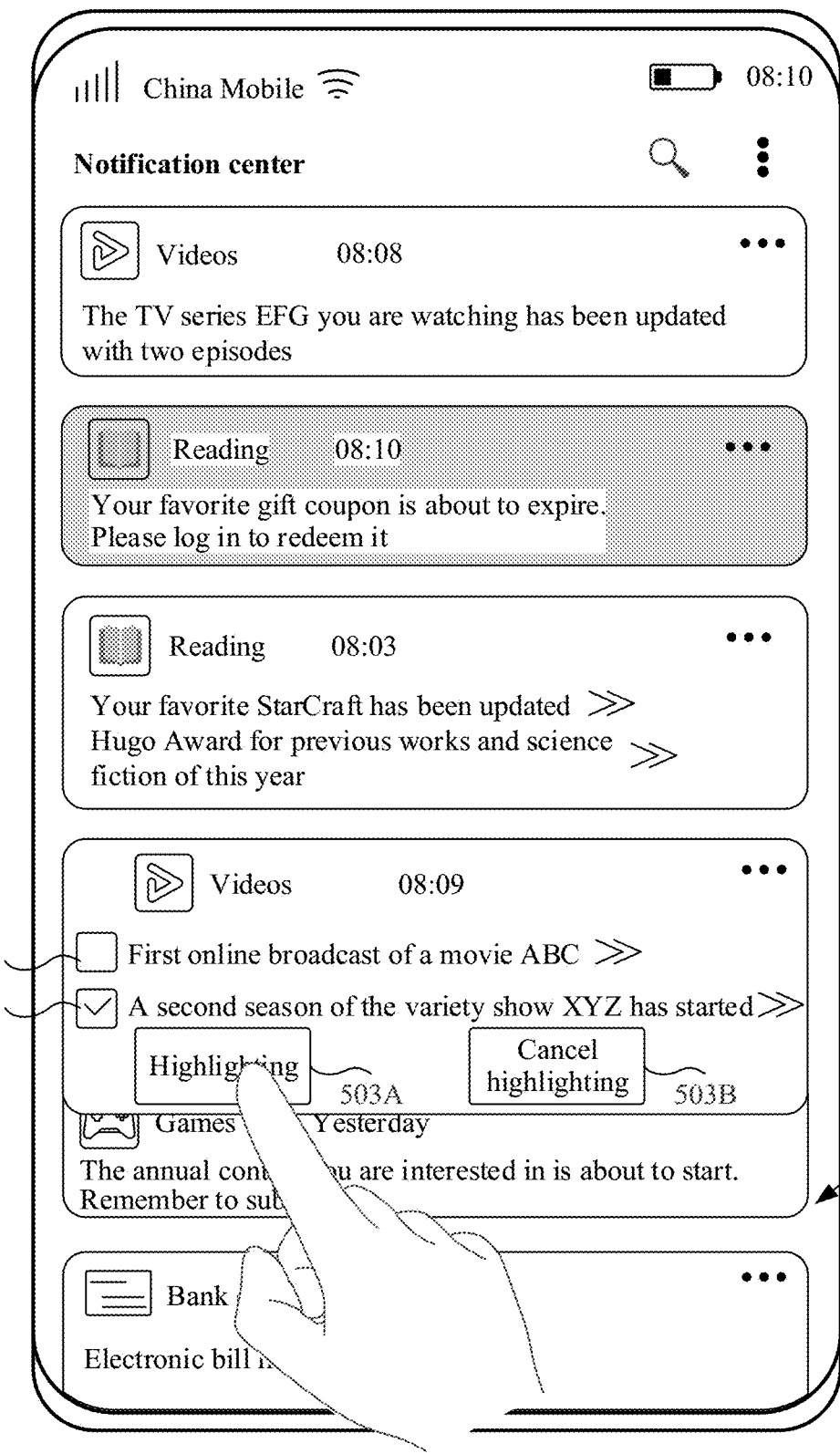
Figure 8F:
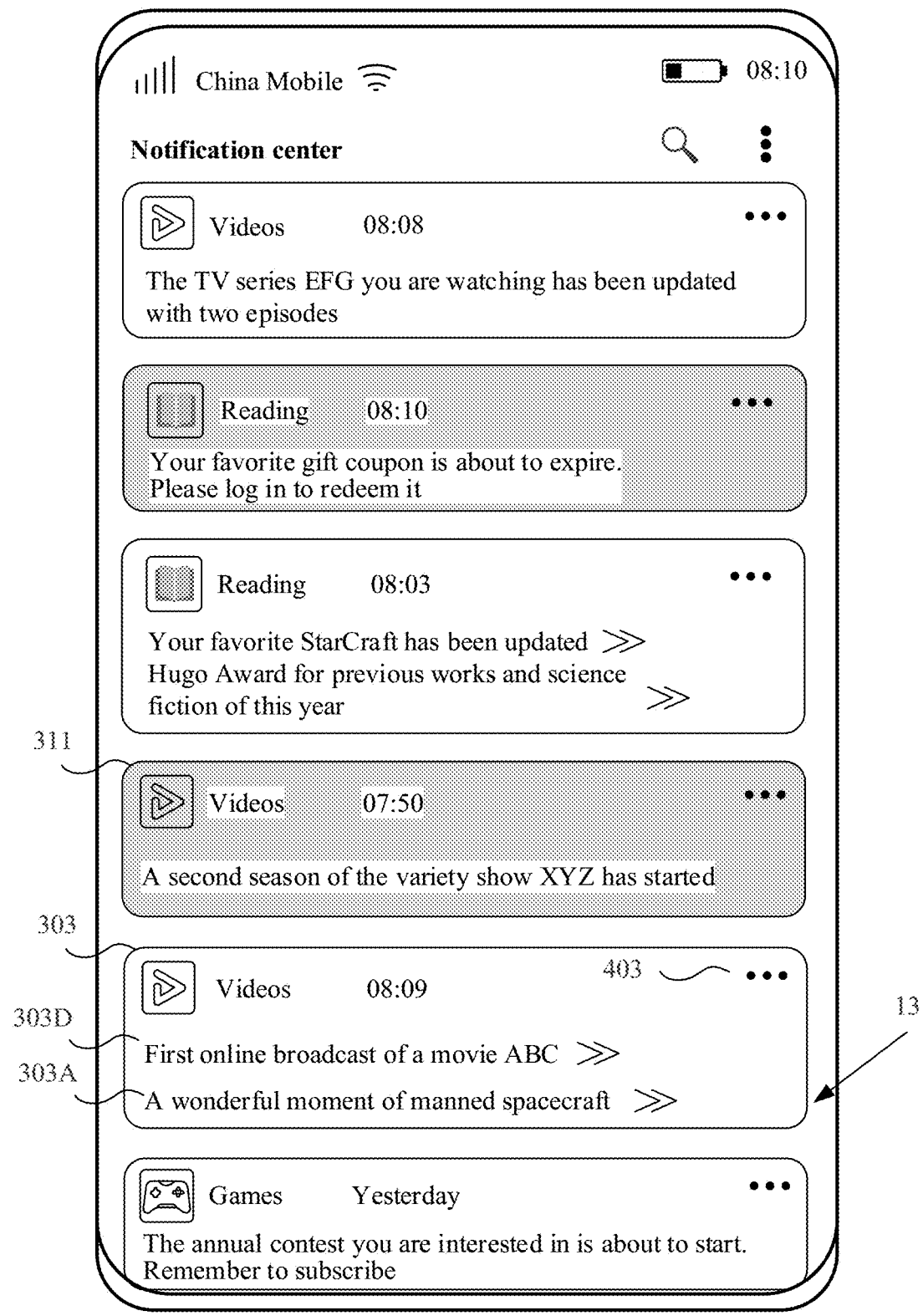

For example, as shown in FIG. 8C and FIG. 8D, after the user selects the selection control 502A, in response to an input operation (for example, a touch operation) performed on the "Highlighting" control 503A, the terminal device 100 highlights the push message 303D. It may be understood that, after the push message 303D is highlighted, the "Cancel highlighting" control 503B may be used to cancel highlighting on the push message 303D. As shown in FIG. 8E and FIG. 8F, after the user selects the selection control 502B, in response to an input operation (for example, a touch operation) for the "Highlighting" control 503A, the terminal device 100 highlights the push message 303D on a newly created message card 311.

In some embodiments, the message card 303 may receive an input operation (for example, a leftward sliding operation shown in FIG. 8A) of the user, and in response to the input operation, the terminal device 100 may highlight all push messages in the message card 303. For example, a color of background light of the message card 303 is changed, or all push messages of the message card 303 are displayed in bold.

In some embodiments, the push message 1 on the user interface 13 may receive an input operation of the user, and in response to the input operation, the terminal device 100 may change a view state of the push message 1. The view state of the push message 1 includes a read state and an unread state. In some embodiments, the push message 1 on the user interface 13 may receive an input operation of the user, and in response to the input operation, the terminal device 100 may delete the push message 1.

For a message card including only one push message, the following uses the message card 310 as an example to describe how a user manually sets a view state of the push message and how to delete the push message.

Figure 9A:
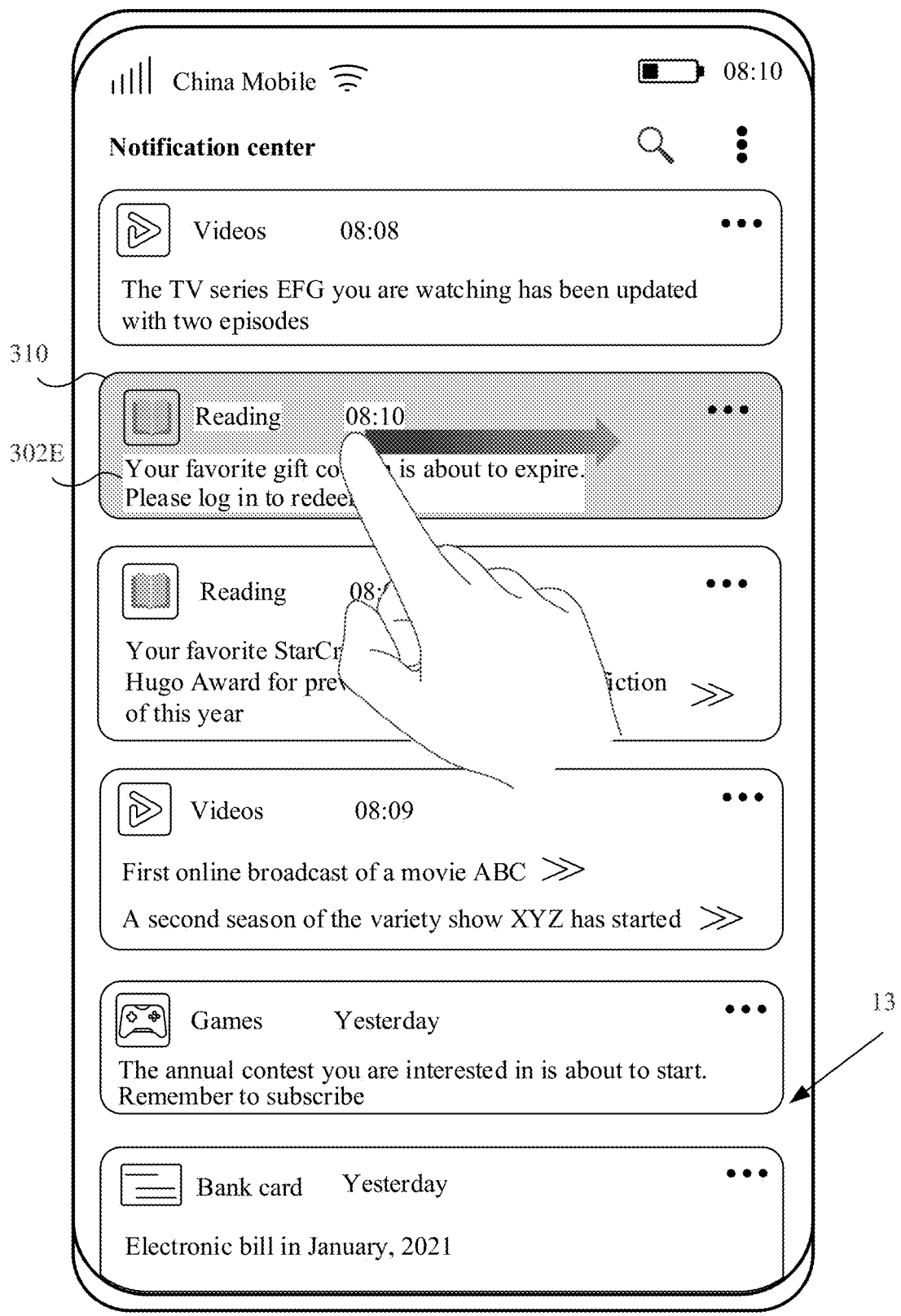
FIG. 9A to FIG. 9C are a schematic diagram of a user interface for manual deletion according to an embodiment of this application.
Figure 9B:
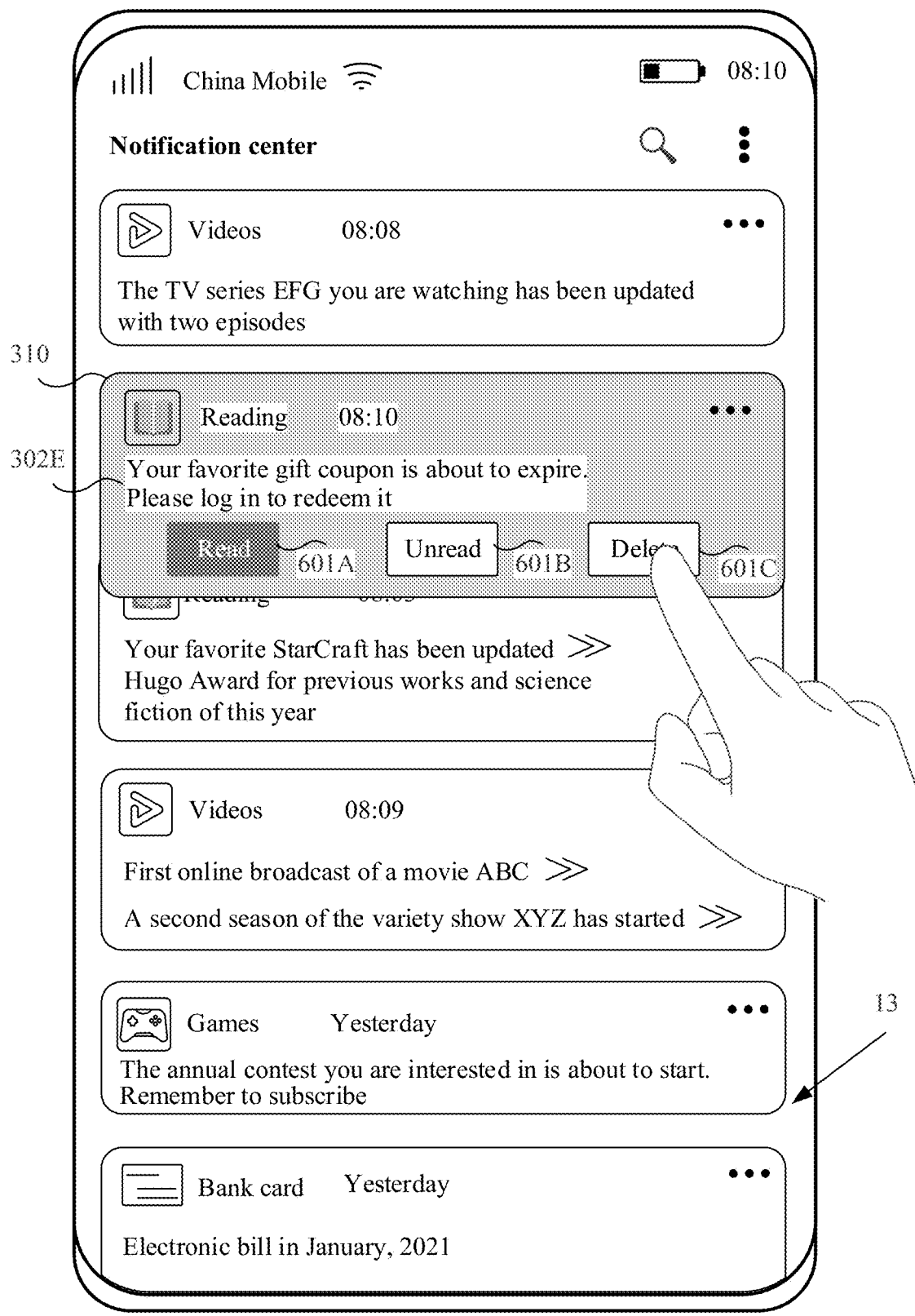
Figure 9C:
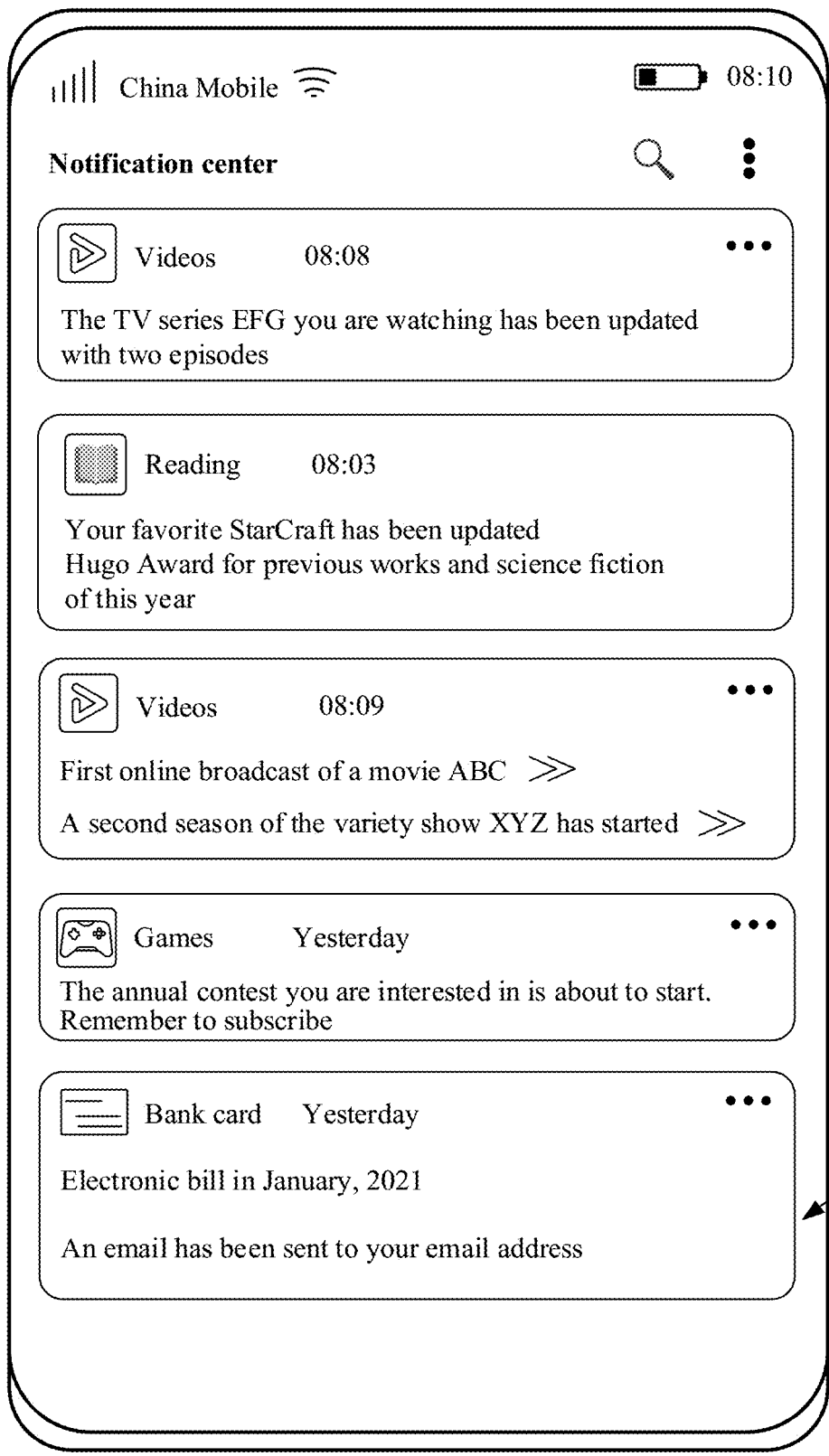

For example, as shown in FIG. 9A and FIG. 9B, the message card 310 includes the push message 302E, and the message card 310 may receive an input operation (for example, a rightward sliding operation shown in FIG. 9A) of the user. In response to the input operation, the terminal device 100 displays a "Read" control 601A, an "Unread" control 601B, and a "Delete" control 601C. The "Read" control 601A is configured to modify a view state of the push message 302E to a read state, and the "Unread" control 601B is configured to modify the view state of the push message 302E to an unread state. The "Read" control 601A shown in FIG. 9B is highlighted. This represents that the push message 302E is currently in a read state. As shown in FIG. 9C, in response to an input operation (for example, a touch operation) for the "Delete" control 601C, the terminal device 100 deletes the push message 302E.

For a message card including a plurality of push messages, the following uses the message card 303 as an example to describe how a user manually sets a view state of the push message and how to delete the push message.

Figure 10A:
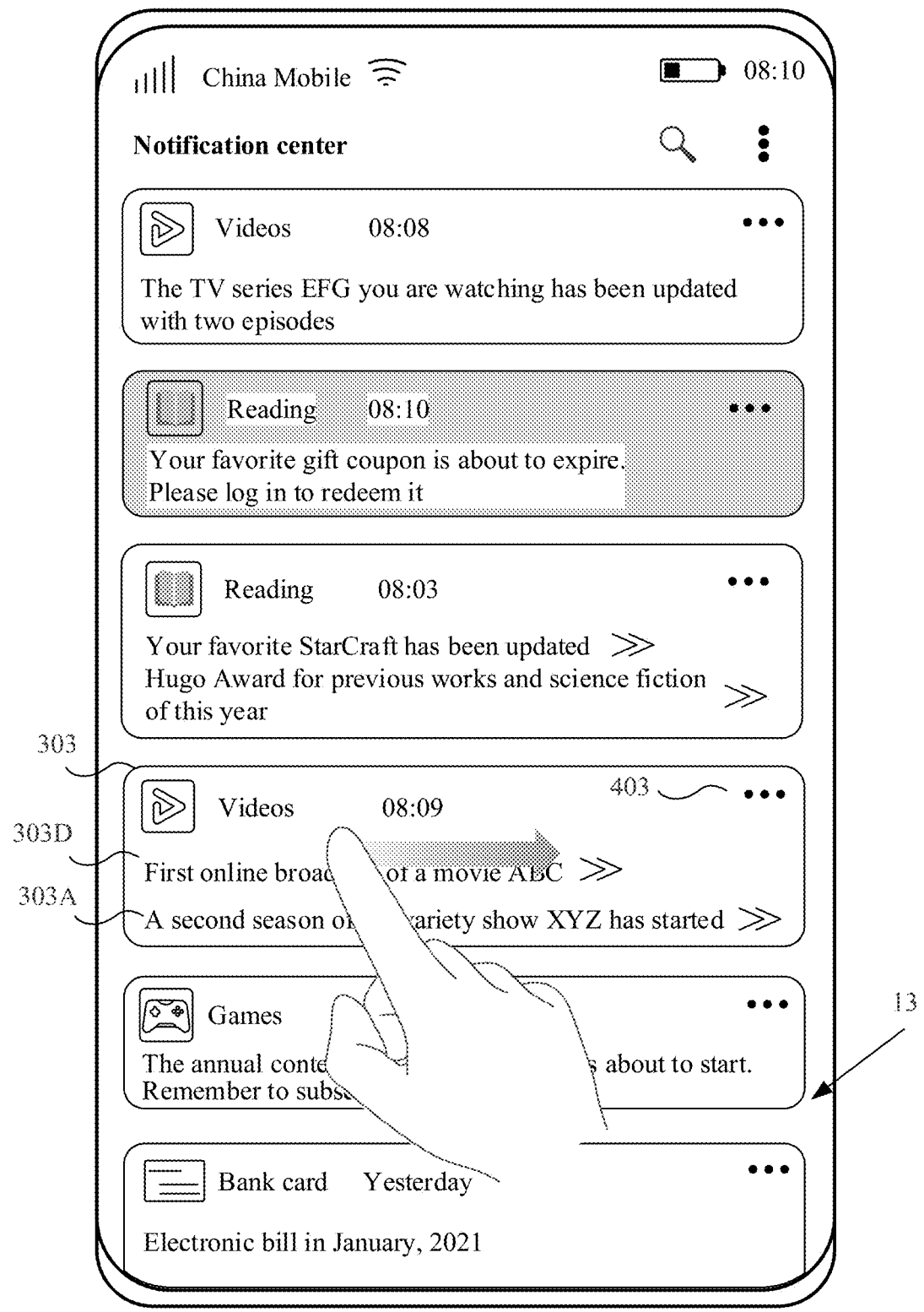
Figure 10B:
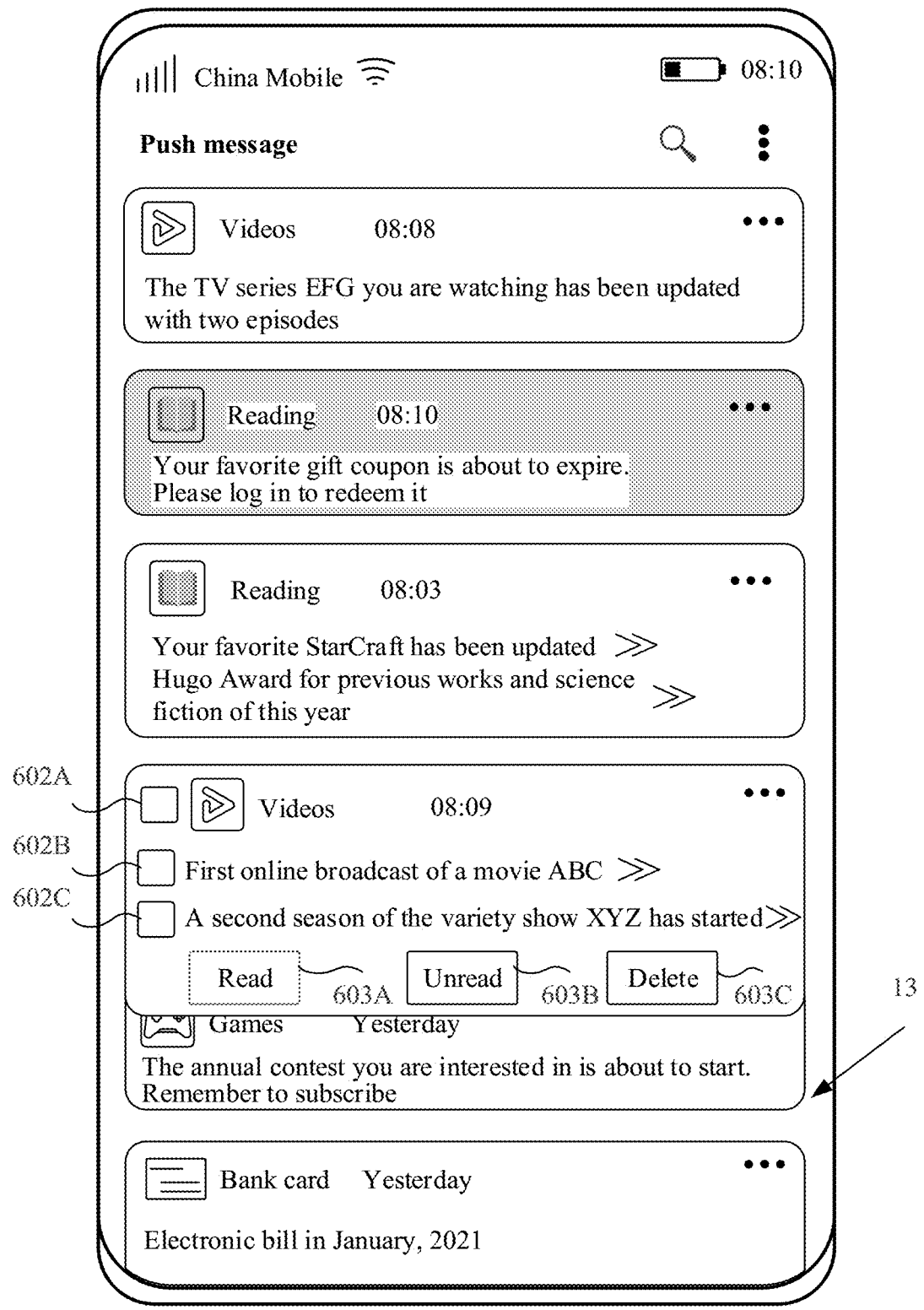

For example, as shown in FIG. 10A and FIG. 10B, the message card 303 includes the push message 303D and the push message 303A, and the message card 303 may receive an input operation (for example, a rightward sliding operation shown in FIG. 10A) of the user. In response to the input operation, the terminal device 100 displays a selection control 602A of the video app, a selection control 602B of the push message 303D, a selection control 602C of the push message 303A, a "Read" control 603A, an "Unread" control 603B, and a "Delete" control 603C.

Figure 10D:
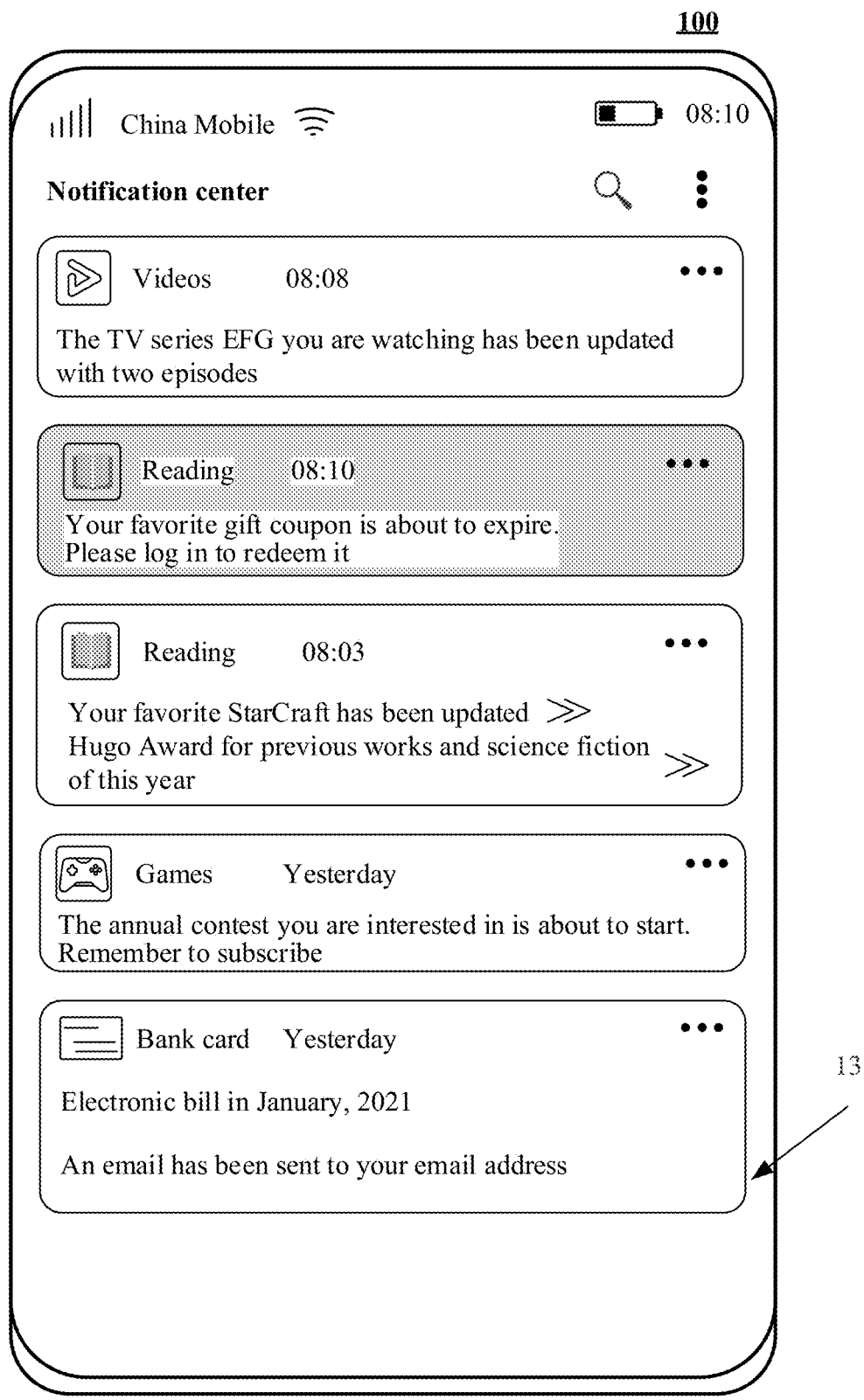

As shown in FIG. 10C, when the user selects the selection control 602A, the "Read" control 603A is configured to modify view states of all push messages in the message card 303 to read states, and the "Unread" control 603B is configured to modify view states of all push messages in the message card 303 to unread states, and the "Delete" control 603C is configured to delete all push messages managed by the message card 303. As shown in FIG. 10D, in response to an input operation (for example, a touch operation) for the "Delete" control 603C, the terminal device 100 deletes the message card 303.

Figure 10E:
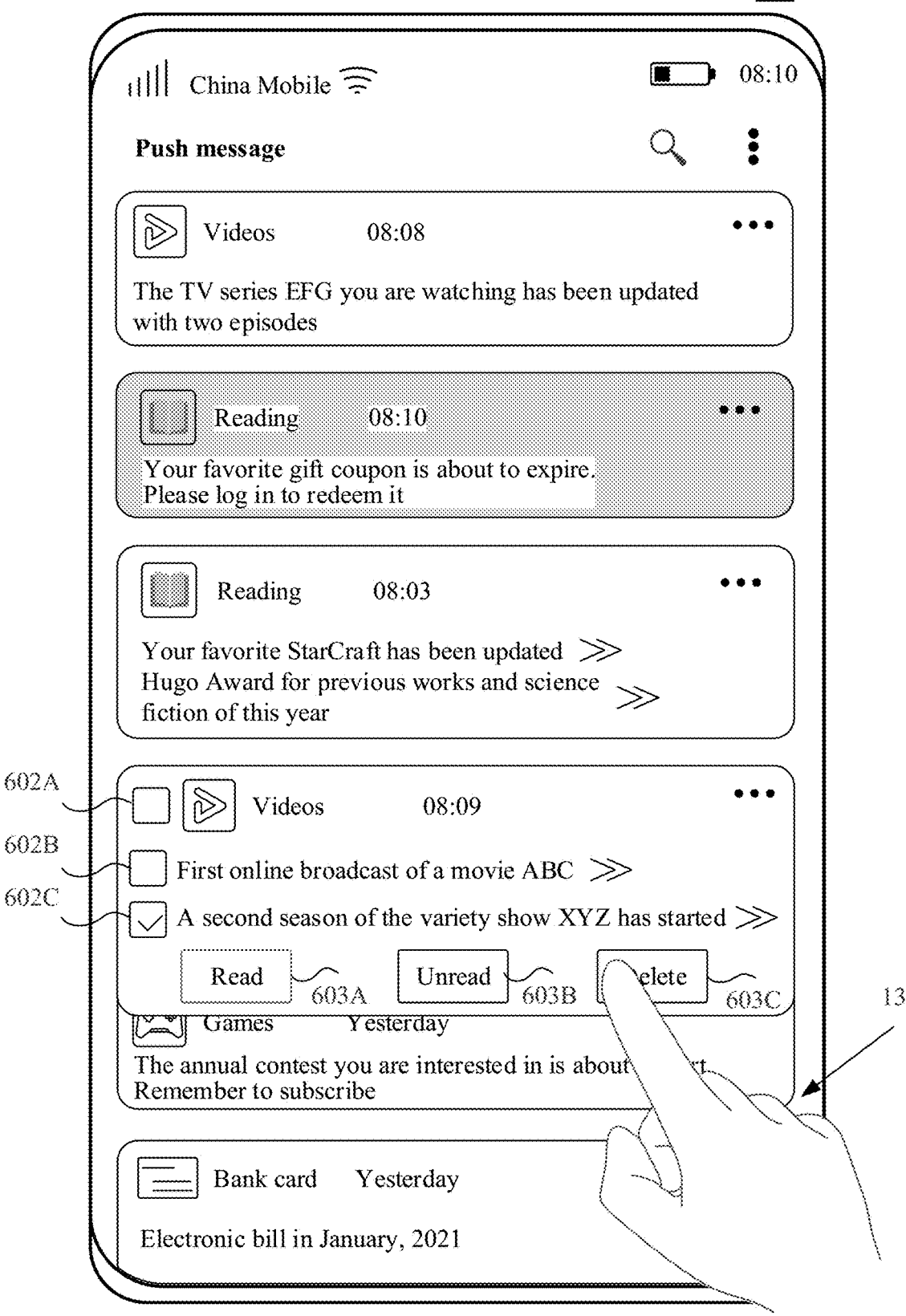
Figure 10F:
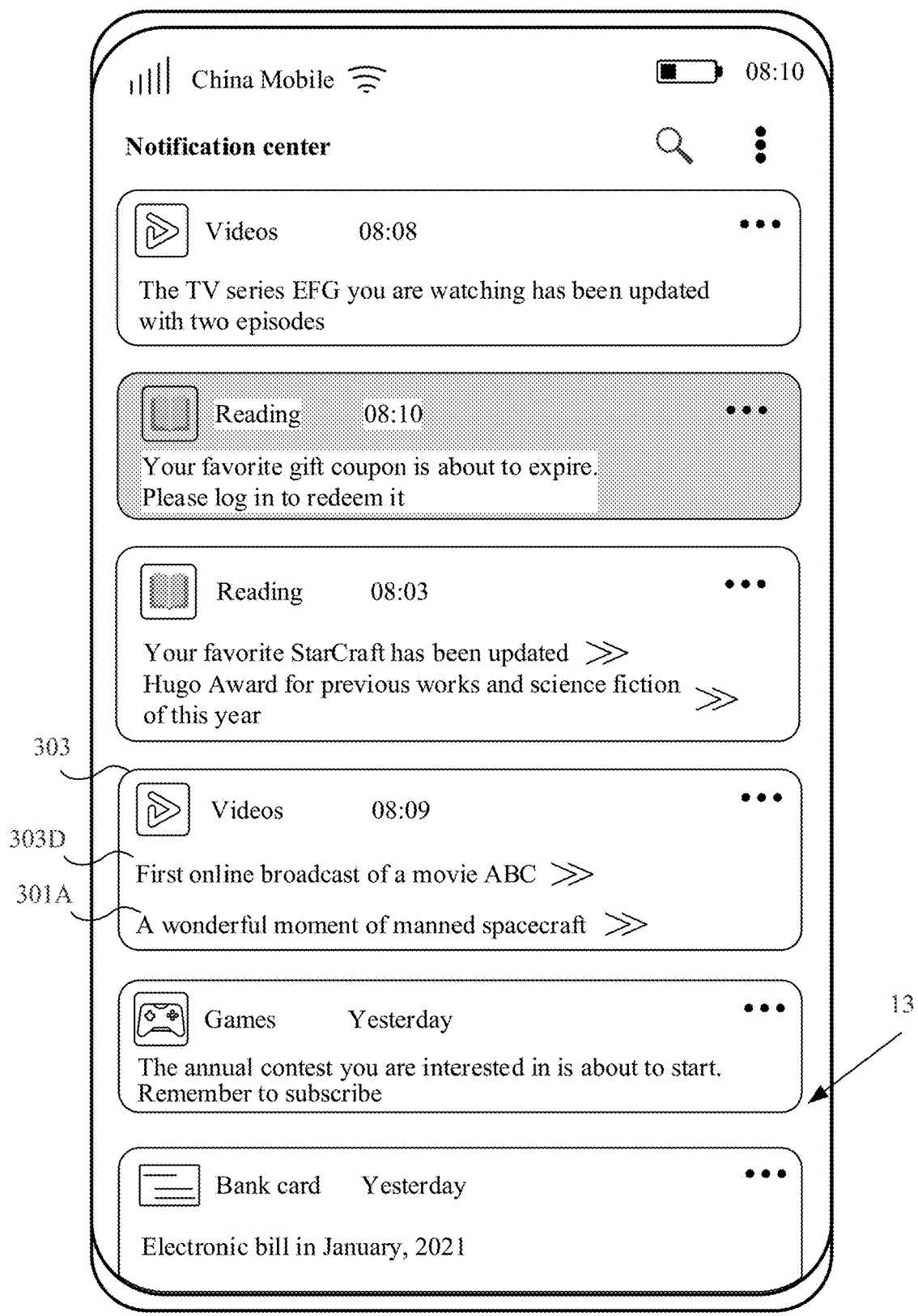

As shown in FIG. 10E, the push message 303A is used as an example. When the user selects the selection control 602C corresponding to the push message 303A, the "Read" control 603A is configured to modify a view state of the push message 303A to a read state, the "Unread" control 603B is configured to modify the view state of the push message 303A to an unread state, and the "Delete" control 603C is configured to delete the push message 303A. As shown in FIG. 10F, in response to an input operation (for example, a touch operation) for the "Delete" control 603C, the terminal device 100 deletes the push message 303A in the message card 303.

Based on the Foregoing Schematic Diagrams of the Communications System 10, the Software System Architecture, and the Application Scenario, the Following Describes a Message Processing Method Provided in Embodiments of this Application.

In the proposed message processing method, a push message 1 delivered by an app server 200 to a terminal device 100 by using a push server 300 may carry a persistence mark, a global pinning-to-top mark, an in-app pinning-to-top mark, and/or a highlighting mark. When the push message 1 carries a persistence mark, the terminal device 100 may store the push message 1 within persistence duration of the push message 1, to prevent the push message 1 from being automatically cleared by the system. When the push message 1 carries a global pinning-to-top mark, an in-app pinning-to-top mark, and/or a highlighting mark, correspondingly, the terminal device 100 may perform global pinning-to-top, in-app pinning-to-top, and/or highlighting on the push message 1, to increase exposure of the push message 1. In this way, it is convenient for a user to quickly locate the push message 1.

Figure 11A:
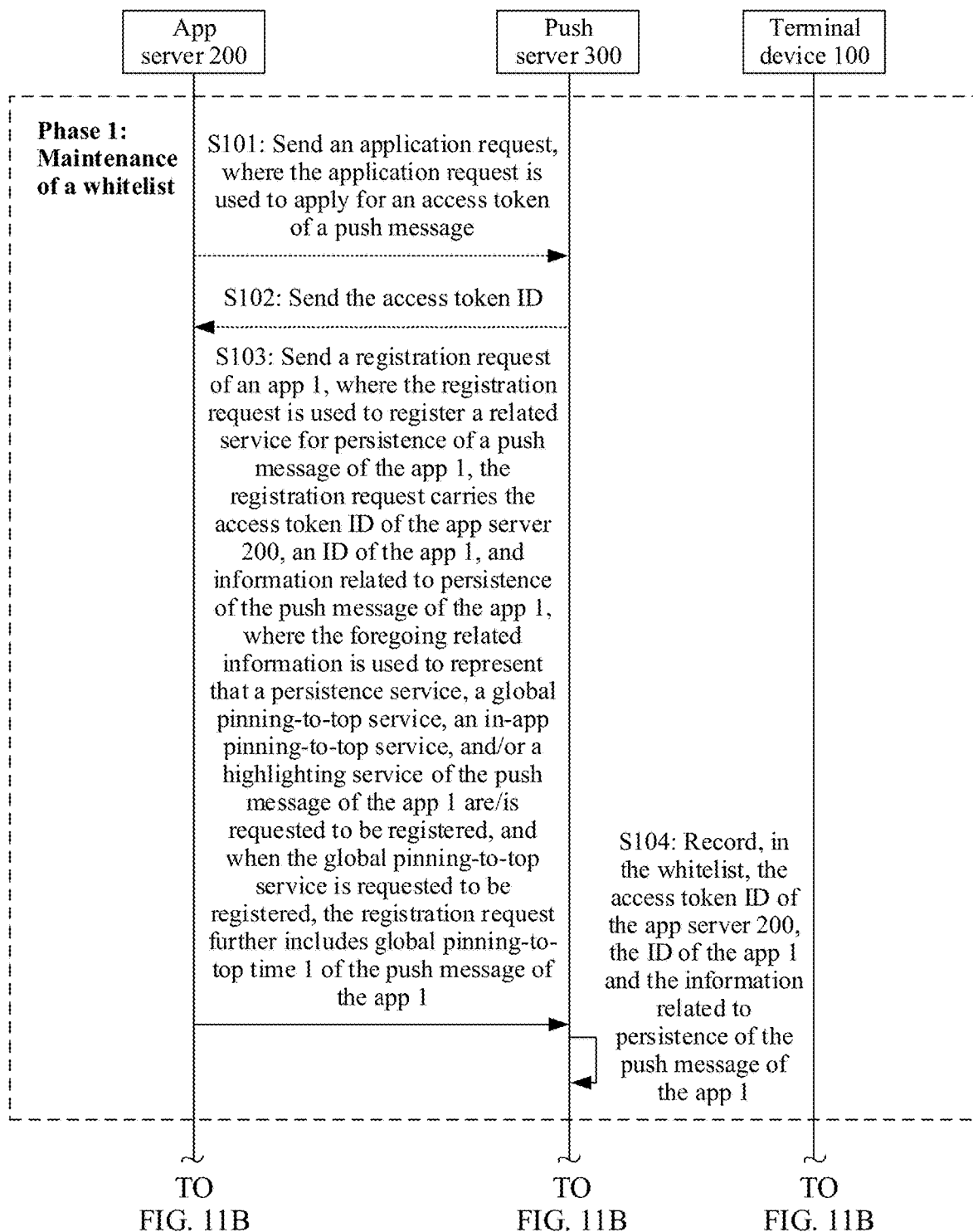
FIG. 11A to FIG. 11C are a schematic flowchart of a message processing method according to an embodiment of this application.
Figure 11B:
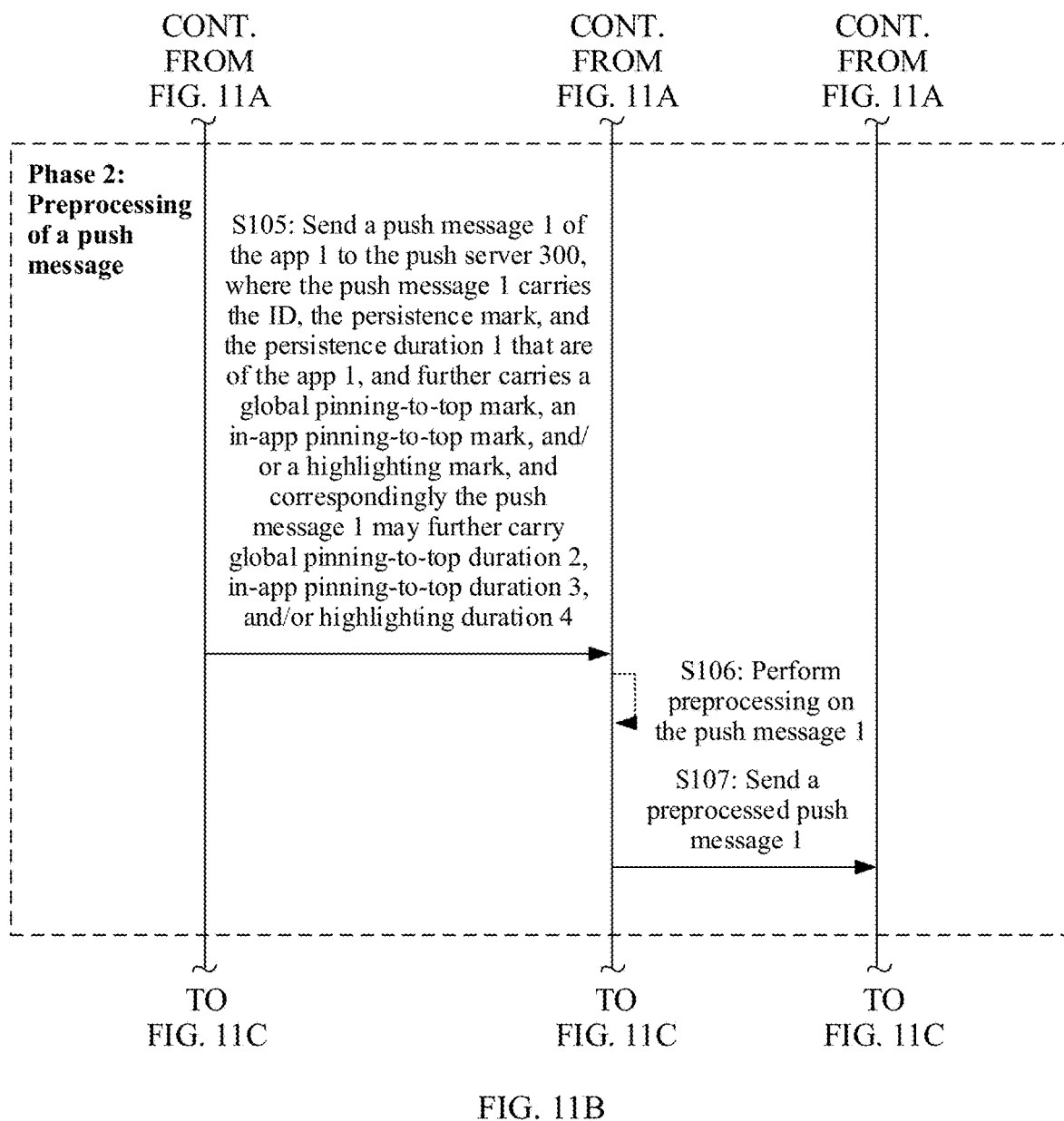
Figure 11C:
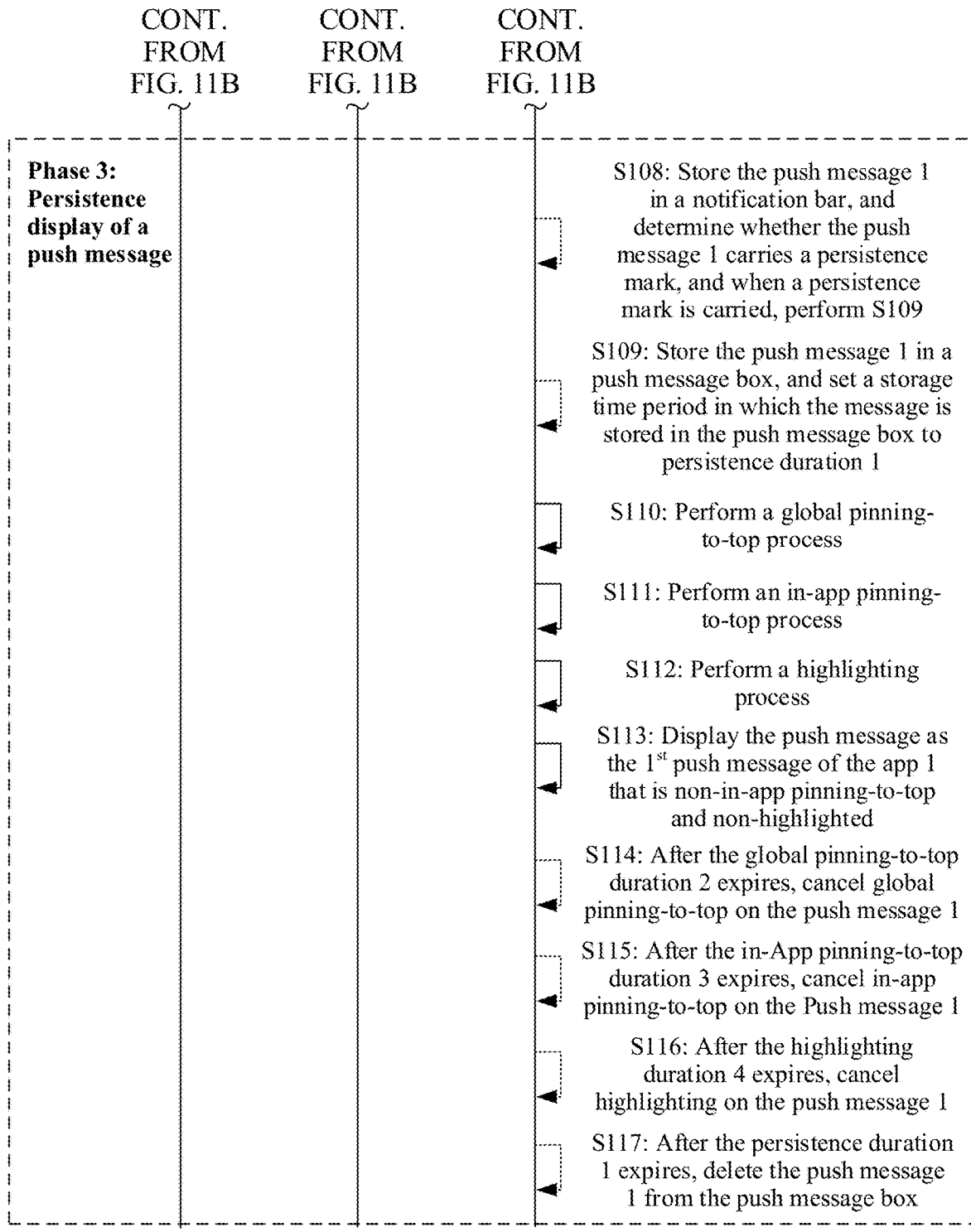

FIG. 11A to FIG. 11C show a schematic flowchart of a message processing method according to an embodiment of this application. The message processing method includes but is not limited to step S101 to step S106.

Phase 1: Maintenance of a Whitelist

S101: The app server 200 sends an application request to the push server 300, where the application request is used to apply for an access token ID of a push message of the app server 200.

S102: Send the access token ID.

S103: Send a registration request of an app 1, where the registration request is used to register a related service for persistence of a push message of the app 1, the registration request carries the access token ID of the app server 200, an ID of the app 1, and information related to persistence of the push message of the app 1, where the foregoing related information is used to represent that a persistence service, a global pinning-to-top service, an in-app pinning-to-top service, and/or a highlighting service of the push message of the app 1 are/is requested to be registered, and when the global pinning-to-top service is requested to be registered, the registration request further includes global pinning-to-top time 1 of the push message of the app 1.

In some embodiments, when the registration request does not request to register the persistence service, a registration request of another service (for example, the global pinning-to-top service, the in-app pinning-to-top service, and/or the highlighting service) is invalid.

S104: The push server 300 records, in the whitelist, the access token ID of the app server 200, the ID of the app 1, and the information related to persistence of the push message of the app 1.

In some embodiments, the push server 300 records, in Table 1 of the whitelist, the access token ID of the app server 200, the ID of the app 1, whether the app 1 registers the persistence service, whether the app 1 registers the global pinning-to-top service, whether the app 1 registers the in-app pinning-to-top service, and whether the app 1 registers the highlighting service. If the app 1 registers the global pinning-to-top service, the push server 300 further records, in Table 2 of the whitelist, the access token ID of the app server 200, the ID of the app 1, and the global pinning-to-top time 1 of the push message of the app 1. Optionally, the global pinning-to-top time of the push message includes a global pinning-to-top date and/or a global pinning-to-top time period in a day.

In some embodiments, a plurality of global pinning-to-top time periods may be set for one app ID in a day. In some embodiments, total global pinning-to-top duration corresponding to one app ID in a day cannot exceed preset duration.

TABLE 1 of the whitelist

| Token ID | App ID | Whether to perform persistence | Whether to perform global pinning-to-top | Whether to perform in-app pinning-to-top | Whether to perform highlighting |
|---|---|---|---|---|---|
| abc | TTTT | Yes | Yes | Yes | No |
| def | FFFF | Yes | Yes | No | Yes |
| ... | ... | ... | ... | ... | ... |

TABLE 2 of the whitelist

| Token ID | App ID | Global pinning-to-top date | Global pinning-to-top time period |
|---|---|---|---|
| abc | TTTT | YYYY-MM-DD | 20:00~21:00 |
| def | FFFF | YYYY-MM-DD | 13:00~14:00 |
| ... | ... | ... | ... |

In some embodiments, as shown in Table 1 and Table 2, for a record of each app (for example, the app 1) in the whitelist, the push server 300 can set "Whether to perform global pinning-to-top", "Whether to perform in-app pinningto-top", "Whether to perform highlighting", and "Global pinning-to-top time" in the whitelist record of the app 1 only when "whether to perform persistence" of the app 1 is set to "Yes". When "Whether to perform persistence" is set to "No", another value, or null, other settings in the record of app 1 are invalid.

In some embodiments, after step S104, the method further includes: the push server 300 sends a registration response to the app server 200, where the registration response is used to notify the app server 200 whether the registration request is successfully registered.

Phase 2: Preprocessing of a Push Message

S105: The app server 200 sends a push message 1 of the app 1 to the push server 300, where the push message 1 carries the ID, the persistence mark, and the persistence duration 1 that are of the app 1, and further carries a global pinning-to-top mark, an in-app pinning-to-top mark, and/or a highlighting mark, and correspondingly the push message 1 may further carry global pinning-to-top duration 2, in-app pinning-to-top duration 3, and/or highlighting duration 4.

The persistence duration 1 is used to indicate duration for a push message box to store the push message 1, where the duration may be referred to as persistence duration. The global pinning-to-top duration 2 is used to indicate global pinning-to-top duration of the push message 1 in the push message box. The in-app pinning-to-top duration 3 is used to indicate in-app pinning-to-top duration of the push message 1 in the push message box. The highlighting duration 4 is used to indicate highlighting duration of the push message 1 in the push message box.

In some embodiments, the persistence duration 1 is greater than the global pinning-to-top duration 2, the in-app pinning-to-top duration 3, and the highlighting duration 4.

In some embodiments, in step S105, the push message 1 may not carry the persistence duration 1, the global pinning-to-top duration 2, the in-app pinning-to-top duration 3, and/or the highlighting duration 4. Optionally, persistence duration, global pinning-to-top duration, in-app pinning-to-top duration, and/or highlighting duration of all push messages of the app 1 may be preset by both the terminal device 100 and the app server 200 before step S105. Optionally, persistence duration, global pinning-to-top duration, in-app pinning-to-top duration, and/or highlighting duration of push messages of all apps are the same, and may be preset by the push server or the terminal device 100.

In some embodiments, in step S105, the push message 1 may carry only the persistence duration 1, and does not carry the global pinning-to-top duration 2, the in-app pinning-to-top duration 3, and/or the highlighting duration 4. The terminal device 100 may determine the global pinning-to-top duration 2, the in-app pinning-to-top duration 3, and the highlighting duration 4 based on the persistence duration 1. Optionally, the terminal device 100 determines that the global pinning-to-top duration 2, the in-app pinning-to-top duration 3, and the highlighting duration 4 are all equal to the persistence duration 1.

S106: The push server 300 performs preprocessing on the push message 1.

S107: The push server 300 sends a preprocessed push message 1 to the terminal device 100.

Figure 12A:
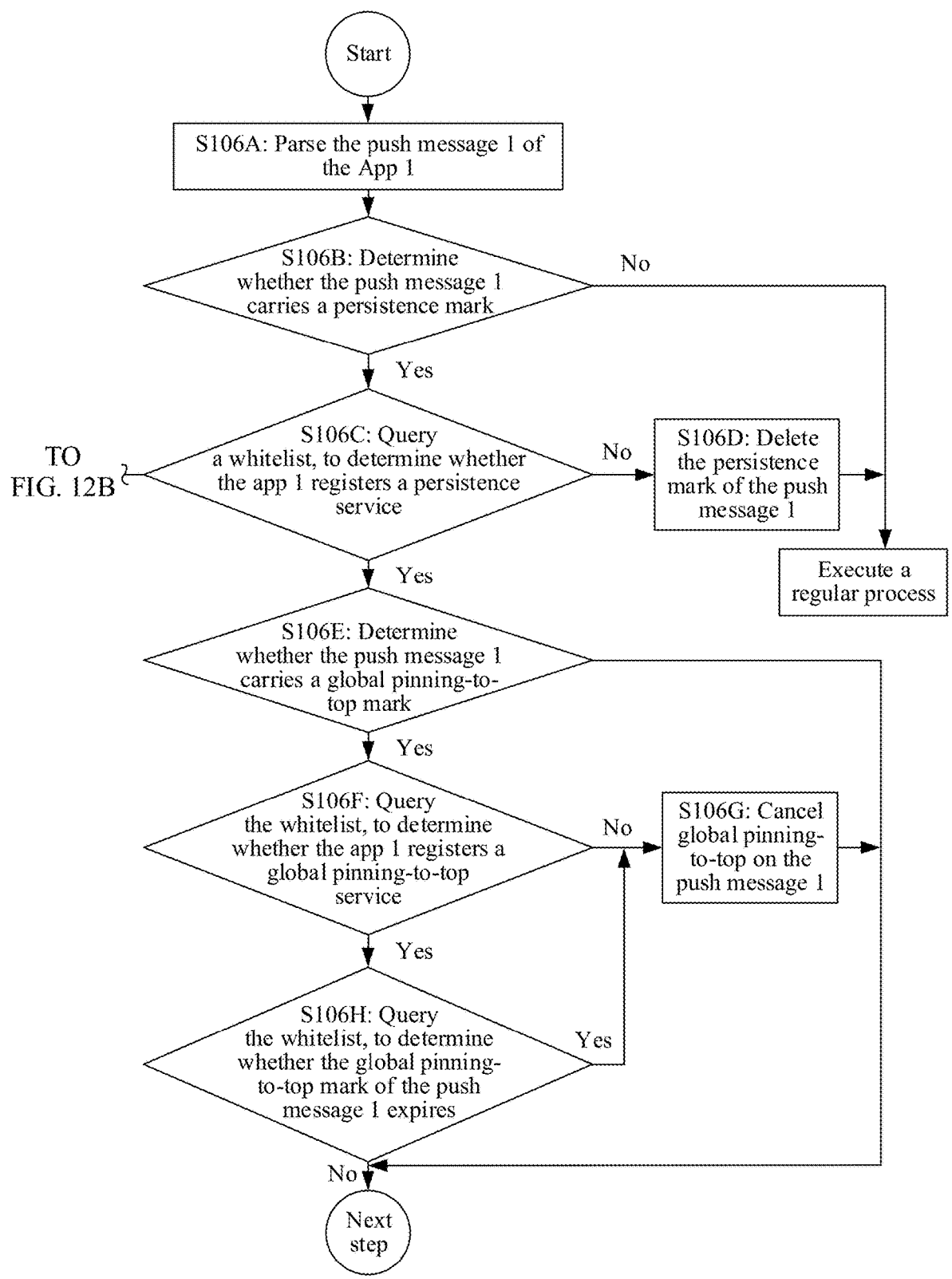
FIG. 12A and FIG. 12B are a schematic flowchart of a push message preprocessing method according to an embodiment of this application.
Figure 12B:
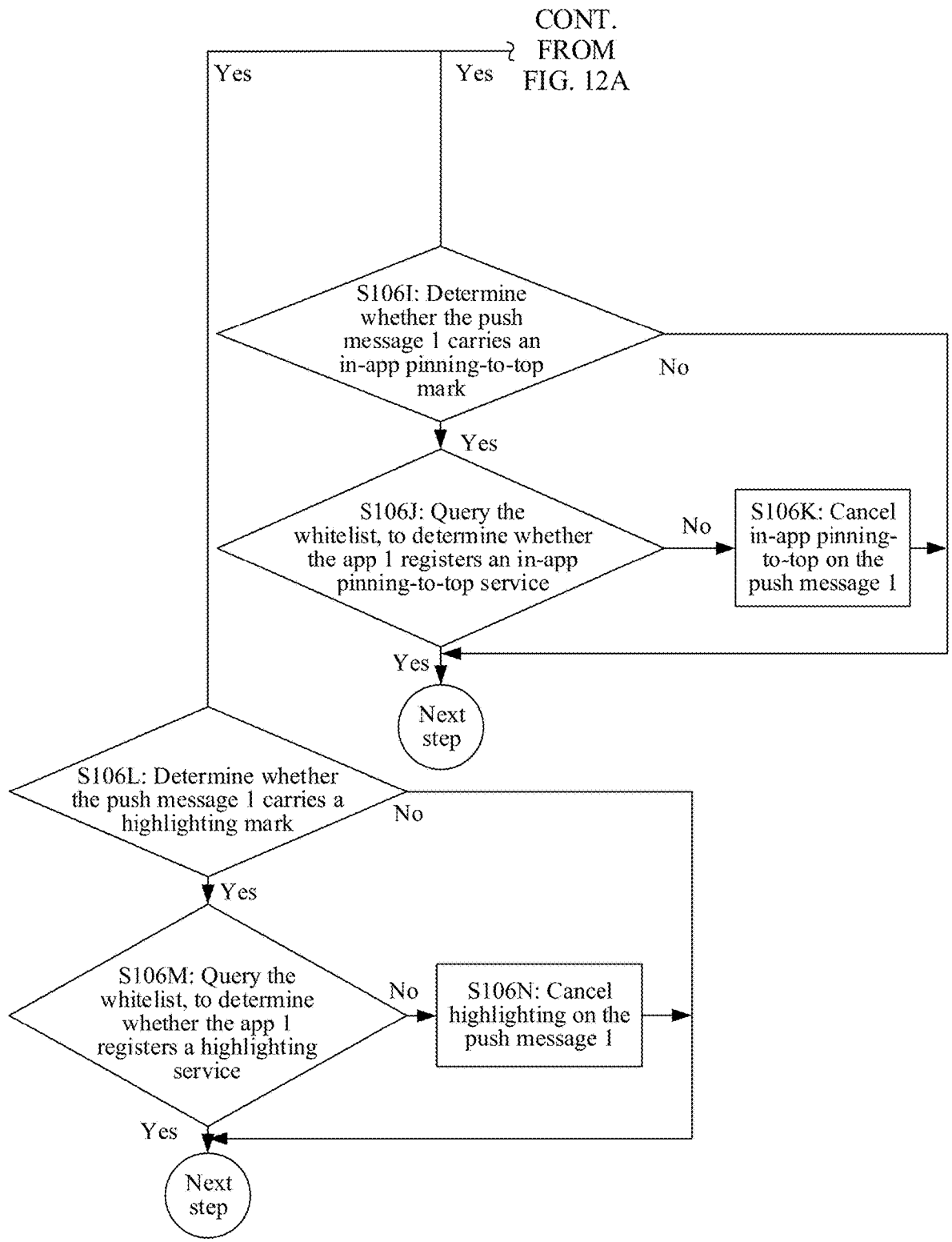

In some embodiments, for a process of preprocessing the push message 1 by the push server 300, refer to FIG. 12A and FIG. 12B. As shown in FIG. 12A and FIG. 12B, the preprocessing process includes but is not limited to S106A to S106N.

S106A: The push server 300 parses the push message 1 of the app 1.

S106B: The push server 300 determines whether the push message 1 carries a persistence mark; and performs S106C when a persistence mark is carried, S106C.

It should be noted that, if the push message 1 does not carry a persistence mark, after the push server 300 forwards the push message 1 to the terminal device 100, the terminal device 100 processes the push message 1 according to a conventional processing process for a push message, and does not store the push message 1 in the push message box. This is not described herein again.

For example, in some embodiments, the push message 1 carries the following fields:

```
1.   MsgBox{
2.     "storage":True //(True or False) Whether to perform persistence
3.       "Storage_duraction:120//Whether to store push message duraction, in seconds
4.     "Whole_Top":True//(True or False) Whether to perform global pinning-to-top
5.     "Whole_Top_duraction:120//Global pinning-to-top duration, in seconds
6.     "App_Top":True//(True or False) Whether to perform in-app pinning-to-top
7.     "App_Top_duraction:120//In-app pinning-to-top duration, in seconds
8.     "HighLight":True//(True or False) Whether to perform highlighting
9.     "HighLight_duraction:120//Highlighting duration, in seconds
10.  }
```

In an implementation, when a field "storage" carried in the push message 1 is "True", it indicates that the push message 1 carries a persistence mark; or when a field "storage" carried in the push message 1 is "False", or the push message 1 does not carry a field "storage", it indicates that the push message 1 does not carry a persistence mark. When a field "Whole_Top" carried in the push message 1 is "True", it indicates that the push message 1 carries a global pinning-to-top mark; or when a field "Whole_Top" carried in the push message 1 is "False", or the push message 1 does not carry a field "Whole_Top", it indicates that the push message 1 does not carry a global pinning-to-top mark. When a field "App_Top" carried in the push message 1 is "True", it indicates that the push message 1 carries an in-app pinning-to-top mark; or when a field "App_Top" carried in the push message 1 is "False", or the push message 1 does not carry a field "App_Top", it indicates that the push message 1 does not carry an in-app pinning-to-top mark. When a field "HighLight" carried in the push message 1 is "True", it indicates that the push message 1 carries a highlighting mark; or when a field "HighLight" carried in the push message 1 is "False", or the push message 1 does not carry a field "HighLight", it indicates that the push message 1 does not carry a highlighting mark.

In some embodiments, when the push message 1 does not carry a persistence mark, other marks (for example, a global pinning-to-top mark, an in-app pinning-to-top mark, and a highlighting mark) carried in the push message 1 are all invalid. Optionally, when the push message 1 does not carry a persistence mark, or the push message 1 carries a persistence mark but the app 1 does not register a persistence service, the push server 300 deletes other marks (for example, a global pinning-to-top mark, an in-app pinning-to-top mark, and a highlighting mark) carried in the push message 1.

S106C: The push server 300 queries a whitelist based on an ID of the app 1 that is carried in the push message 1, to determine whether the app 1 registers a persistence service; and performs S106D when no persistence service is registered; or performs S106E, S106I, and S106I when the persistence service is registered.

S106D: The push server 300 deletes the persistence mark of the push message 1.

It should be noted that, after deleting the persistence mark of the push message 1, the push server 300 may forward the push message 1 to the terminal device 100. The terminal device 100 processes the push message 1 according to a conventional processing process for a push message, and does not store the push message 1 in the push message box. This is not described herein again.

In some embodiments, after deleting the persistence mark of the push message 1, the push server 300 sends a prompt message to the app server 200, to prompt that the app 1 does not register a persistence service and the push message 1 cannot be persistent.

It should be noted that a sequence for performing S106E, S106I, and S106I is not specifically limited in this embodiment of this application. Optionally, the terminal device 100 simultaneously performs S106E, S106I, and S106I. Optionally, the terminal device 100 sequentially performs S106E, S106I, and S106I in a preset sequence.

S106E: The push server 300 determines whether the push message 1 carries a global pinning-to-top mark; and performs S106F when a global pinning-to-top mark is carried; or performs a next step when no global pinning-to-top mark is carried.

S106F: The push server 300 queries a whitelist based on an ID of the app 1 that is carried in the push message 1, to determine whether the app 1 registers a global pinning-to-top service; and performs S106G when no global pinning-to-top service is registered; or performs S106H when the global pinning-to-top service is registered.

S106G: The push server 300 cancels global pinning-to-top on the push message 1, and performs a next step.

In some embodiments, the push server 300 deletes the global pinning-to-top mark of the push message 1.

Optionally, the push server 300 modifies a value of a field of the "global pinning-to-top mark" of the push message 1 to "False". For example, the field of the "global pinning-to-top mark" is "Whole_Top", and the push server 300 modifies the value of "Whole_Top" to "False".

S106H: The push server 300 queries the whitelist, to determine whether the global pinning-to-top mark of the push message 1 expires; and performs S106G when the global pinning-to-top mark of the push message 1 expires; or performs a next step when the global pinning-to-top mark of the push message 1 does not expire.

In some embodiments, the push server 300 queries the whitelist and determines a global pinning-to-top time of the app 1. When a current moment is before an end moment of the global pinning-to-top time of the app 1, the push server 300 determines that the global pinning-to-top mark of the push message 1 does not expire. Alternatively, when a current moment is not before an end moment of the global pinning-to-top time of the app 1, the push server 300 determines that the global pinning-to-top mark of the push message 1 expires.

In this embodiment of this application, step S106H is optional. In some embodiments, the registration request in step S103 may not carry the global pinning-to-top time of the app 1, and accordingly the terminal device 100 does not need to perform S106H.

It should be noted that, when the push server 300 first performs S106E to S106H, and then performs S106I to S106K (or S106L to S106N), that a next step is performed means that S106I (or S106L) is performed. When the push server 300 first performs S106I to S106K and S106L to S106N, and then performs S106E to S106, that a next step is performed means that S107 is performed.

S106I: The push server 300 determines whether the push message 1 carries an in-app pinning-to-top mark; and performs S106J when a global pinning-to-top mark is carried; or performs a next step when no global pinning-to-top mark is carried.

S106J: The push server 300 queries a whitelist based on an ID of the app 1 that is carried in the push message 1, to determine whether the app 1 registers an in-app pinning-to-top service; and performs S106K when no in-app pinning-to-top service is registered; or performs a next step when the global pinning-to-top service is registered.

S106K: The push server 300 cancels in-app pinning-to-top on the push message 1, and performs a next step.

In some embodiments, the push server 300 deletes the in-app pinning-to-top mark of the push message 1.

Optionally, the push server 300 modifies a value of a field of the "in-app pinning-to-top mark" of the push message 1 to "False". Optionally, the field of the "in-app pinning-to-top mark" is "App_Top", and the push server 300 modifies the value of "App_Top" to "False".

It should be noted that, when the push server 300 first performs S106I to S106K, and then performs S106E to S106H (or S106L to S106N), that a next step is performed means that S106E (or S106L) is performed. When the push server 300 first performs S106E to S106H and S106L to S106N, and then performs S106I to S106K, that a next step is performed means that S107 is performed.

S106L: The push server 300 determines whether the push message 1 carries a highlighting mark; and performs S106M when a highlighting mark is carried; or performs a next step when no highlighting mark is carried.

S106M: The push server 300 queries a whitelist based on an ID of the app 1 that is carried in the push message 1, to determine whether the app 1 registers a highlighting service; and performs S106K when no highlighting service is registered; or performs a next step when the highlighting service is registered.

S106N: The push server 300 cancels highlighting on the push message 1, and performs a next step.

In some embodiments, the push server 300 deletes the highlighting mark of the push message 1.

Optionally, the push server 300 modifies a value of a field of the "highlighting mark" to "False". Optionally, a field of the "highlighting mark" is "HighLight", and the push server 300 modifies the value of "HighLight" to "False".

It should be noted that, when the push server 300 first performs S106L to S106N, and then performs S106E to S106H (or S106I to S106K), that a next step is performed means that S106E (or S106I) is performed. When the push server 300 first performs S106E to S106H and S106I to S106K, and then performs S106L to S106N, that a next step is performed means that S107 is performed.

In this embodiment of this application, step S106 is optional. In some embodiments, the push server 300 may directly forward the push message 1 sent by the app server 200 to the terminal device 100 without preprocessing the push message 1.

Phase 3: Persistence Display of a Push Message

In this embodiment of this application, the terminal device 100 receives a preprocessed push message 1 sent by the push server 300. The terminal device 100 invokes a push service process to parse the push message 1, and performs persistence display of the push message 1 in the push message box based on each parameter in the push message 1.

S108: The terminal device 100 stores the push message 1 in a notification bar, determines whether the push message 1 carries a persistence mark, and performs S109 when a persistence mark is carried.

In some embodiments, when the push message 1 does not carry a persistence mark, the terminal device 100 performs processing according to an existing processing manner for a push message. This is not described herein again.

S109: The terminal device 100 stores the push message 1 in the push message box, and sets a storage time period in which the message is stored in the push message box to persistence duration 1.

S110: The terminal device 100 performs a global pinning-to-top process.

Figure 13:
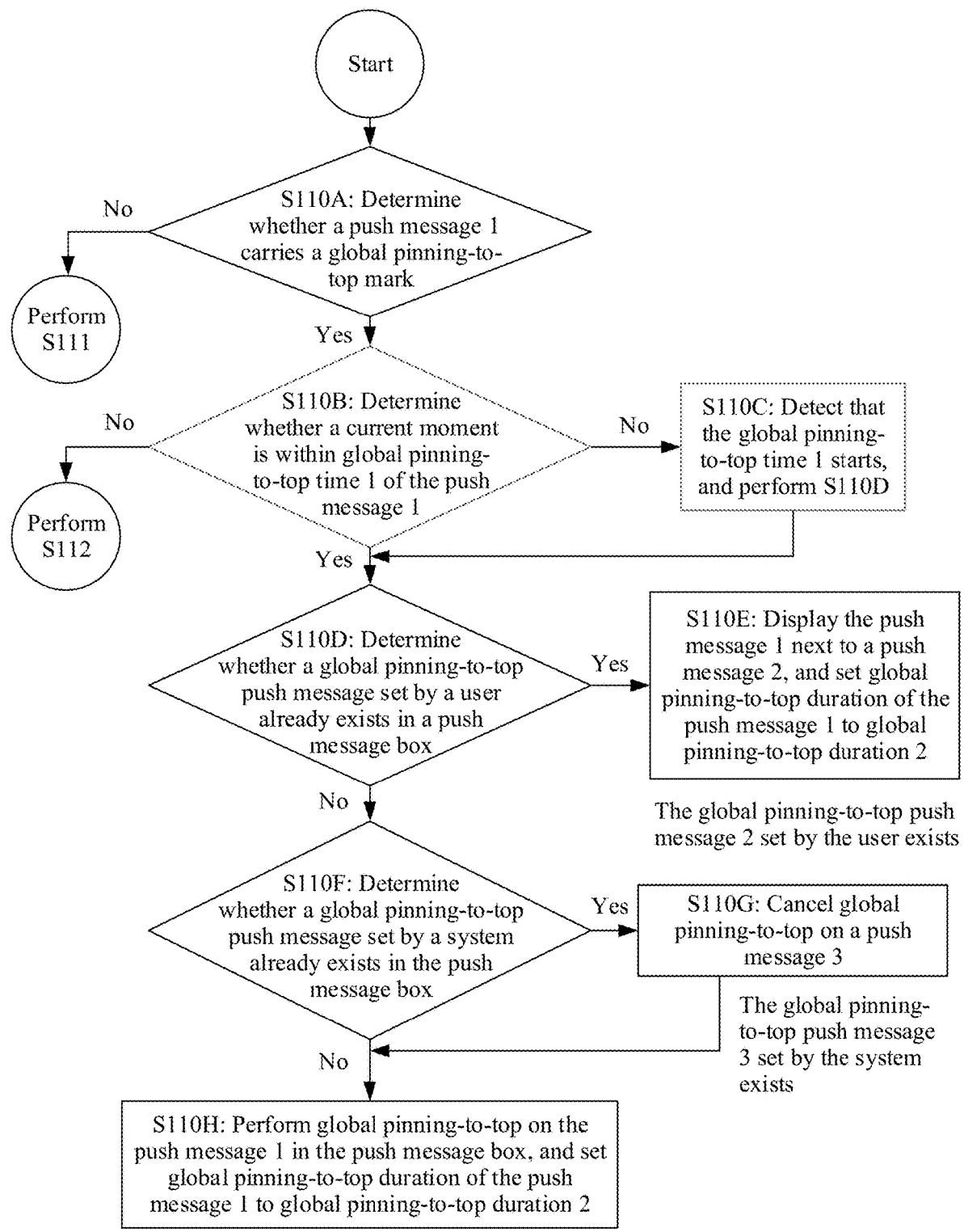
FIG. 13 is a schematic diagram of a global pinning-to-top process according to an embodiment of this application.

In some embodiments, for the global pinning-to-top process, refer to FIG. 13. As shown in FIG. 13, the global pinning-to-top process includes but is not limited to S110A to S110H.

S110A: The terminal device 100 determines whether the push message 1 carries a global pinning-to-top mark; and performs S110B when a global pinning-to-top mark is carried; or performs S111 when no global pinning-to-top mark is carried.

It may be understood that, when the push message 1 does not carry a global pinning-to-top mark, the terminal device 100 continues to determine whether the push message 1 carries an in-app pinning-to-top mark and/or a highlighting mark.

S110B: The terminal device 100 determines whether a current moment is within the global pinning-to-top time 1 of the push message 1; and performs S112 and S110C when the moment is not within the global pinning-to-top time 1; or performs S110D when the moment is within the global pinning-to-top time 1.

In some embodiments, before step S110, the method further includes: the push server 200 sends the global pinning-to-top time 1 of the app 1 to the terminal device 100. Optionally, the push message 1 delivered by the push server 200 carries the global pinning-to-top time 1 of the app 1.

S110C: The terminal device 100 detects that the global pinning-to-top time 1 starts, and performs S110D.

It can be known from the preprocessing process of the push server 300 that the global pinning-to-top mark of the push message 1 received by the terminal device 100 does not expire. The current moment is before a start moment of the global pinning-to-top time 1, or the current moment is after a start moment of the global pinning-to-top time 1 and before an end moment of the global pinning-to-top time 1.

In some embodiments, when the push message 1 carries a global pinning-to-top mark, but the current moment is not within the global pinning-to-top time 1, the terminal device 100 may perform S112, that is, continue to determine whether the push message 1 carries a highlighting mark. In this way, when the push message 1 further carries a highlighting mark, the terminal device 100 may first highlight the push message 1, and perform S110D after the global pinning-to-top time 1 starts.

S110D: The terminal device 100 determines whether a global pinning-to-top push message set by a user already exists in the push message box; and performs S110E when a global pinning-to-top push message 2 set by the user exists; or performs S110F when no global pinning-to-top push message set by the user exists.

In some embodiments, a global pinning-to-top priority set by the user for a push message is higher than a global pinning-to-top priority carried by the push message. Optionally, in a user interface of the push message box, compared with the global pinning-to-top push message delivered by the push server, the global pinning-to-top push message set by the user is closer to a top of the terminal device 100.

S110E: The terminal device 100 displays the push message 1 next to the push message 2, and sets global pinning-to-top duration of the push message 1 to global pinning-to-top duration 2.

In some embodiments, after it is determined that the global pinning-to-top push message set by the user already exists in the push message box, the global pinning-to-top mark of the push message 1 is deleted, and S112 is performed.

S110F: The terminal device 100 determines whether a global pinning-to-top push message set by a system already exists in the push message box; and performs S110G when a global pinning-to-top push message 3 set by the system exists; or performs S110H when no global pinning-to-top push message set by the system exists.

The global pinning-to-top push message set by the system refers to a global pinning-to-top push message set by the terminal device 100 based on a global pinning-to-top mark carried by the push message.

S110G: The terminal device 100 cancels global pinning-to-top on the push message 3, and then performs S110H.

S110H: The terminal device 100 performs global pinning-to-top on the push message 1 in the push message box (that is, displays the push message 1 as the $1^{st}$ push message on the top of the push message box) and sets the global pinning-to-top duration of the push message 1 to the global pinning-to-top duration 2.

For example, the push message 1 may be the global pinning-to-top push message 309A shown in FIG. 4A. After receiving the push message 309A, the terminal device 100 displays the push message 309A on the $1^{st}$ message card 309 of the user interface 13 shown in FIG. 4A.

S111: The terminal device 100 performs an in-app pinning-to-top process.

Figure 14:
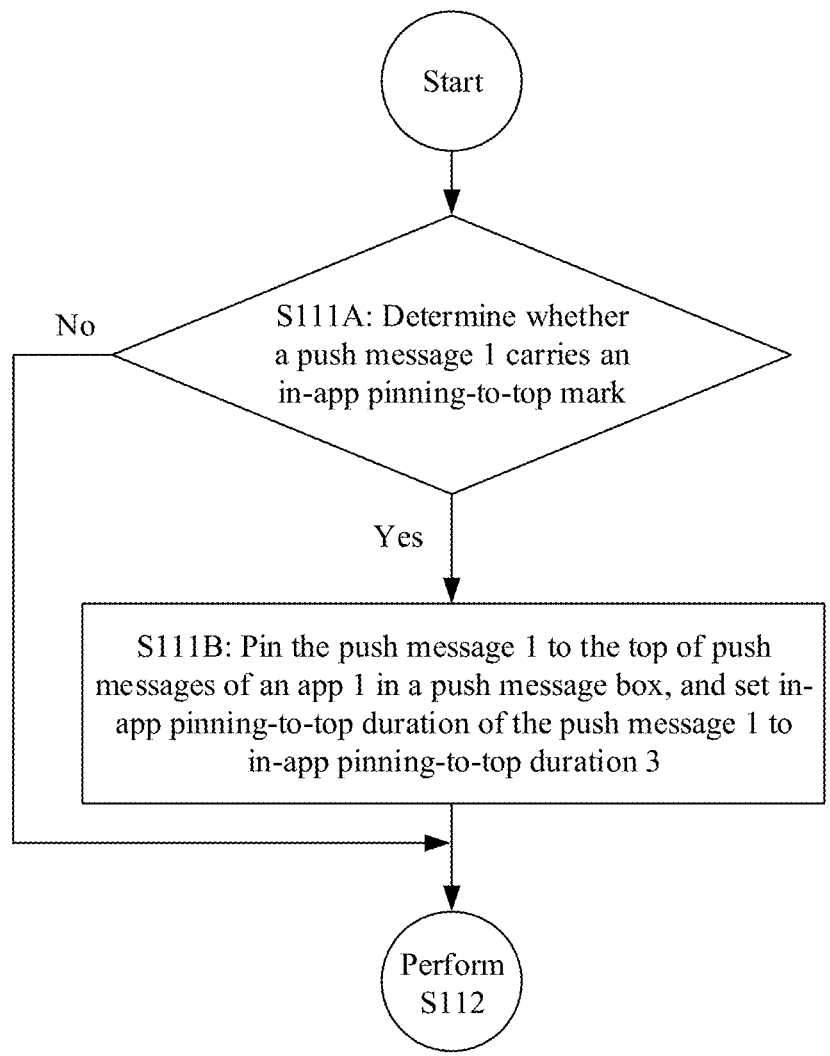
FIG. 14 is a schematic diagram of an in-app pinning-to-top process according to an embodiment of this application.

In some embodiments, for the in-app pinning-to-top process, refer to FIG. 14. As shown in FIG. 14, the global pinning-to-top process includes but is not limited to S111A and S111B.

S111A: The terminal device 100 determines whether the push message 1 carries an in-app pinning-to-top mark; and performs S111B when an in-app pinning-to-top mark is carried; or performs S112 when no in-app pinning-to-top mark is carried.

S111B: The terminal device 100 pins the push message 1 to the top of push messages of the app 1 in the push message box, and sets in-app pinning-to-top duration of the push message 1 to in-app pinning-to-top duration 3.

For example, the push message 1 may be an in-app pinning-to-top push message 303D of the video app shown in FIG. 4B. After receiving the push message 303D, the terminal device 100 displays the push message 303D as the 1$^{st}$ push message in the message card 303 of the video app.

S112: The terminal device 100 performs a highlighting process.

Figure 15:
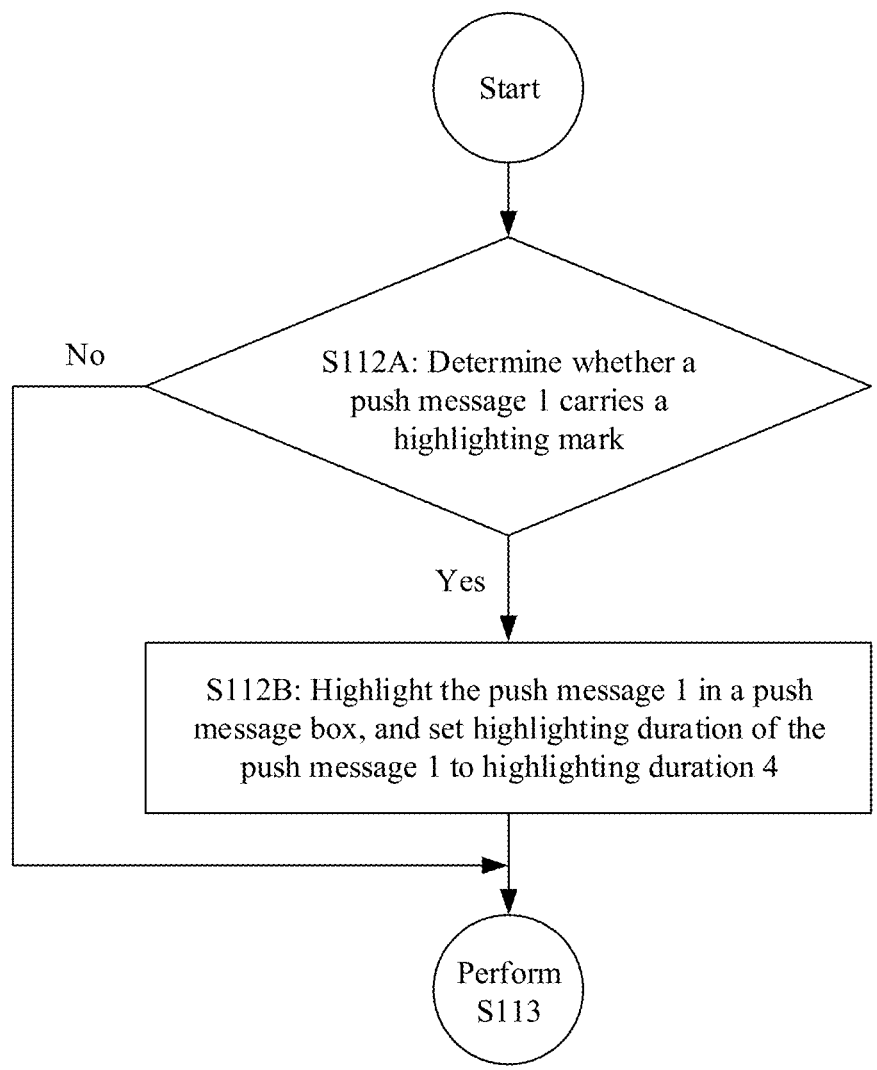
FIG. 15 is a schematic diagram of a highlighting process according to an embodiment of this application.

In some embodiments, for the highlighting process, refer to FIG. 15. As shown in FIG. 15, the global pinning-to-top process includes but is not limited to S112A and S112B.

S112A: Determine whether the push message 1 carries a highlighting mark; and perform S112B when a highlighting mark is carried; or perform S113 when no highlighting mark is carried.

S112B: Highlight the push message 1 in the push message box, and set highlighting duration of the push message 1 to highlighting duration 4.

For example, the push message 1 may be the highlighted push message 302E of the reading app shown in FIG. 4C. After receiving the push message 302E, the terminal device 100 highlights the push message 302E in the message card 302 of the reading app.

For example, the push message 1 may be the highlighted push message 302E of the reading app shown in FIG. 4D. After receiving the push message 302E, the terminal device 100 highlights the push message 302E on a newly created message card 310.

For example, the push message 1 may be the in-app pinning-to-top and highlighted push message 302E of the reading app shown in FIG. 4E. After receiving the push message 302E, the terminal device 100 displays the push message 302E as the 1$^{st}$ push message in the message card 302 of the reading app. In addition, the push message 302E is highlighted during the display.

S113: Display the push message as the 1$^{st}$ push message of the app 1 that is non-global pinning-to-top, non-in-app pinning-to-top, and non-highlighted in the push message box.

S114: After the global pinning-to-top duration 2 expires, the terminal device 100 cancels global pinning-to-top on the push message 1.

In some embodiments, in step S105, when the push message 1 carries a global pinning-to-top mark, the push message 1 does not carry the global pinning-to-top duration 2. The push message 1 carries the global pinning-to-top time 1. After receiving the push message, the terminal device 100 performs global pinning-to-top on the push message 1 within the global pinning-to-top time 1.

It should be noted that step S114 is optional. It may be understood that, when the push message 1 does not carry a global pinning-to-top mark, the terminal device 100 does not need to perform S114.

S115: After the in-app pinning-to-top duration 3 expires, the terminal device 100 cancels in-app pinning-to-top on the push message 1.

In some embodiments, in step S105, when the push message 1 carries an in-app pinning-to-top mark, the push message 1 does not carry the in-app pinning-to-top duration 3. The push message 1 carries the in-app pinning-to-top time 1. After receiving the push message, the terminal device 100 performs in-app pinning-to-top on the push message 1 within the in-app pinning-to-top time 1. Reference is made to the global pinning-to-top time shown in Table 2, and the in-app pinning-to-top time 1 may include a date and/or a global pinning-to-top time period in a day.

It should be noted that step S115 is optional. It may be understood that, when the push message 1 does not carry an in-app pinning-to-top mark, the terminal device 100 does not need to perform S115.

S116: After the highlighting duration 4 expires, the terminal device 100 cancels highlighting on the push message 1.

In some embodiments, in step S105, when the push message 1 carries a highlighting mark, the push message 1 does not carry the highlighting duration 4. The push message 1 carries the highlighting time 1. After receiving the push message, the terminal device 100 performs highlighting on the push message 1 within the highlighting time 1. Reference is made to the global pinning-to-top time shown in Table 2, and the highlighting time 1 may include a date and/or a highlighting time period in a day.

It should be noted that step S116 is optional. It may be understood that, when the push message 1 does not carry a highlighting mark, the terminal device 100 does not need to perform S116.

S117: After the persistence duration 1 expires, the terminal device 100 deletes the push message 1 from the push message box.

In this embodiment of this application, step S109 is optional. In some embodiments, the push message 1 sent by the app server 200 may not carry a persistence mark. After receiving the push message 1 and storing the push message 1 in the notification bar, the terminal device 100 performs S110 to S116. In other words, the terminal device 100 determines a display sequence (for example, whether the push message 1 is global pinning-to-top or whether the push message 1 is in-app pinning-to-top) and a display form (for example, whether the push message 1 is highlighted) of the push message 1 based on the global pinning-to-top mark, the in-app pinning-to-top mark, and/or the highlighting mark carried in the push message 1.

It should be noted that a sequence of performing steps S110, S111, and S112 is not specifically limited in this embodiment of this application. In the message processing method shown in FIG. 11C, an example in which S110, S111, and S112 are sequentially performed is used for description. Alternatively, the terminal device 100 may first determine whether the push message 1 carries an in-app pinning-to-top mark or a highlighting mark. Similarly, a sequence for performing S114, S115, and S116 is not specifically limited in this embodiment of this application. For example, for the in-app pinning-to-top and highlighted push message 1, a performing sequence of S115 and S116 may be determined based on the in-app pinning-to-top duration 3 and the highlighting duration 4 of the push message 1. When the highlighting duration 4 expires earlier than the in-app pinning-to-top duration 3, S116 is performed before S115; or when the highlighting duration 4 and the in-app pinning-to-top duration 3 expire at the same time, S116 and S115 may be simultaneously performed.

Figure 16:
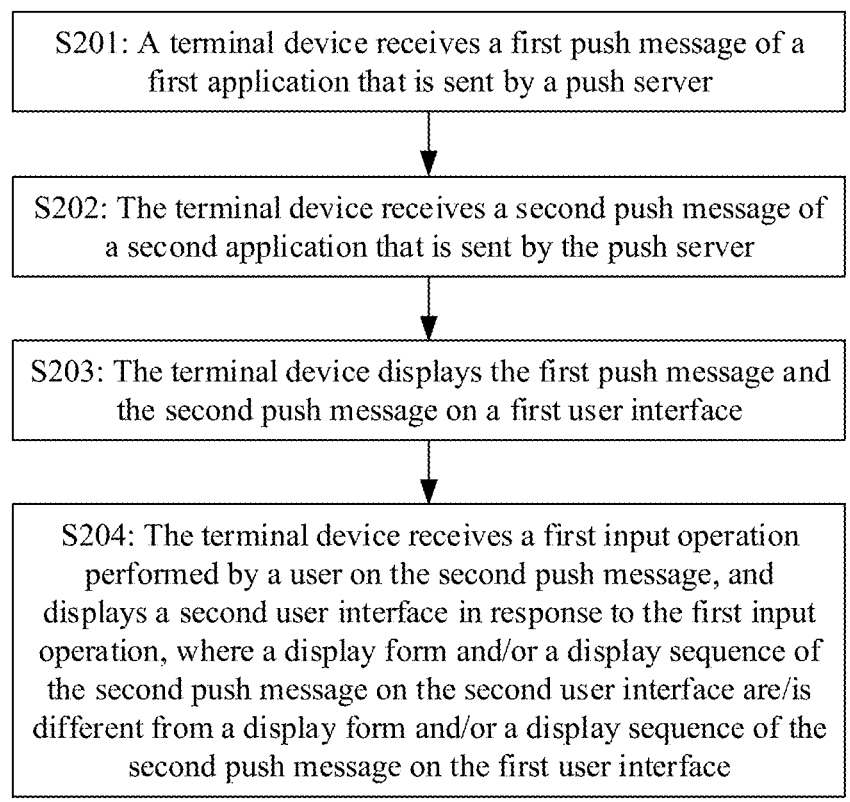
FIG. 16 is a schematic flowchart of another message processing method according to an embodiment of this application.

FIG. 16 Shows a Schematic Flowchart of a Message Processing Method According to an Embodiment of this Application. The Message Processing Method Includes but is not Limited to Step S201 to Step S206.

S201: A terminal device receives a first push message of a first application that is sent by a push server.

S202: The terminal device receives a second push message of a second application that is sent by the push server.

S203: The terminal device displays the first push message and the second push message on a first user interface.

S204: The terminal device receives a first input operation performed by a user on the second push message, and displays a second user interface in response to the first input operation, where a display form and/or a display sequence of the second push message on the second user interface are/is different from a display form and/or a display sequence of the second push message on the first user interface.

In this embodiment of this application, the first user interface may be the foregoing user interface 12, the user interface 13, or the user interface 14. This is not specifically limited herein. The terminal device is the foregoing terminal device 100.

In some embodiments, the second push message is the $1^{st}$ push message on a top of the second user interface.

For example, as shown in FIG. 5D, FIG. 5E, and FIG. 5F, the second application may be the reading app, and the second push message may be the push message 302E of the reading app. The first application may be the video app, and the first push message may be the push message 309A of the video app. Alternatively, the first application may be another app such as the game app or the bank card app shown in FIG. 5E. The first input operation may be the touch operation that is shown in FIG. 5E and that is performed on the "Global pinning-to-top" control 402A. As shown in FIG. 5F, in response to the first input operation, the terminal device displays the push message 302E as the $1^{st}$ push message on the top of the user interface 13.

For example, as shown in FIG. 6E to FIG. 6H, the second application may be the video app, and the second push message may be the push message 303D of the video app. The first application may be another application shown in FIG. 6C. The first input operation may be the touch operation performed on the "Global pinning-to-top" control 403D shown in FIG. 6F. As shown in FIG. 6G, in response to the first input operation, the terminal device displays the push message 303D as the $1^{st}$ push message on the top of the user interface 13.

In some embodiments, the second push message is the $1^{st}$ push message in push messages of the first application on the second user interface.

For example, as shown in FIG. 5D, FIG. 5E, and FIG. 5G, the second application may be the reading app, and the second push message may be the push message 302E of the reading app. The first application may be the video app, and the first push message may be the push message 309A of the video app. Alternatively, the first application may be another app shown in FIG. 5E. The first input operation may be the touch operation performed on the "In-app pinning-to-top" control 402B shown in FIG. 5E. As shown in FIG. 5G, in response to the first input operation, the terminal device displays the push message 302E as the $1^{st}$ push message in the message card 302 of the reading app on the user interface 13.

For example, as shown in FIG. 6I and FIG. 6K, the second application may be the video app, and the second push message may be the push message 303A of the video app. The first application may be another application shown in FIG. 6I. The first input operation may be the touch operation performed on the "In-app pinning-to-top" control 403F shown in FIG. 6I. As shown in FIG. 6K, in response to the first input operation, the terminal device displays the push message 303A as the $1^{st}$ push message in the message card 303 of the video app.

In some embodiments, the second push message is a push message highlighted on the second user interface.

For example, as shown in FIG. 7D to FIG. 7F, the second application may be the video app, and the second push message may be the push message 309A of the video app. The first application may be another app shown in FIG. 7E. The first input operation may be the touch operation performed on the "Highlighting" control 501B shown in FIG. 7E. As shown in FIG. 7F, in response to the first input operation, the terminal device highlights the push message 309A on the user interface 13.

For example, as shown in FIG. 8A to FIG. 8D, the second application may be the video app, and the second push message may be the push message 303D of the video app. The first application may be another app shown in FIG. 8C. The first input operation may be the touch operation performed on the "Highlighting" control 503A shown in FIG. 8C. As shown in FIG. 8D, in response to the first input operation, the terminal device highlights the push message 303D on the user interface 13.

In some embodiments, the first push message sent by the push server carries at least one display mark, and the display mark is used to indicate at least one of storage duration, a display form, and a display sequence that are of the first push message. That the terminal device displays the first push message on a first user interface includes: the terminal device displays the first push message on the first user interface based on the at least one display mark.

The display marks in embodiments of this application include but are not limited to a persistence mark, a global pinning-to-top mark, an in-app pinning-to-top mark, and a highlighting mark. The persistence mark is used to indicate storage duration of a push message, the global pinning-to-top mark and the in-app pinning-to-top mark are used to indicate a display sequence of a push message, and the highlighting mark is used to indicate a display form of a push message.

For example, the first application may be the foregoing app 1, and the first push message may be the foregoing push message 1.

In some embodiments, the at least one display mark includes a persistence mark, and the persistence mark is used to indicate the terminal device to store the first push message within first duration. After the terminal device displays the first push message on the first user interface based on the at least one display mark, the method further includes: the terminal device deletes the first push message based on the persistence mark at a moment whose interval from a receiving moment of the first push message is the first duration.

In this embodiment of this application, the first duration may be the foregoing persistence duration, for example, the foregoing persistence duration 1.

In some embodiments, the at least one display mark includes a global pinning-to-top mark. That the terminal device displays the first push message on the first user interface based on the at least one display mark includes: displaying the first push message as the $1^{st}$ push message on a top of the first user interface based on the global pinning-to-top mark.

In some embodiments, the displaying the first push message as the $1^{st}$ push message on a top of the first user interface based on the global pinning-to-top mark includes: displaying, based on the global pinning-to-top mark, the first push message as the $1^{st}$ push message on the top of the first user interface within second duration after the first push message is received. The method further includes: the terminal device deletes the global pinning-to-top mark of the first push message at a moment whose interval from a receiving moment of the first push message is the second duration.

In this embodiment of this application, the second duration may be the foregoing global pinning-to-top duration, for example, the foregoing global pinning-to-top duration 2.

For example, the first push message may be the push message 309A of the video app shown in FIG. 4A and FIG.

4B. The push message 309A carries a global pinning-to-top mark, and the terminal device displays the push message 309A as the $1^{st}$ push message on the user interface 13.

In some embodiments, the at least one display mark includes an in-app pinning-to-top mark. That the terminal device displays the first push message on the first user interface based on the at least one display mark includes: displaying the first push message as the $1^{st}$ push message in the push messages of the first application on the first user interface based on the in-app pinning-to-top mark.

In some embodiments, the displaying the first push message as the $1^{st}$ push message in the push messages of the first application on the first user interface based on the in-app pinning-to-top mark includes: displaying, on the first user interface based on the in-app pinning-to-top mark, the first push message as the $1^{st}$ push message in the push messages of the first application within third duration after the first push message is received. The method further includes: the terminal device deletes the in-app pinning-to-top mark of the first push message at a moment whose interval from a receiving moment of the first push message is the third duration.

In this embodiment of this application, the third duration may be the foregoing in-app pinning-to-top duration, for example, the foregoing in-app pinning-to-top duration 3.

For example, the first push message may be the push message 303D of the video app shown in FIG. 4C. The push message 303D carries an in-app pinning-to-top mark, and the terminal device displays the push message 303D as the $1^{st}$ push message in the message card 303 of the video app on the user interface 13.

In some embodiments, the at least one display mark includes a highlighting mark. That the terminal device displays the first push message on the first user interface based on the at least one display mark includes: highlighting the first push message on the first user interface based on the highlighting mark.

In some embodiments, the highlighting the first push message on the first user interface based on the highlighting mark includes: highlighting, based on the highlighting mark, the first push message on the first user interface within fourth duration after the first push message is received. The method further includes: the terminal device deletes the highlighting mark of the first push message at a moment whose interval from a receiving moment of the first push message is the fourth duration.

In this embodiment of this application, the fourth duration may be the foregoing highlighting duration, for example, the foregoing highlighting duration 4.

For example, the first push message may be the push message 302E of the reading app shown in FIG. 4D to FIG. 4F. The push message 302E carries a highlighting mark, and the terminal device highlights the push message 302E on the user interface 13.

In some embodiments, the first push message that is highlighted includes one or more of the following display features: compared with a non-highlighted push message, the first push message has a different background light color; compared with the non-highlighted push message, the first push message has a different font, a different font size, and/or a different color; and compared with the non-highlighted push message, the first push message carries a highlighted icon. A specific form of highlighting display is not specifically limited in this embodiment of this application.

The Following Describes a Structure of the Terminal Device 100 in Embodiments of this Application.

Figure 17:
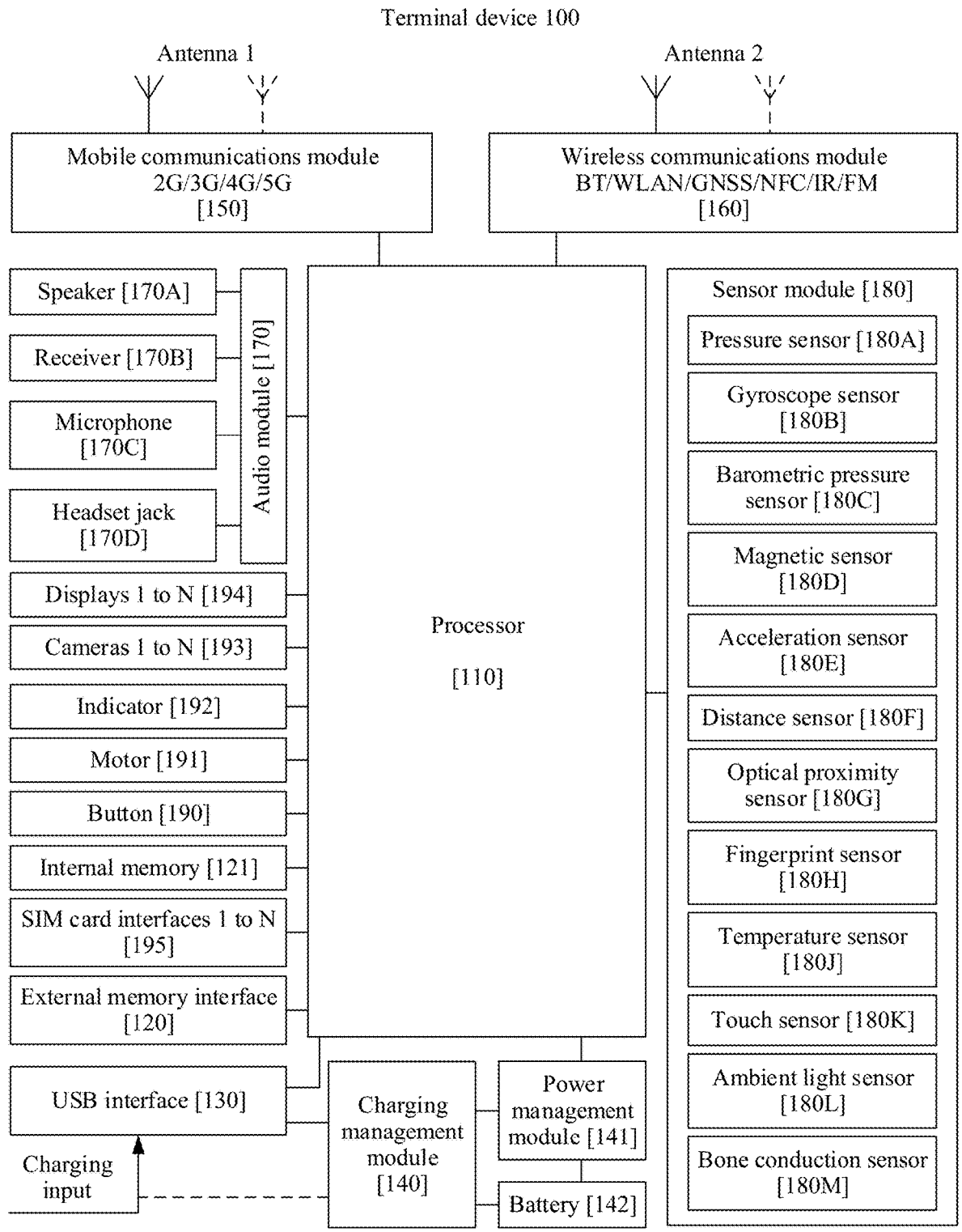
FIG. 17 is a schematic diagram of a structure of a terminal device according to an embodiment of this application.

For example, FIG. 17 shows a schematic diagram of a structure of the terminal device 100. The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure illustrated in this embodiment of the present invention does not constitute a specific limitation on the terminal device 100. In some other embodiments of this application, the terminal device 100 may include more or fewer components than those shown in the figure, or combine some components, or split some components, or have a different component arrangement. The components shown in the figure may be implemented by hardware, software, or a combination of software and hardware.

The processor 110 may include one or more processing units. For example, the processor 110 may include an application processor (Application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. In this way, repeated access is avoided, waiting time of the processor 110 is reduced, and system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive a charging input from a charger. The charger may be a wireless charger or a wired charger. In some wired charging embodiments, the charging management module 140 may receive a charging input from a wired charger through the USB interface 130. In some wireless charging embodiments, the charging management module 140 may receive a wireless charging input through a wireless charging coil of the terminal device 100. When charging the battery 142, the charging management module 140 may further supply power to the terminal device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the terminal device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal device 100 may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a solution to wireless communication that includes 2G/3G/4G/5G or the like and that is applied to the terminal device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same component.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transfers the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 170A, the receiver 170B, or the like), or displays an image or a video by using the display 194. In some embodiments, the modem processor may be an independent component. In some other embodiments, the modem processor may be independent of the processor 110, and is disposed in a same component as the mobile communications module 150 or another functional module.

The wireless communications module 160 may provide a wireless communication solution that is applied to the terminal device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communications module 160 may be one or more components integrating at least one communications processing module. The wireless communications module 160 receives an electromagnetic wave through the antenna 2, performs demodulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, in the terminal device 100, the antenna 1 and the mobile communications module 150 are coupled, and the antenna 2 and the wireless communications module 160 are coupled, so that the terminal device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The terminal device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diodes, QLED), or the like. In some embodiments, the terminal device 100 may include one or N displays 194, where N is a positive integer greater than 1.

The terminal device 100 may implement a photographing function by using the ISP, the camera 193, the video codec, the GPU, the display 194, the application processor, and the like.

The ISP is configured to process data fed back by the camera 193. For example, during photographing, a shutter is pressed, and a light ray is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion that are of the image. The ISP may further optimize parameters such as exposure and color temperature that are of a photographing scenario. In some embodiments, the ISP may be disposed in the camera 193.

The camera 193 is configured to capture a static image or a video. An optical image of an object is generated by using the lens, and is projected onto the photosensitive element. The photosensitive element may be a charge-coupled device (charge-coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, an RGB format or a YUV format. In some embodiments, the terminal device 100 may include one or N cameras 193, where N is a positive integer greater than 1.

The digital signal processor is configured to process a digital signal, and may process another digital signal in addition to a digital image signal. For example, when the terminal device 100 selects a frequency, the digital signal processor is configured to perform Fourier transform on frequency energy, and the like.

The video codec is configured to compress or decompress a digital video. The terminal device 100 may support one or more video codecs. In this way, the terminal device 100 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the terminal device 100, such as image recognition, facial recognition, speech recognition, and text understanding, may be implemented by using the NPU.

The internal memory 121 may include one or more random access memories (random access memory, RAM) and one or more non-volatile memories (non-volatile memory, NVM).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, the fifth generation DDR SDRAM is generally referred to as DDR5 SDRAM), and the like. The non-volatile memory may include a magnetic disk storage device and a flash memory (flash memory).

According to an operation principle, the flash memory may include a NOR FLASH, a NAND FLASH, a 3D NAND FLASH, and the like. According to a potential order of a storage unit, the flash memory may include a single-level cell (single-level cell, SLC), a multi-level cell (multi-level cell, MLC), a triple-level cell (triple-level cell, TLC), a quad-level cell (quad-level cell, QLC), and the like. According to a storage specification, the flash memory may include universal flash storage (English: universal flash storage, UFS), an embedded multimedia card (embedded multimedia Card, eMMC), and the like.

The random access memory may be directly read and written by the processor 110, and may be configured to store an executable program (for example, a machine instruction) of an operating system or another running program, and may be further configured to store data of a user and an application, and the like.

The non-volatile memory may also store an executable program and data of a user and an application, and the like. The non-volatile memory may be loaded to the random access memory in advance for the processor 110 to directly perform reading and writing.

The external memory interface 120 may be configured to connect to an external non-volatile memory, to extend a storage capability of the terminal device 100. The external non-volatile memory communicates with the processor 110 through the external memory interface 120, to implement a data storage function. For example, files such as music and a video are stored in the external non-volatile memory.

The terminal device 100 may implement an audio function by using the audio module 170, the speaker 170A, the receiver 170B, the microphone 170C, the headset port 170D, the application processor, and the like. For example, a music playback function and a recording function are implemented.

The audio module 170 is configured to convert digital audio information into an analog audio signal output, and is also configured to convert an analog audio input into a digital audio signal. The audio module 170 may be further configured to: encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mike" or a "microphone", is configured to convert a sound signal into an electrical signal.

The headset jack 170D is configured to connect to a wired headset.

The pressure sensor 180A is configured to sense a pressure signal, and may convert the pressure signal into an electrical signal.

The gyroscope sensor 180B may be configured to determine a motion posture of the terminal device 100.

The barometric pressure sensor 180C is configured to measure barometric pressure.

The magnetic sensor 180D includes a Hall sensor.

The acceleration sensor 180E may detect magnitudes of accelerations in various directions (generally on three axes) of the terminal device 100. When the terminal device 100 is stationary, a magnitude and a direction of gravity may be detected.

The distance sensor 180F is configured to measure a distance. The terminal device 100 may measure a distance in an infrared manner or a laser manner.

The optical proximity sensor 180G may include a light-emitting diode (LED) and an optical detector, for example, a photodiode.

The ambient light sensor 180L is configured to sense ambient light brightness.

The fingerprint sensor 180H is configured to collect a fingerprint.

The temperature sensor 180J is configured to detect a temperature.

The touch sensor 180K is also referred to as a "touch component". The touch sensor 180K may be disposed on the display 194. The touch sensor 180K and the display 194 constitute a touchscreen, and the touchscreen is also referred to as a "touch control screen". The touch sensor 180K is configured to detect a touch operation performed on or near the touch sensor. The touch sensor may transfer the detected touch operation to the application processor, to determine a type of a touch event. A visual output related to the touch operation may be provided by using the display 194. In some other embodiments, the touch sensor 180K may be alternatively disposed on a surface of the terminal device 100, and is located on a position different from that of the display 194.

The bone conduction sensor 180M may obtain a vibration signal.

The button 190 may be a mechanical button, or may be a touch button. The terminal device 100 may receive a button input, and generate a button signal input related to user setting and function control of the terminal device 100.

The motor 191 may generate a vibration prompt.

The Following Describes a Structure of an App Server 200 According to an Embodiment of this Application.

Figure 18:
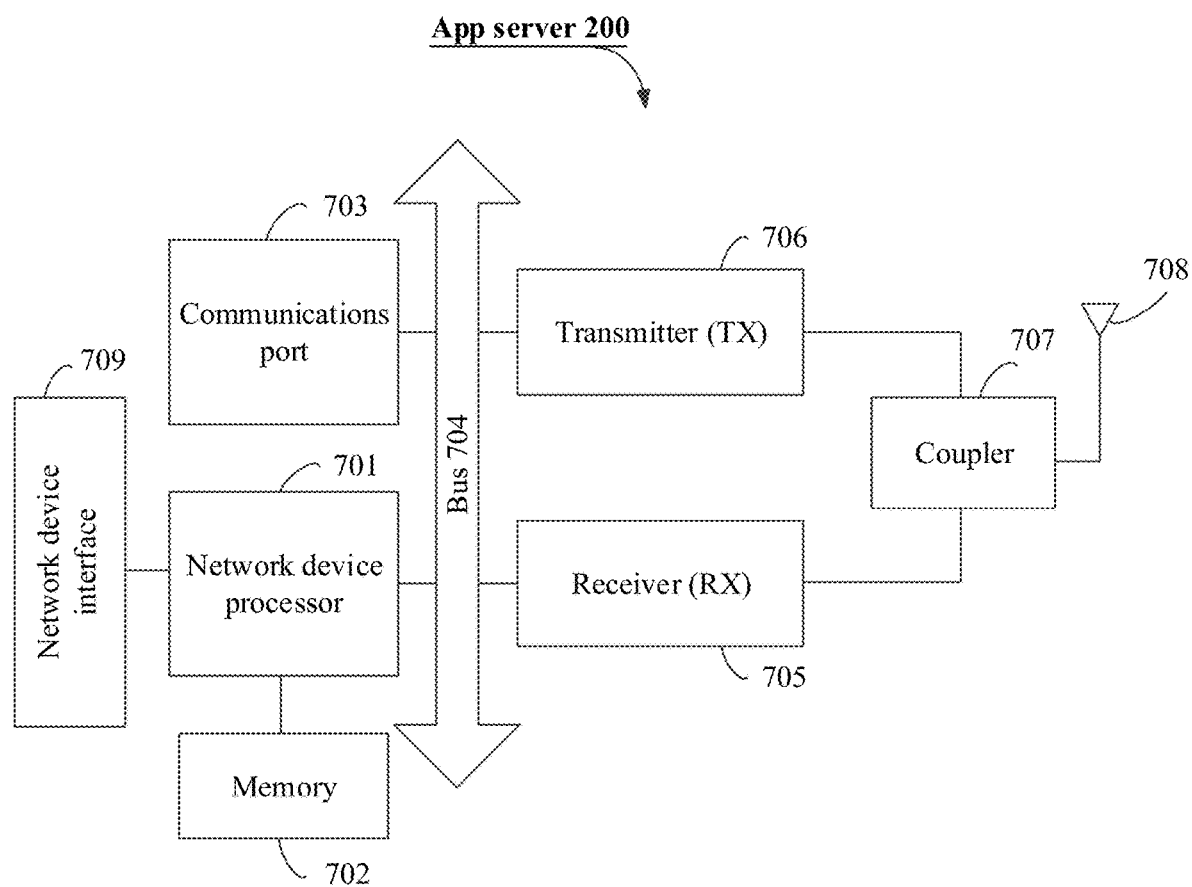
FIG. 18 is a schematic diagram of a structure of a server according to an embodiment of this application.

FIG. 18 shows an example of a structure of an app server 200 according to an embodiment of this application.

As shown in FIG. 18, the app server 200 may include: one or more network device processors 701, a memory 702, a communications interface 703, a receiver 705, a transmitter 706, a coupler 707, an antenna 708, and a network device interface 709. These components may be connected by using a bus 704 or in another manner. In FIG. 18, an example in which these components are connected by using a bus is used.

The communications interface 703 may be used by the app server 200 to communicate with another communications device, for example, a terminal device. Specifically, the terminal device may be the terminal device 100 shown in FIG. 17. Specifically, the communications interface 703 may be a 5G communications interface, or may be a future new radio communications interface. In addition to a wireless communications interface, the app server 200 may be further configured with a wired communications interface 703, for example, a local access network (local access network, LAN) interface. The transmitter 706 may be configured to perform transmission processing on a signal output by the network device processor 701. The receiver 705 may be configured to perform receiving processing on a mobile communication signal received by the antenna 708.

In some embodiments of this application, the transmitter 706 and the receiver 705 may be considered as a wireless modem. In the app server 200, there may be one or more transmitters 706 and one or more receivers 705. The antenna 708 may be configured to convert electromagnetic energy in a transmission line into an electromagnetic wave in free space, or convert an electromagnetic wave in free space into electromagnetic energy in a transmission line. The coupler 707 is configured to divide mobile communication signals received by the antenna 708 into a plurality of channels of signals, and allocate the plurality of channels of signals to a plurality of receivers 705.

The memory 702 is coupled to the network device processor 701, and is configured to store various software programs and/or a plurality of sets of instructions. Specifically, the memory 702 may include a high-speed random access memory, and may further include a non-volatile memory, for example, one or more magnetic disk storage devices, a flash memory device, or another non-volatile solid-state storage device. The memory 702 may store a network communication program. The network communication program may be used to communicate with one or more additional devices, one or more terminal devices, and one or more network devices.

In some embodiments of this application, the memory 702 may be configured to store an implementation program, on an app server 200 side, of an uplink synchronization method provided in one or more embodiments of this application. For implementation of the uplink synchronization method provided in one or more embodiments of this application, refer to the foregoing embodiments.

The network device processor 701 may be configured to read and execute computer-readable instructions. Specifically, the network device processor 701 may be configured to: invoke a program stored in the memory 702, for example, the implementation program, on the app server 200 side, of the uplink synchronization method provided in one or more embodiments of this application; and execute instructions included in the program.

It should be noted that the app server 200 shown in FIG. 18 is merely an implementation of this embodiment of this application. In actual application, the app server 200 may further include more or fewer components. This is not limited herein.

In this embodiment of this application, for a structure of the push server 300, refer to the structure of the app server 200 shown in FIG. 18. Details are not described herein again.

The implementations of this application may be randomly combined, to achieve different technical effects.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the processes or the functions according to this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

A person of ordinary skill in the art may understand that all or some of the processes in the methods in the foregoing embodiments may be implemented by using a computer program to instruct related hardware. The program may be stored in a computer-readable storage medium. When the program is executed, the processes in the foregoing method embodiments may be performed. The foregoing storage medium includes: any medium that can store program code, such as a ROM, a random access memory RAM, a magnetic disk, or an optical disc.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. A message processing method, comprising:
   receiving, by a terminal device, a first push message of a first application from a push server, wherein the first push message carries at least one display mark comprising a persistence mark, and the persistence mark indicates the terminal device to store the first push message for a first duration;
   receiving, by the terminal device, a second push message of a second application from the push server;
   displaying, by the terminal device, a first message, indicated by the first push message and based on the at least one display mark, and a second message indicated by the second push message on a first user interface;
   after the displaying the first message, deleting, by the terminal device, the first push message based on the persistence mark at a moment whose interval from a receiving moment of the first push message is the first duration;
   receiving, by the terminal device, a first input operation performed by a user on the second message; and
   displaying, by the terminal device, a second user interface, different from the first interface, in response to the first input operation, wherein a display form and/or a display position of the second message on the second user interface are/is different from a display form and/or a display position of the second message on the first user interface.

2. The method according to claim 1, wherein the second message is a message highlighted on the second user interface.

3. The method according to claim 1, wherein the second message is the initial message on a top of the second user interface.

4. The method according to claim 1, wherein the second message is the initial message in messages of the first application on the second user interface.

5. The method according to claim 1, wherein the display mark indicates at least one of storage duration, a display form, and a display sequence that are of the first push message.

6. The method according to claim 1, wherein the at least one display mark comprises a global pinning-to-top mark; and
   the displaying, by the terminal device, the first message on the first user interface based on the at least one display mark comprises:
   displaying the first message as the initial message on a top of the first user interface based on the global pinning-to-top mark.

7. The method according to claim 6, wherein the displaying the first message as the initial message on the top of the first user interface based on the global pinning-to-top mark comprises:
   displaying, based on the global pinning-to-top mark, the first message as the initial message on the top of the first user interface within a second duration after the first push message is received; and
   the method further comprises:
   deleting, by the terminal device, the global pinning-to-top mark of the first message at a moment whose interval from a receiving moment of the first push message is the second duration.

8. The method according to claim 1, wherein the at least one display mark comprises an in-application pinning-to-top mark; and
   the displaying, by the terminal device, the first message on the first user interface based on the at least one display mark comprises:
   displaying the first message as the initial message in messages of the first application on the first user interface based on the in-app pinning-to-top mark.

9. The method according to claim 8, wherein the displaying the first message as the initial message in the messages of the first application on the first user interface based on the in-application pinning-to-top mark comprises:
   displaying, based on the in-application pinning-to-top mark, the first message as the initial message in the messages of the first application within a third duration after the first push message is received; and
   the method further comprises:
   deleting, by the terminal device, the in-application pinning-to-top mark of the first message at a moment whose interval from a receiving moment of the first push message is the third duration.

10. The method according to claim 1, wherein the at least one display mark comprises a highlighting mark; and
    the displaying, by the terminal device, the first message on the first user interface based on the at least one display mark comprises:
    highlighting, based on the highlighting mark, the first message on the first user interface.

11. The method according to claim 10, wherein the highlighting, based on the highlighting mark, the first message on the first user interface comprises:

highlighting, based on the highlighting mark, the first message on the first user interface within a fourth duration after the first message is received; and the method further comprises:

deleting, by the terminal device, the highlighting mark of the first message at a moment whose interval from a receiving moment of the first push message is the fourth duration.

12. The method according to claim 10, wherein the first message that is highlighted comprises one or more of the following display features: compared with a non-highlighted message, the first message has a different background light color; compared with the non-highlighted message, the first message has a different font, a different font size, and/or a different color; and compared with the non-highlighted message, the first message carries a highlighted icon.

13. A message processing method, comprising:

receiving, by a push server, a third push message of a first application that is sent by an application server, wherein the third push message carries at least one display mark, and the display mark indicates at least one of a storage duration, a display sequence, and a display form that are of the third push message on a terminal device;

sending, by the push server, a first push message to the terminal device, wherein the first push message is determined based on the third push message wherein before the sending, by the push server, the first push message to the terminal device, the method further comprises:

determining, by the push server, a validity of a first display mark carried in the third push message, wherein the first display mark is any one of the at least one display mark; and when the first display mark is invalid, deleting, by the push server, the first display mark of the first push message, and generating the first push message.

14. The method according to claim 13, wherein before the receiving, by the push server, the third push message that is sent by the application server, the method further comprises:

sending, by the application server, a registration request to the push server, wherein the registration request is used to register a display service corresponding to the at least one display mark of the first application.

15. The method according to claim 14, wherein the at least one display mark comprises at least one type of display mark, and the at least one type of display mark comprises at least one type of a persistence mark, a global pinning-to-top mark, an in-application pinning-to-top mark, and a highlighting mark, wherein a display service corresponding to the persistence mark is a persistence service, a display service corresponding to the global pinning-to-top mark is a global pinning-to-top service, a display service corresponding to the in-application pinning-to-top mark is an in-application pinning-to-top service, and a display service corresponding to the highlighting mark is a highlighting service.

16. The method according to claim 14, wherein the determining, by the push server, validity of a first display mark carried in the third push message comprises:

determining, by the push server, whether a display service corresponding to the first display mark is registered with the first application; and when the display service corresponding to the first display mark is not registered with the first application, determining, by the push server, that the first display mark is invalid.

17. The method according to claim 14, wherein the first display mark is a global pinning-to-top mark, the registration request further comprises a global pinning-to-top time period, and the determining, by the push server, validity of a first display mark carried in the third push message comprises:

when a display service corresponding to the first display mark is registered with the first application, and a current moment is later than the global pinning-to-top time period, determining, by the push server, that the first display mark is invalid.

18. The method according to claim 15, wherein the persistence mark indicates the terminal device to store the first push message within a first duration;

the global pinning-to-top mark indicates the terminal device to display a first message indicated by the first push message as the initial message on a top of a first user interface;

the in-application pinning-to-top mark indicates the terminal device to display, on the first user interface, the first message as the initial message in the messages of the first application; and the highlighting mark indicates the terminal device to highlight the first message on the first user interface.

* * * * *